US012115488B1

(12) United States Patent
Lipofsky

(10) Patent No.: US 12,115,488 B1
(45) Date of Patent: Oct. 15, 2024

(54) EFFICIENT ATMOSPHERIC WATER GENERATOR WITH VACUUM WATER VAPOR COMPRESSION FOR SINGLE OR DUAL DESICCANT HEAT EXCHANGE

(71) Applicant: Evan Lipofsky, San Clemente, CA (US)

(72) Inventor: Evan Lipofsky, San Clemente, CA (US)

(*) Notice: Subject to any disclaimer, the term of this patent is extended or adjusted under 35 U.S.C. 154(b) by 0 days.

(21) Appl. No.: 18/432,002

(22) Filed: Feb. 4, 2024

Related U.S. Application Data

(60) Provisional application No. 63/611,737, filed on Dec. 18, 2023, provisional application No. 63/606,495, filed on Dec. 5, 2023, provisional application No. 63/578,451, filed on Aug. 24, 2023, provisional application No. 63/514,044, filed on Jul. 17, 2023.

(51) Int. Cl.
*B01D 5/00* (2006.01)
*B01D 3/10* (2006.01)
*B01D 53/26* (2006.01)

(52) U.S. Cl.
CPC ............... *B01D 5/006* (2013.01); *B01D 3/10* (2013.01); *B01D 5/009* (2013.01); *B01D 53/263* (2013.01)

(58) Field of Classification Search
CPC .......... B01D 3/10; B01D 5/006; B01D 5/009; B01D 53/263
See application file for complete search history.

(56) References Cited

U.S. PATENT DOCUMENTS

| | | | | |
|---|---|---|---|---|
| 6,574,979 B2* | 6/2003 | Faqih | .................. | E03B 3/28 62/93 |
| 7,337,615 B2* | 3/2008 | Reidy | .................. | B01D 53/265 62/3.4 |
| 7,467,523 B2* | 12/2008 | Vetrovec | .................. | C02F 1/14 96/108 |
| 7,866,176 B2* | 1/2011 | Vetrovec | .................. | B01D 53/261 62/235.1 |
| 8,506,675 B2* | 8/2013 | Ellsworth | .................. | B32B 3/26 95/91 |
| 10,071,918 B2* | 9/2018 | Ackerman | .................. | B01D 5/006 |
| 11,021,854 B2* | 6/2021 | Gido | .................. | B01D 53/265 |

(Continued)

FOREIGN PATENT DOCUMENTS

WO WO-2023057801 A1 * 4/2023

*Primary Examiner* — Jonathan Miller
(74) *Attorney, Agent, or Firm* — Kasha Law LLC; John R. Kasha; Kelly L. Kasha

(57) ABSTRACT

Windows of a vacuum chamber of an AWG are opened to allow air in. Water is absorbed from the air in a hygroscopic material coating the outside of a heat transfer chamber. When the hygroscopic material reaches a certain level, the windows are closed, a vacuum is created in the vacuum chamber, water vapor is released from the hygroscopic material, and the water vapor is pumped from the vacuum chamber into the heat transfer chamber. The pumped water vapor is condensed into water in the heat transfer chamber and energy is transferred from condensation back to the hygroscopic material through one or more walls of the heat transfer chamber. When the water in the heat transfer chamber reaches a certain level, the water is transferred from the heat transfer chamber to the reservoir, the pump is stopped, the vacuum is released, and the windows are opened again.

11 Claims, 70 Drawing Sheets

(56) References Cited

U.S. PATENT DOCUMENTS

| | | | |
|---|---|---|---|
| 11,285,435 B2* | 3/2022 | Friesen | B01D 53/261 |
| 11,359,356 B2* | 6/2022 | Friesen | C02F 9/00 |
| 11,414,843 B2* | 8/2022 | Friesen | B01D 53/265 |
| 11,846,092 B2* | 12/2023 | Friesen | B01D 53/04 |
| 11,878,264 B2* | 1/2024 | Kendrick | B01D 5/006 |
| 2002/0011075 A1* | 1/2002 | Faqih | B01D 5/0087 62/285 |
| 2005/0044862 A1* | 3/2005 | Vetrovec | B01D 53/265 62/93 |
| 2006/0130654 A1* | 6/2006 | King | B01D 5/0045 95/231 |
| 2011/0232485 A1* | 9/2011 | Ellsworth | B32B 3/26 95/91 |
| 2012/0006193 A1* | 1/2012 | Roychoudhury | B01D 53/047 96/111 |
| 2019/0153704 A1* | 5/2019 | Gido | B01D 53/26 |
| 2020/0332498 A1* | 10/2020 | Friesen | F24F 3/1429 |
| 2021/0156124 A1* | 5/2021 | Yaghi | B01D 53/0462 |
| 2023/0024720 A1* | 1/2023 | Kendrick | B01D 5/0072 |

* cited by examiner

Single Desiccant Systems

Dual Desiccant Systems

EFFICIENT ATMOSPHERIC WATER GENERATOR WITH VACUUM WATER VAPOR COMPRESSION FOR SINGLE OR DUAL DESICCANT HEAT EXCHANGE

RELATED APPLICATIONS

This application claims the benefit of U.S. Provisional Patent Application Ser. No. 63/514,044, filed on Jul. 17, 2023, U.S. Provisional Patent Application Ser. No. 63/578,451, filed on Aug. 24, 2023, U.S. Provisional Patent Application Ser. No. 63/606,495, filed on Dec. 5, 2023, and U.S. Provisional Patent Application Ser. No. 63/611,737, filed on Dec. 18, 2023, the contents of which are incorporated by reference herein in their entirety.

FIELD OF THE INVENTION

Embodiments of the present invention relate to atmospheric water generators (AWGs) or dehumidifiers. AWGs take water from atmospheric humidity and condense it into liquid water. The uses of AWGs can include, but are not limited to, dehumidification, air conditioning, agricultural water supply, and drinking water supply.

BACKGROUND

There is an ever-growing need for quality freshwater. Yet, sources of fresh water on land are limited. Some are being depleted, and the water quality of other sources is being compromised by many industrial and agricultural processes as well as the expansion of cities into rural areas. Climate change, droughts, and growing populations continue to increase the need for clean water.

In addition, conventional AWGs and atmospheric water harvesters generally consume large amounts of energy to produce small quantities of water. Thus, they are not well-suited for use in the remote and resource-starved areas that need quality freshwater the most.

Furthermore, air conditioners and dehumidifiers waste vast amounts of energy and billions of dollars in electricity through inefficient dehumidification.

As a result, there is a need for new systems and methods for atmospheric water generation that consume less energy than conventional AWGs, water harvesters, or dehumidifiers.

In particular, this device efficiently generates water from the atmosphere by using hygroscopic materials, or desiccants, that naturally absorb water from the air. The terms hygroscopic material and desiccant are used interchangeably herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
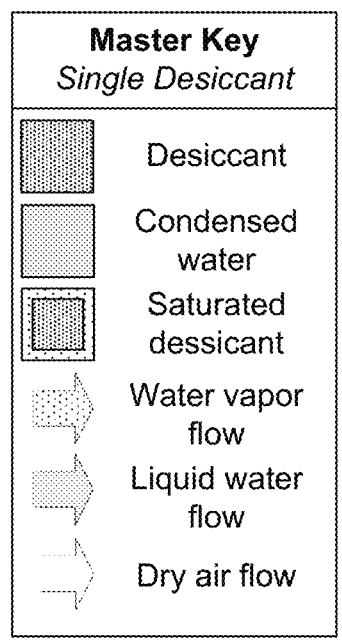
FIG. 1 is a key of information describing symbols seen from FIGS. 1 through 17.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF EMBODIMENTS

Atmospheric Water Generator

As described above, there is an ever-growing need for quality freshwater. Conventional atmospheric water generators (AWG's) or dehumidifiers can take water from atmospheric humidity and condense it into liquid water. However, these conventional systems generally consume a large amount of energy, and are often large and costly devices that are not easily transported or implemented.

As a result, there is a need for new systems and methods for atmospheric water generation that are more versatile, portable, and consume substantially less energy than conventional dehumidification methods.

In various embodiments, an AWG uses salts, gels, metal organic frameworks, or any compound that naturally absorbs water from ambient humidity in a phenomenon known as hygroscopy. A vacuum is then created to remove air from the device, decreasing pressure, and thereby lowering the boiling point of any absorbed water in the hygroscopic compound. A low friction water vapor compression pump/blower (centrifugal, peristaltic, diaphragm, piston, etc.) compresses the water vapor released from the hygroscopic compound into a neighboring chamber, where it is condensed. Since water has a high latent heat of vaporization ($\Delta H$ vap, 2.26 kJ/gram or 40.65 kJ/mol), it therefore releases a high amount of heat during condensation. Therefore, the condensation chamber rapidly heats up as water is condensed through compression. Since the hygroscopic compound is releasing water into a vacuum, the bonds between the hygroscopic compound and the water molecules must be broken to form water vapor. The energy required to break these bonds is supplied through the system's surroundings and internal heat energy, thereby causing the temperature of the hygroscopic compound to drop. The energy required to release and vaporize water molecules from hygroscopic compounds is often equal to or greater than the latent heat of vaporization of water.

Therefore, in various embodiments, each chamber is thermodynamically connected through heat transfer via heat diffusion to maintain close to equal temperatures. Maintaining close to equal temperatures will make the water vapor compression pump more efficient, as pressure increases with temperature, and higher pressure in the condensation chamber causes more resistance in the flow of the vapor through the pump. As water is condensed, the hygroscopic compound or mixture is dehydrated and reactivated to be used in the following cycle.

Through solar or grid power, this AWG pulls pure water from the atmosphere and purifies it through a repeatable, low-energy process. This can have applications in a wide variety of industries, including efficient household dehumidifiers and air conditioners, self-watering plants and farms, and creating drinking water in water-scarce areas around the world. The device can be miniaturized or scaled up to fit any of such purposes.

Hygroscopic Material

In various embodiments, the hygroscopic material is the most important component of this device regarding the absorption of water from the atmosphere. As mentioned above, the AWG described herein uses salts (such as calcium chloride, lithium chloride, sodium hydroxide, potassium hydroxide), gels (such as silica gel), and/or metal organic frameworks (MOFs, such as MOF-303) to naturally absorb water from ambient humidity. Molecular sieves, types of clay, activated charcoal, activated alumina, calcium oxide, or any other water absorbing compound can also be used. Hygroscopic compounds can also be known as chemical dehumidifiers, desiccants, desiccators, or single use dehumidifiers. Desiccants can either adsorb or absorb water from the air, depending on their chemical and physical properties. Calcium chloride, for example, is a highly ionic and polar salt, with a high affinity for polar water molecules. Calcium chloride can absorb several times its own weight worth of water. Calcium chloride can absorb water to such an extent that the salt can fully dissolve into the water it absorbs. This property, for a hygroscopic compound to be able to fully dissolve in the water it absorbs and form a solution, is known as deliquescence. This creates a problem with many chemical dehumidifiers as the supersaturated salt solution is difficult to dispose of, highly corrosive, and has the potential to leak.

In various embodiments, the hygroscopic material can also be a liquid desiccant, such as concentrated brine made from salt, that is sprayed into a chamber with air flow, thus creating small liquid particles with a high total surface area and high water absorption rate. This liquid, now with a higher concentration of water, can be regenerated back to a lower concentration of water. Once a vacuum is generated, the liquid desiccant will release a quantity of water in the same way as before, with the liquid desiccant in contact with the heat transfer system. This liquid desiccant can also be sprayed onto the heat transfer system during this step, to increase the evaporation rate of the water from the liquid and to circulate temperature. A main difference in this step versus the uses of for example a solid salt gel mixture is that the regeneration process would be terminated and the water condensed would be collected before the liquid desiccant has released enough water to have the desiccant crystallize or fall out of solution. Then, this concentrated but still liquid desiccant would be exposed to the atmosphere, where it could gain more water, become a diluted desiccant, and repeat the process.

In various embodiments, for AWGs using hygroscopic salts with deliquescent properties, this issue is resolved in the AWG by mixing the salt with a gel or gel forming compound, often a ratio of around 80% salt to 20% gel. Gels include highly absorbent gels such as sodium polyacrylate and gel forming compounds such as modified starches. This transforms any water absorbed into a solid gel that is easy to handle. Furthermore, since calcium chloride and most other hygroscopic compounds have regenerative hygroscopic properties, once the water surrounding the salt ions is removed, it can absorb new water from the atmosphere, meaning that the same sample of calcium chloride can absorb and release water thousands of times over several years. While calcium chloride is one of the cheapest and strongest hygroscopic salts most commonly used in desiccant and chemical dehumidifiers, various embodiments are not limited to calcium chloride and any other hygroscopic material can be used in the AWG.

Furthermore, in various embodiments, atmospheric and airborne particles such dust have the potential to accumulate on the hygroscopic material over time. This can eventually create a sediment layer blocking the flow of water vapor to and from the hygroscopic compound. For this reason, screens and filters on the openings of the device to the atmosphere can be implemented in this device to limit the amount of particles that enter the device. Furthermore, these filters can be removable for cleaning or replacement. Due to the low cost of many desiccants, the desiccant can be designed to be removable for cleaning or replacement. Additionally, desiccants with high structural integrity, such as silica gel, could be cleaned while remaining inside of the device by flushing with water or a cleaning solution as silica gel does not dissolve in water or become over saturated. This would prevent disrupting the connection of the heat transfer system by removing or replacing the desiccant.

Traditionally, the use of hygroscopic materials in dehumidification has required a large amount of input energy to remove water to regenerate the material.

FIG. 1 is an exemplary diagram 100 showing a key for symbols seen through FIGS. 1 through 17. Dense dot-shaded surfaces represent the water absorbing hygroscopic material, or desiccant. Solid gray surfaces represent condensed water. Dense dot-shaded surfaces in a chamber with a lighter dot-shaded background represents a chamber containing a desiccant that is fully saturated with water and cannot absorb any more water vapor. Lightly dot-shaded arrows represent the flow of water vapor. Solid gray arrows represent the transfer of liquid water. Empty white arrows represent dry air flow.

Figure 2:
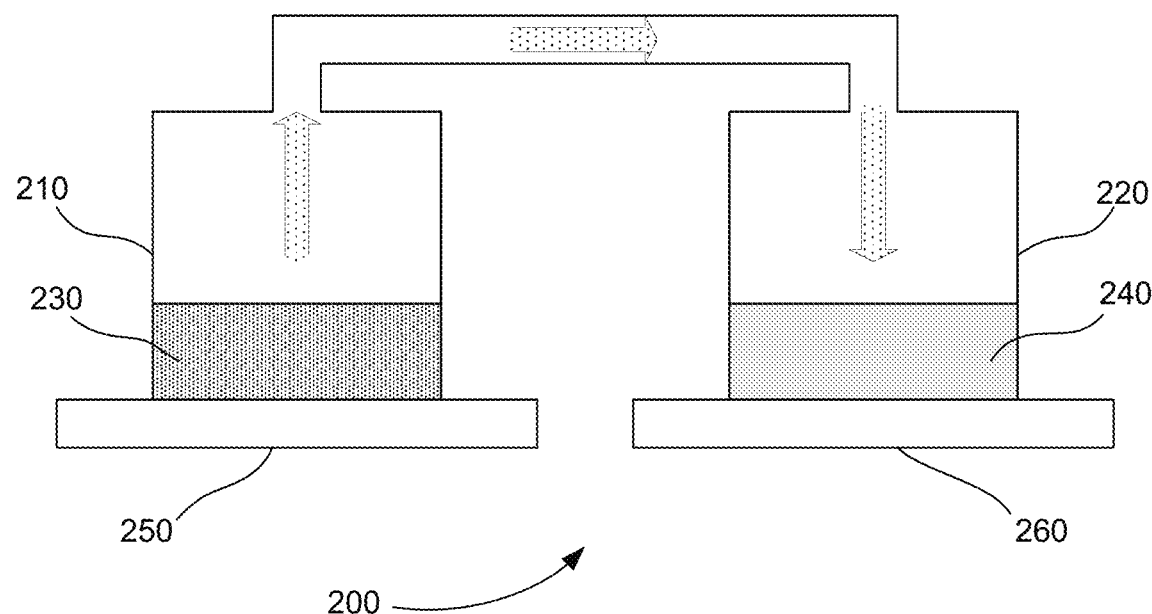
FIG. 2 is an exemplary diagram that illustrates how energy is used in a traditional system that harvests water using a single hygroscopic material.
Figure 2:
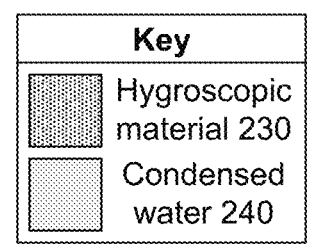

FIG. 2 is an exemplary diagram 200 that illustrates how energy is used in a traditional system that harvests water using a hygroscopic material. In FIG. 2, evaporation chamber 210 contains a fully saturated hygroscopic material. A heating element 250 is used to provide energy in the form of heat to the hygroscopic material 230 to release or vaporize the water it holds. The hygroscopic material shown can be MOF-303, which is a metal-organic framework (MOF). Specifically, MOF-303 is Al(OH)(PZDC), where PZDC is 1-H-pyrazole-3,5-dicarboxylate. MOFs are highly porous materials with the potential to absorb water even at low relative humidities below 20%. MOFs are therefore well suited for water generators in arid and desert regions.

The heat of vaporization for water in MOF-303 is approximately 52 KJ/mol. 1 kg of water is 55.5 moles. The energy needed to vaporize 1 kg of water from MOF-303 is approximately 2,890 KJ/kg. This calculation does not include the initial heat required to get to a high temperature where MOF-303 gives up water vapor, which would bring the number over 3,000 KJ/kg. This demonstrates the high energy requirements needed when heat is used to harvest water. Given that the average solar irradiance per square meter is 6 kWh/m$^2$, or 21,600 KJ/m$^2$, a passive device harnessing 100% of the sun's thermal energy would be limited to about 7 liters of water per square meter of sunlight per day. Given that heat would inevitably be lost to the surroundings, and cloudy days would block solar energy, this number is likely far lower.

In turn, cooling element 260 is used to remove energy to condense the vapor released from MOF-303 and produce liquid water 240 in the condensation chamber 220. The latent heat of vaporization of water is 40.65 KJ/mol. To condense a mole of water, 40.65 kJ of energy would need to be removed from the water vapor. Again, 1 kg of water is 55.5 mol. So, the energy needed to be removed in order to condense 1 kg of water is often greater than 2,260 KJ/L, given that cooling methods often require more energy input than the amount of heat they are able to remove. This would further reduce the efficiency and water production of a passive or active device using heating and cooling. Additionally, since the condensing part of a passive device would need to be colder than the heated hygroscopic compound, there is no method of recycling the heat released from condensation, as heat only flows from high to low.

Should an electrical system be used, given that a square meter of solar panel produces on average 1 kWh per day, there would hardly be enough energy to produce 1 L of water from the hygroscopic material MOF-303 in a traditional setup.

In various embodiments, the amount of energy needed to perform water harvesting using a hygroscopic material is significantly reduced through the use of a vacuum chamber, a vacuum pump, a water vapor compression pump, and a heat exchange system.

Vacuum Chamber

In various embodiments, to reduce the pressure inside of the AWG and, therefore, lower the boiling point of water, the AWG is built as an open and closable vacuum chamber. It is built strong enough to support the 14.7 pounds per square inch of atmospheric pressure and is able to open to let enough air flow in order to capture moisture from the atmosphere. In various embodiments, this is done by opening the top and bottom of a cylindrical vacuum chamber.

In various embodiments, the vacuum chamber is built as a single cylindrical body, containing the evaporation and condensation chambers within. Through manufacturing processes such as aluminum extrusion, the vacuum chamber, evaporation chamber, and condensation chambers can be built as one solid piece of aluminum in order to provide high heat transfer coefficients between the chambers. By building these chambers directly into the vacuum chamber, the vacuum chamber itself can be used as a heatsink to release or absorb energy from the surrounding environments to compensate for heat imbalances resulting from the fact that breaking of bonds between the hygroscopic compound and water molecules are often stronger than the bonds formed between water molecules in liquid water in the condensation chamber. Furthermore, hygroscopic compounds heat up as they absorb/adsorb humidity from the atmosphere, and the vacuum chamber can then also act as a heat sink to remove this excess energy.

Vacuum Pump

Conventional vacuum pumps generally require oil, which requires maintenance and can introduce contaminants into the water produced. In various embodiments, to reduce maintenance, the vacuum is generated by replacing the air in the vacuum chamber with steam and subsequently cooling the steam as described below. A multi-stage peristaltic pump can also be used, or a multi-stage oil free vacuum pump system such as diaphragm pumps can be used. Conventional industrial vacuum pumps that require oil can be used to generate the vacuum in the vacuum chamber for larger AWGs.

Water Vapor Compression Pump

In order to sustain the vacuum in the evaporation chamber so that the hygroscopic compound will continue to release water, and to sustain the condensation of the water in the condensation chamber, a water vapor compression pump must be implemented between the evaporation chamber containing the hygroscopic material and the condensation chamber. The most efficient means of compression high amounts of water vapor are often through centrifugal pumps or blowers. This compressor must run at high speeds to compress large amounts of vapor. Oil ball bearings cannot often be used in the compressor, as they will lock up over time due to the outgassing of oil under a vacuum chamber. Therefore, ceramic or magnetic high speed ball bearings can be implemented into the centrifugal water vapor compression pump of an ideal embodiment.

Water Vapor Compression Pump Motor

In various embodiments, the motor that runs the water vapor compression pump is placed outside of the vacuum chamber. If the motor that runs the water vapor compression pump is a general DC brushed or brushless motor, the motor cannot be placed inside the vacuum chamber. This is for two prominent reasons. The first is that, inside a vacuum, there is no air to circulate the motor and cool it down, which would cause it to overheat and/or burn out. Motors are also less efficient when hot. The second reason is that virtually all DC motors are lubricated with oil. Inside a vacuum chamber, the lubricating oil will partially evaporate over time through outgassing and leave behind a sludge of residue that would prevent the motor from running correctly. Similar issues occur with oil ball bearings. Vacuum rated motors that address these issues are often expensive and engineered for use in space. For this reason, the motor must be placed outside of the vacuum chamber, and transfer its torque to the inside of the vacuum chamber to run the water vapor compression pump. This can be done with magnets. Spinning pairs of magnets on the motor outside of the vacuum chamber can spin pairs of magnets inside of the vacuum chamber and thereby transfer the torque of the motor. It can be noted that if the water vapor compression pump is located outside of the vacuum chamber, and is connected to an inlet or outlet to the vacuum chamber, that the motor can be connected directly to the pump and also placed outside of the vacuum chamber.

Heat Transfer Chamber

In various embodiments, the AWG includes a tube, set of rows of layered round heatsinks, plates, tubes, channels, or any similar form of high surface area such that one side of the system is coated in the hygroscopic compound of choice, and the other side is not. Both sides are separate environments, capable of holding different pressures.

In further various embodiments, this heat transfer chamber occurs with the evaporation chamber coated in the hygroscopic compound and the condensation chamber sharing one or more metal walls with the evaporation chamber. Metals such as aluminum and copper provide high heat transfer coefficients, allowing temperatures to rapidly diffuse. Increasing the surface area in contact between the evaporation and condensation chambers will increase the speed at which the hot and cold temperatures neutralize. Furthermore, increasing the surface area of the hygroscopic compound will accelerate the rate at which water can absorb and desorb from the material. During the reactivation step where water is released from the hygroscopic compound and compressed into the condensation chamber, the surfaces coated with the material will cool with it. As water favors condensation at lower temperatures, the water in the condensation chamber will favor condensation on the walls connected to the evaporation chamber once 100% relative humidity is achieved by the vapor compression pump.

In various embodiments, this heat transfer system is created with high surface area aluminum or copper parts. The evaporation chamber and condensation chamber can be connected as simple as a single wall. The shape and connection of these chambers can be modified to increase the heat transfer. Possible designs include but are not limited to: circular heat sinks, with the outer fins of the heat sink coated in the hygroscopic material and the center tube being the condensation chamber; tubing, with the outside of the tubing being coated in the hygroscopic material, and the inside of the tube being the condensation chamber; stacked plates that form individual thin chambers, and oscillating between layers of evaporation and condensation chambers.

Once a vacuum is created, water is released from the saturated hygroscopic material to maintain "critical relative humidity." In various embodiments, the "critical relative humidity" is defined as the lowest relative air humidity at which the hygroscopic compound remains a dehumidifier. At a humidity level below this point, the hygroscopic compound is forced to release its stored water, becoming a humidifier until the critical relative humidity required is re-established. This allows for water vapor to continuously be pulled from the hygroscopic compound until it is fully regenerated and dry, as the water vapor compression pump will continue to lower the pressure in the evaporation chamber below the "critical relative humidity." For example, calcium chloride becomes a humidifier at below around 30 percent relative humidity. For MOF-303, this value is below around 10 percent relative humidity. These values can change depending on the pressure and temperature of the system. These values tend to increase while under a vacuum, making water extraction from the hygroscopic material easier.

In various embodiments, pressure is used to release water from the hygroscopic compound and compress the water vapor into liquid water on the inside of the condensation chamber, condensation tube, or other side of the evaporation chambers plates, allowing for a high heat transfer. Water absorbs energy when evaporating, and releases significant heat energy when condensing. This system allows the heat to flow through the system from hot to cold areas, conserving heat energy and creating a highly efficient AWG. In an ideal embodiment of the device, the only sources of energy needed to produce water is the energy to create the initial vacuum and the energy to run the water vapor compression pump. This removes the need for heating and cooling, the largest consumer of energy in most conventional atmospheric water generators or harvesters. While heating and cooling can be applied in this device to accelerate the rate at which the hygroscopic material gives up water vapor, it would highly reduce the efficiency of the device. However, as described later, devices using dual desiccant technology provide a potentially electricity free means of heating and cooling.

Single Desiccant Heat Transfer Chamber

Figure 3:
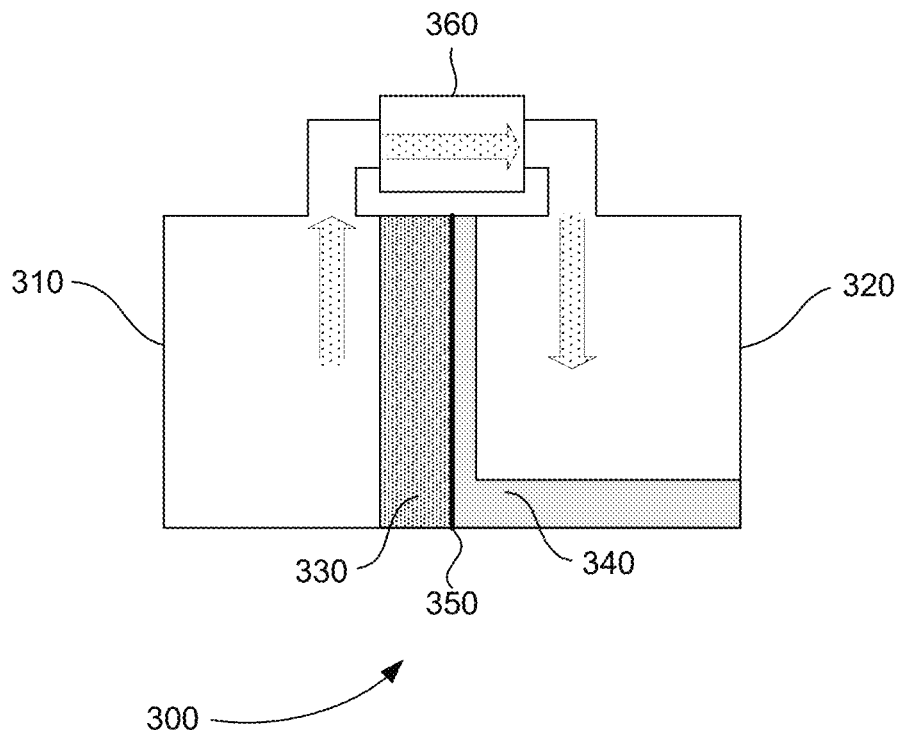
FIG. 3 is an exemplary diagram showing a single hygroscopic material, a vacuum chamber, a water vapor compression pump, and a simplified heat transfer chamber, in accordance with various embodiments.

FIG. 3 is an exemplary diagram 300 showing a saturated hygroscopic material, a vacuum chamber, a water vapor compression pump, and a simplified heat transfer chamber, in accordance with various embodiments. In FIG. 3, a vacuum is created in evaporation chamber 310 and condensation chamber 320, lowering the boiling point of the water trapped in the hygroscopic material 330 and releasing humidity.

Water vapor compression pump 360 reduces the humidity below the critical relative humidity level of hygroscopic material 330 in vaporization chamber 310 by pumping water vapor from vaporization side 310 of the vacuum chamber to condensation side 320 of the vacuum chamber. Below the critical relative humidity level, hygroscopic material 330 becomes a humidifier, and forces the humidity to increase.

Vacuum pump 360 also pressurizes the water vapor in condensation side 320 of the vacuum chamber, where the water vapor condenses at 100% humidity.

In FIG. 3, the heat transfer flows from the condensation chamber 320 to the evaporation chamber 310 via the simplified heat transfer wall 350. On the vaporization side 310 of the heat transfer chamber, surface 350 is coated with hygroscopic material 330. No coating is applied to surface 350 on the condensation side of the heat transfer system.

Surface 350 conserves heat energy by transferring heat generated from condensation side 320 to make up for the heat lost on vaporization side 310 of the vacuum chamber. Most simply, the heat lost in hygroscopic material 330 due to evaporation is significantly returned due to the thermal conductivity of surface 350. Note that since the heat energy generated on one side of surface 350 needs to closely match the heat lost on the other side of surface 350, the shape of surface 350 may need to vary and the amount of hygroscopic material 330 may need to vary from that shown in FIG. 3. If the condensing water does not produce enough heat compared to the heat lost by evaporation, excess heat can be siphoned in from the surrounding environment. L. Likewise, if the condensing water somehow produced more heat than is lost by the evaporation chamber, then the excess heat can be dissipated to the surrounding environment.

If the heat gained through condensation matches the heat lost through vaporization, then the only energy used by the system shown in FIG. 3 is the energy consumed by the initial vacuum pump and the water vapor compression pump. This provides a significant energy saving over conventional AWGs.

In various alternative embodiments, the temperature of hygroscopic material 330 can be raised to promote the release of water, but this will increase overall temperature, increasing pressure and energy requirements. This can also increase the speed of the vaporization cycle.

Figure 4:
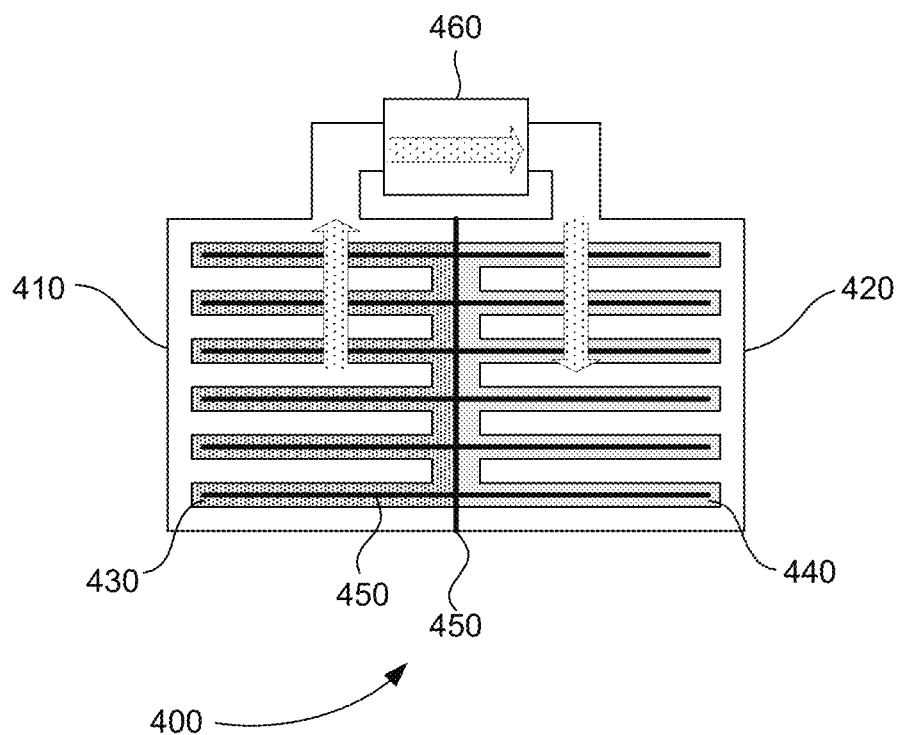
FIG. 4 is an exemplary diagram showing a single hygroscopic material, a vacuum chamber, a water vapor compression pump, and a more developed heat transfer chamber, in accordance with various embodiments.

FIG. 4 is an exemplary diagram 400 showing a simplified single desiccant heat transfer chamber, in accordance with various embodiments. This diagram is similar to FIG. 3, but includes a more developed heat transfer system. The entire system is placed under a vacuum as before. Chamber 410 is the evaporation chamber containing hygroscopic material 430, and chamber 420 is the condensation chamber containing condensed water 440. Heat transfer plates 450 allow heat energy to flow deeper into each chamber and increase the efficiency of the device. The heat transfer wall 450 consists of a single vertical wall that divides the system into two separate chambers, 410 and 420, and consists of several fins coming out on both sides of the plate.

On the side where these fins reach into chamber 410, they are coated with the hygroscopic material 430. On the condensation side, these fins are left uncoated to promote the condensation of liquid water onto these fins. These fins ideally would be made out of aluminum, copper, or another metal with high heat transfer properties.

In this system, hygroscopic material 430 would initially be exposed to the atmosphere to become saturated as is assumed with all variants of this device, and then chamber 410 would be sealed from the atmosphere, where a vacuum would be pulled. Then, the hygroscopic material would release water vapor, where it would be compressed through the channel, one way valve, and/or water vapor compression pump 460, where the water vapor flows into chamber 420 and reaches 100% relative humidity and condenses into liquid water 440.

Figure 5:
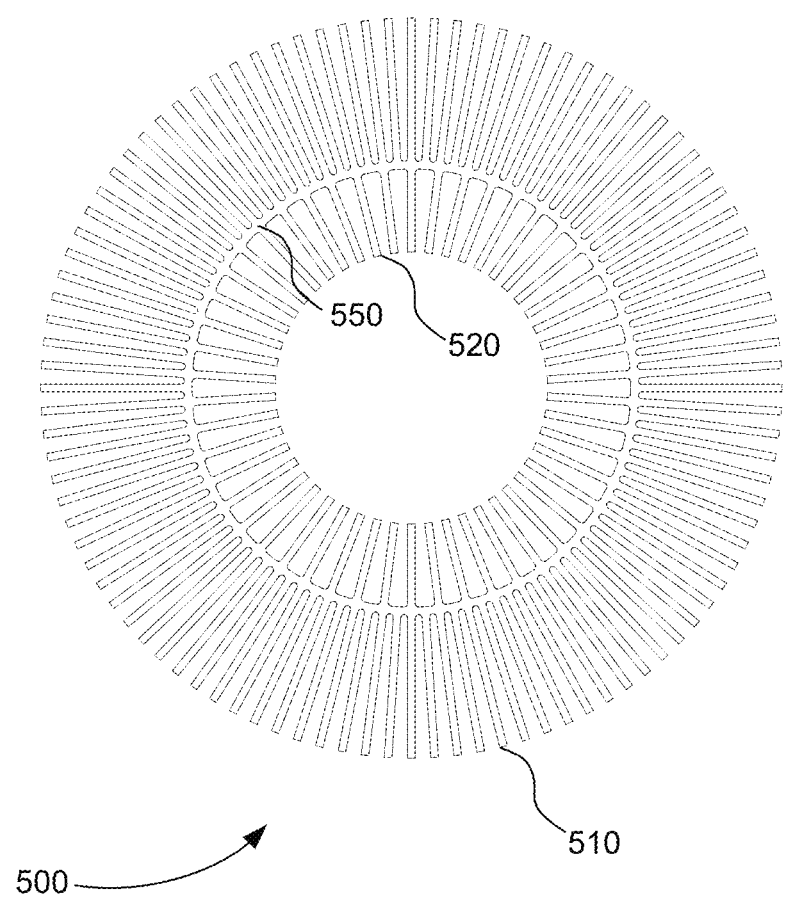
FIG. 5 is an exemplary diagram showing a round heat transfer chamber of a single desiccant AWG consisting of outer and inner fins, in accordance with various embodiments.

FIG. 5 is an exemplary diagram 500 showing a round heat transfer chamber of a single desiccant AWG consisting of outer and inner fins, in accordance with various embodiments. Outer fins 510 are connected thermodynamically to the inner fins 520 via the heat transfer surface 550.

Figure 6:
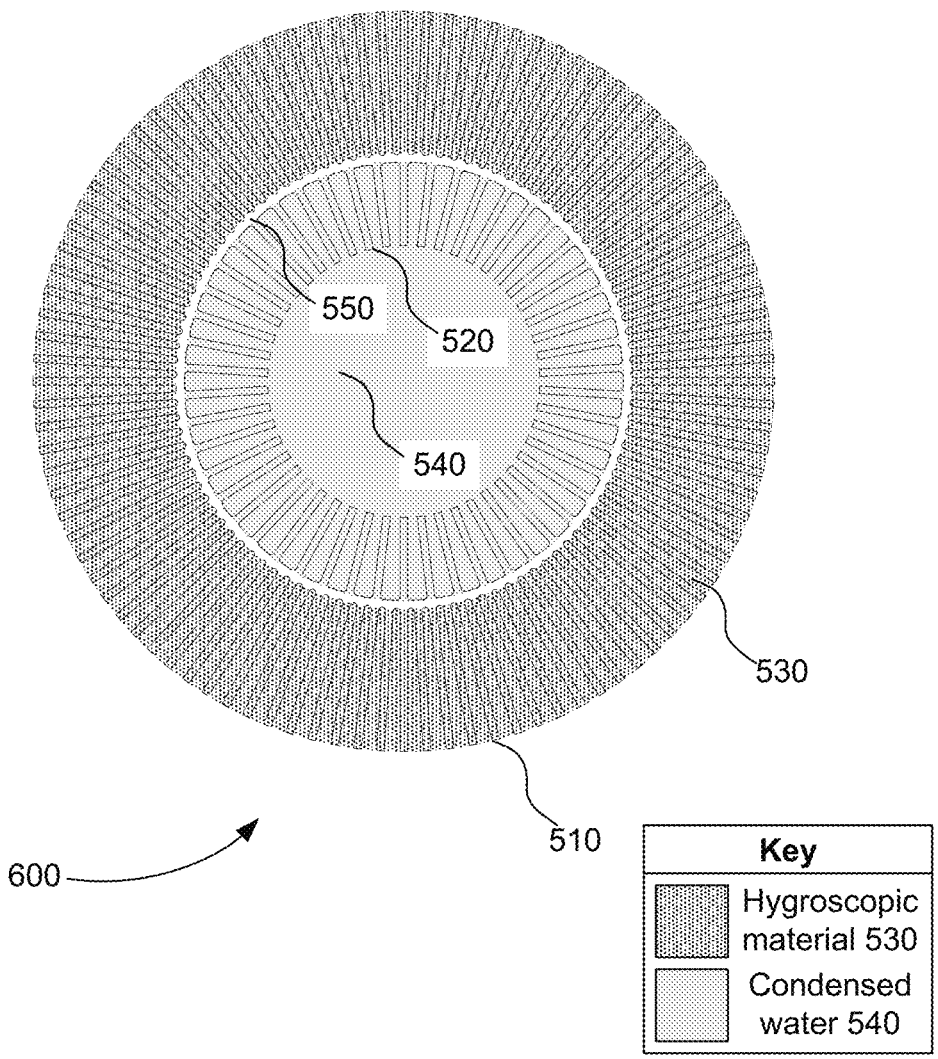
FIG. 6 is an exemplary diagram showing a hygroscopic material coating the fins on the outside of a round heat transfer chamber for a single desiccant AWG and water coating the inside of the fins of the heat transfer chamber, in accordance with various embodiments.
Figure 7:
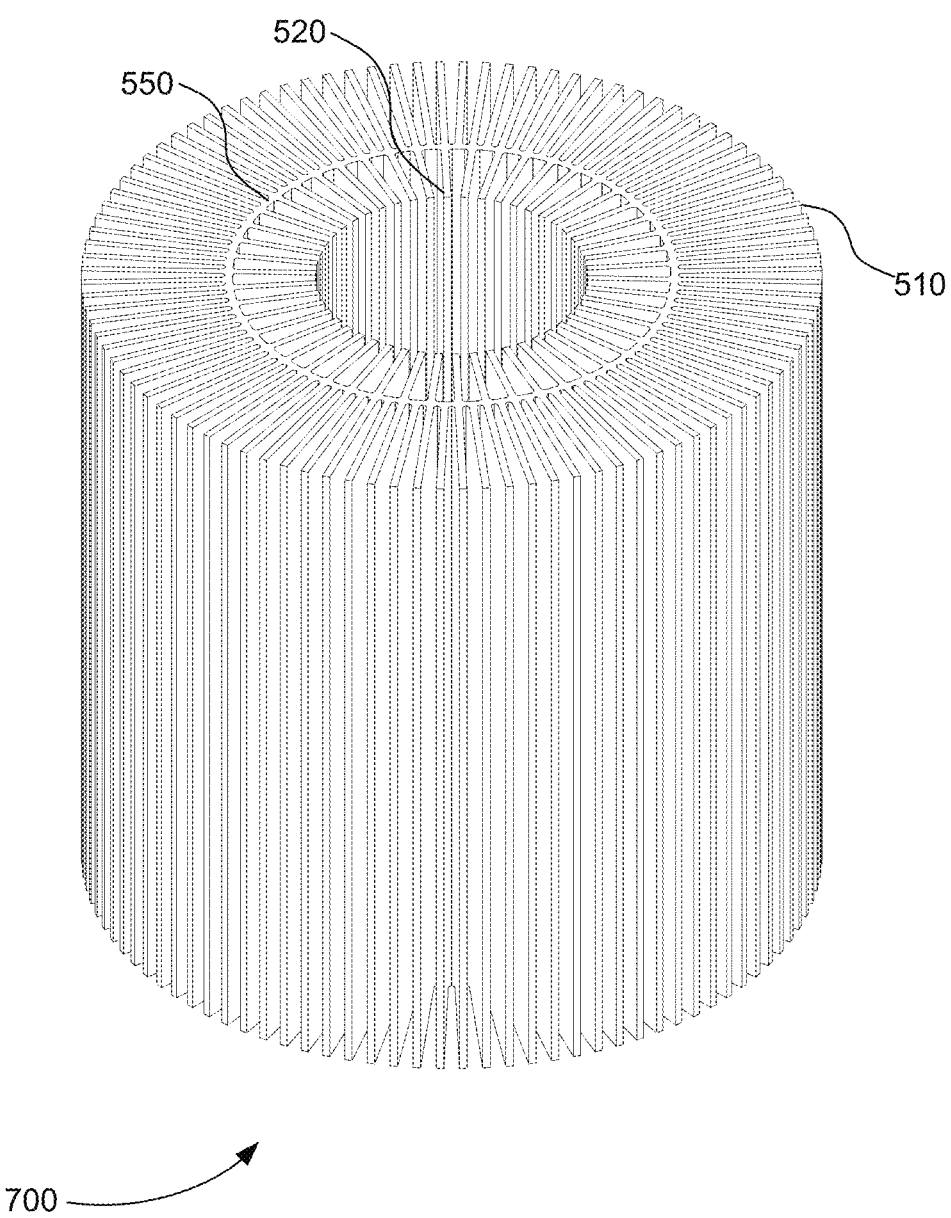
FIG. 7 is an exemplary diagram showing a three-dimensional view of a round heat transfer chamber for a single desiccant AWG, in accordance with various embodiments.

FIG. 6 is an exemplary diagram 600 referencing the same heat transfer chamber as seen in FIG. 5, but includes hygroscopic material 530 that coats fins 510, in accordance with various embodiments. When this heat transfer system is used in a single desiccant AWG, the water 540 would condense onto the inside of the heat transfer chamber onto fins 520. Heat released due to condensation thus flows through surface 550. FIG. 7 is an exemplary diagram 700 that provides a three dimensional view of system 700 which includes the heat sink backbone of the chambers as seen in FIG. 5, in accordance with various embodiments.

Figure 8:
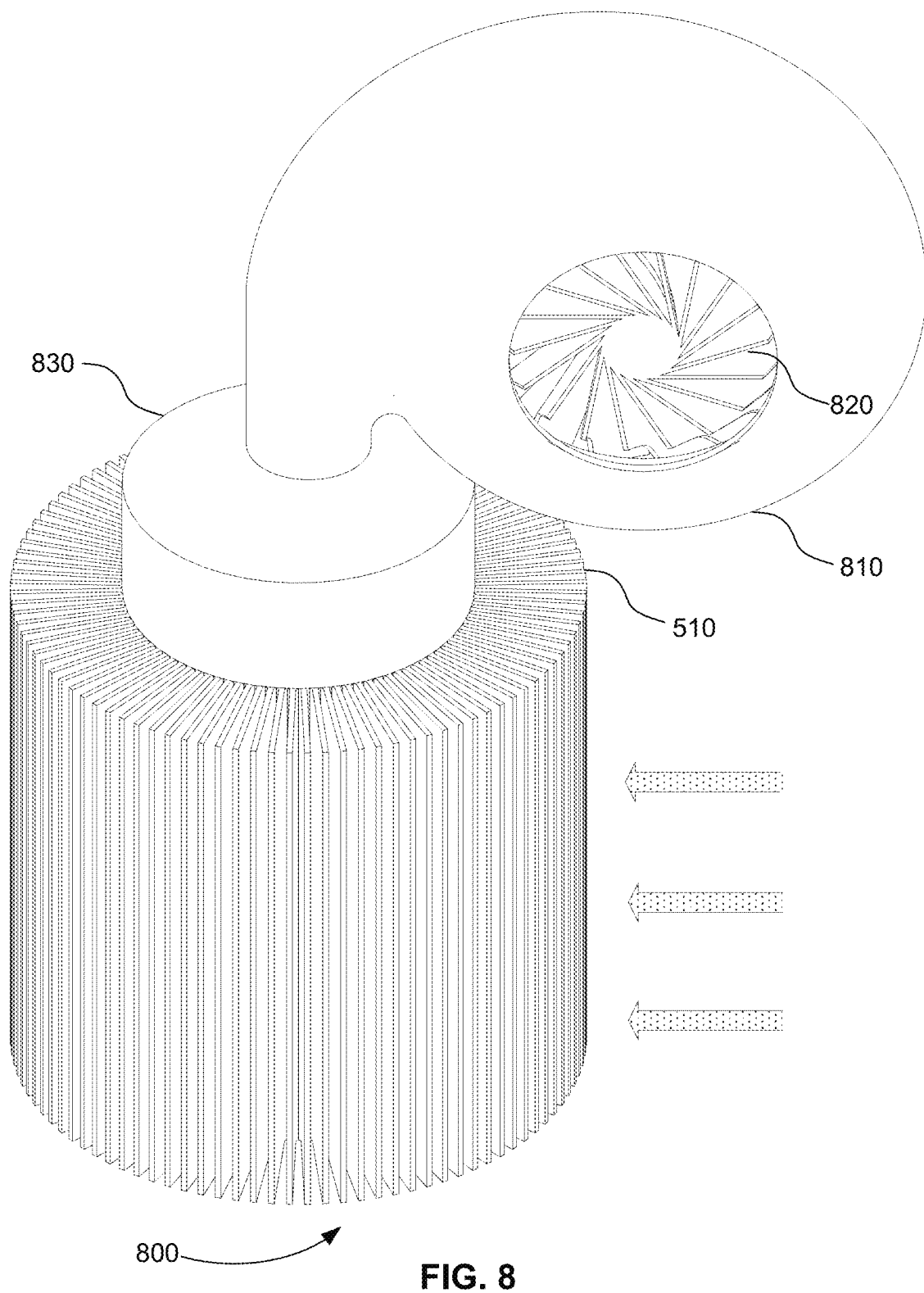
FIG. 8 is an exemplary diagram illustrating the absorption of water from the surrounding atmosphere by a hygroscopic material coating the outside of a round heat transfer chamber of a single desiccant AWG, and an inactive centrifugal pump, in accordance with various embodiments.

FIG. 8 is an exemplary diagram 800 that demonstrates the use of the same heat transfer chamber seen in the previous FIG. 5, with the addition of a water vapor centrifugal compression pump 810, and the pump blades 820, along with cap 830 to allow pressure to build inside the chamber, in accordance with various embodiments. In FIG. 8, the water vapor compression pump is not activated, and the chamber is exposed to the atmosphere where hygroscopic material coating fins 510 is allowed to absorb water from the atmosphere. Note that for clarity purposes the hygroscopic material is not shown coating fins 510, but would have a similar placement as seen in FIG. 6.

Figure 9:
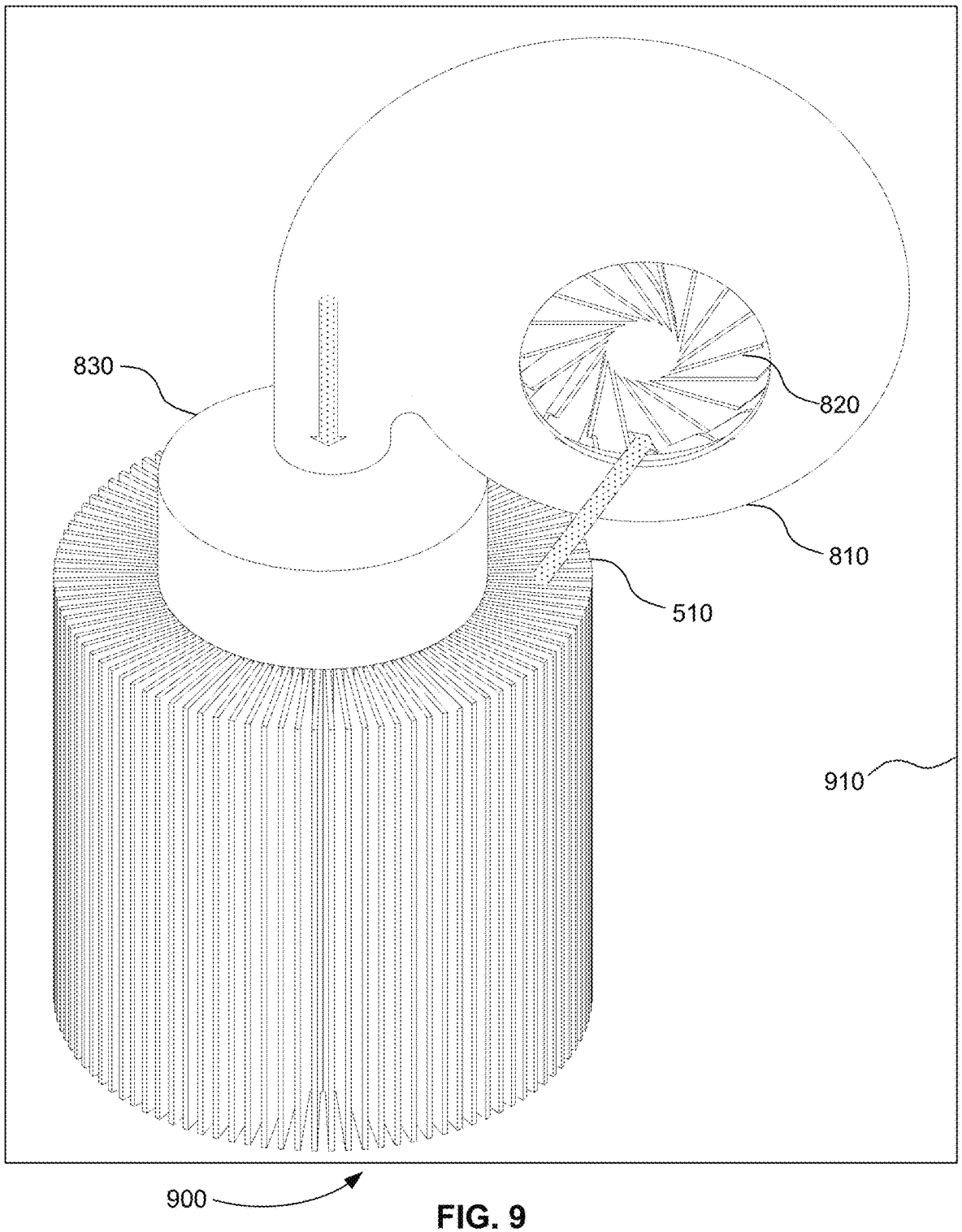
FIG. 9 is an exemplary diagram illustrating the desorption of water from a hygroscopic material coating the outside of a round heat transfer chamber of a single desiccant AWG, and the compression of the released water vapor via a centrifugal pump inside of a vacuum chamber, in accordance with various embodiments.

In FIG. 9, an exemplary diagram 900 detailing the same system as FIG. 8 is present, this time inside of a vacuum chamber 910, in accordance with various embodiments. A vacuum is created, and the water that was absorbed by the hygroscopic material coating fins 510 is released and flows through pump 810 across blades 820 and compressed through cap 830 into the center of the heat transfer chamber. L. Liquid water is then formed inside of the chamber and can be collected and utilized.

Figure 10:
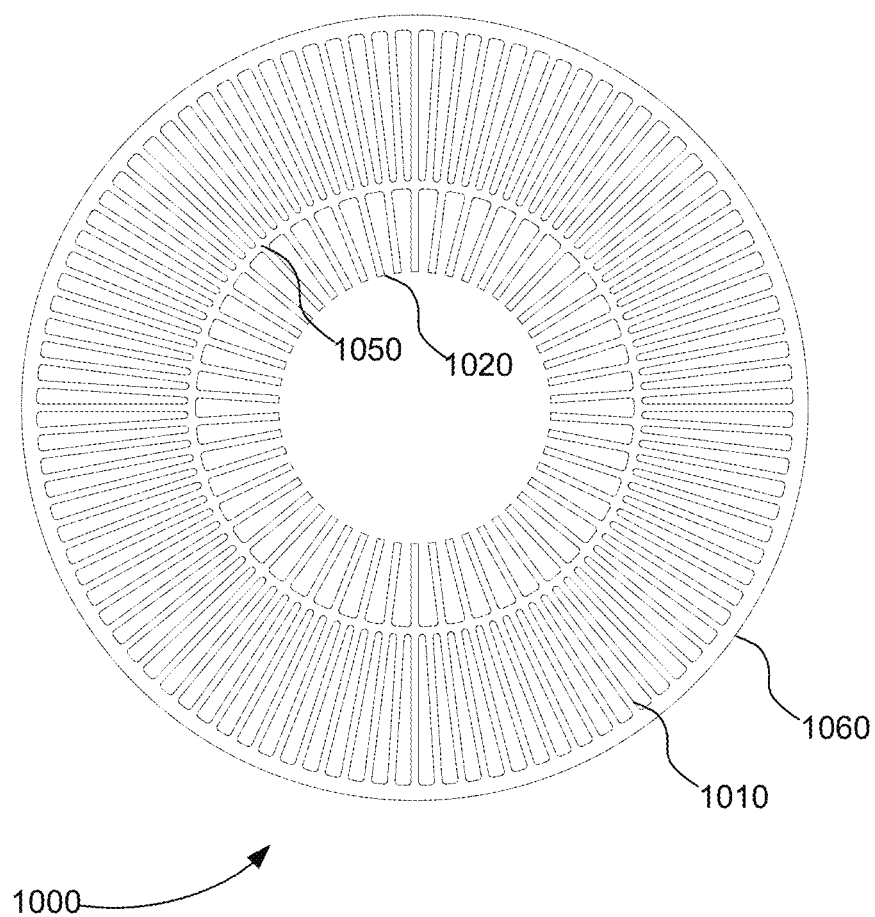
FIG. 10 is an exemplary diagram showing a round heat transfer chamber of a single desiccant AWG consisting of outer fins, inner fins, and a built in vacuum chamber, in accordance with various embodiments.

In FIG. 10, exemplary diagram 100, the same heat transfer chamber seen previously is developed with the addition of an outer ring serving as a built-in vacuum chamber, in accordance with various embodiments. Shown are the inner condensation fins 1020, the outer evaporation fins 1010 that would be coated with a hygroscopic material, a heat transfer surface 1050, and an outer ring 1060. This outer ring again serves as a built-in vacuum chamber for the device. The fins provide structure and support, meaning that this exterior wall would not have to be extremely thick. By adding the vacuum chamber as a built-in feature, the entire part can be made for example out of a single aluminum extrusion.

Figure 11:
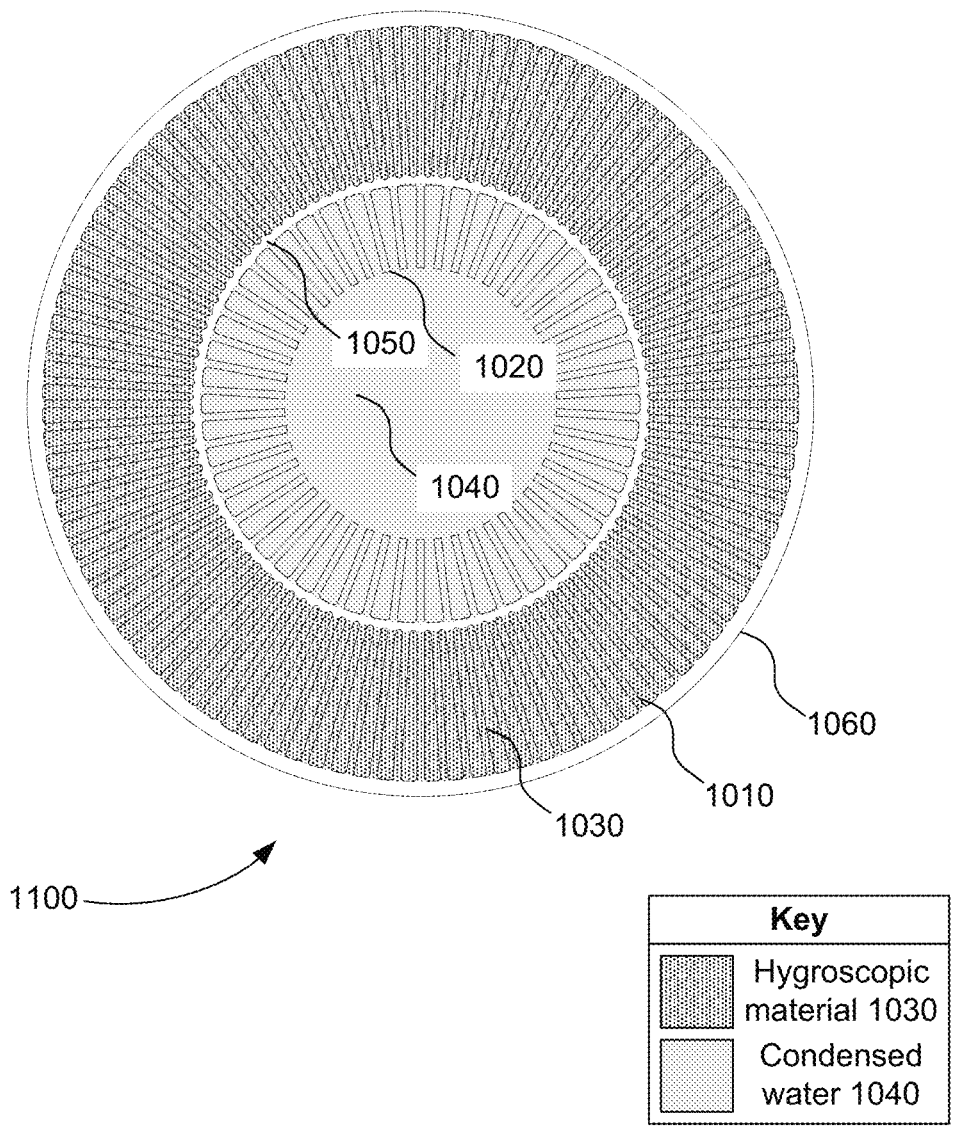
FIG. 11 is an exemplary diagram showing a round heat transfer chamber of a single desiccant AWG consisting of a hygroscopic material coating the outer fins, condensed water coating the inner fins, and a built in vacuum chamber, in accordance with various embodiments.
Figure 12:
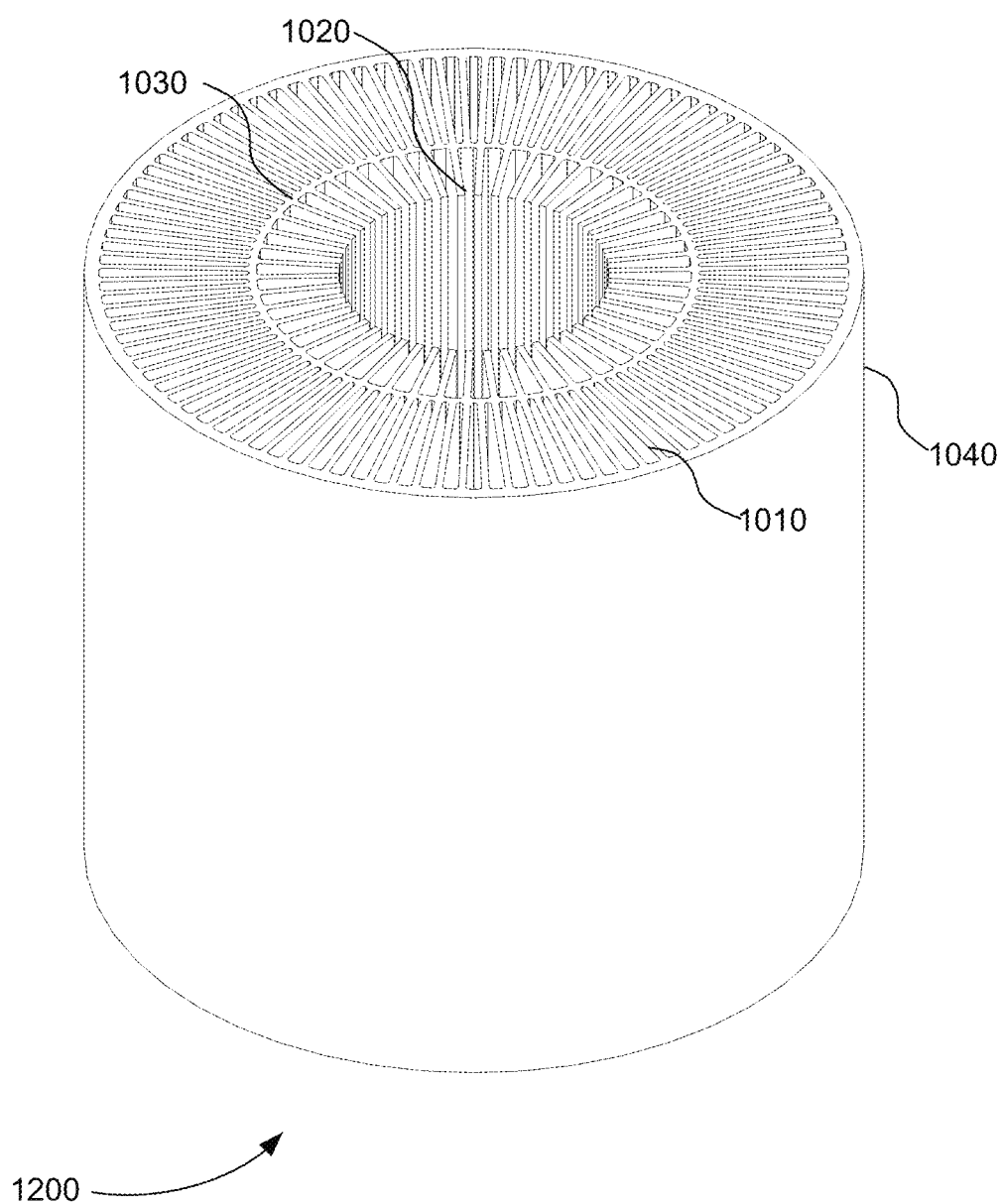
FIG. 12 is an exemplary diagram showing a three-dimensional view of a round heat transfer chamber with a built-in vacuum chamber for a single desiccant AWG, in accordance with various embodiments.

FIG. 11 is an exemplary drawing 1100 that develops on FIG. 10, with the addition of the placement of the hygroscopic material 1030 on the outer fins 1010, and the demonstration of where water 1040 would condense on the inner fins 1020, in accordance with various embodiments. FIG. 12 is an exemplary drawing 1200 that shows a three-dimensional view of this system, without the coating of hygroscopic material on the outer ring for clarity purposes, in accordance with various embodiments.

Figure 13:
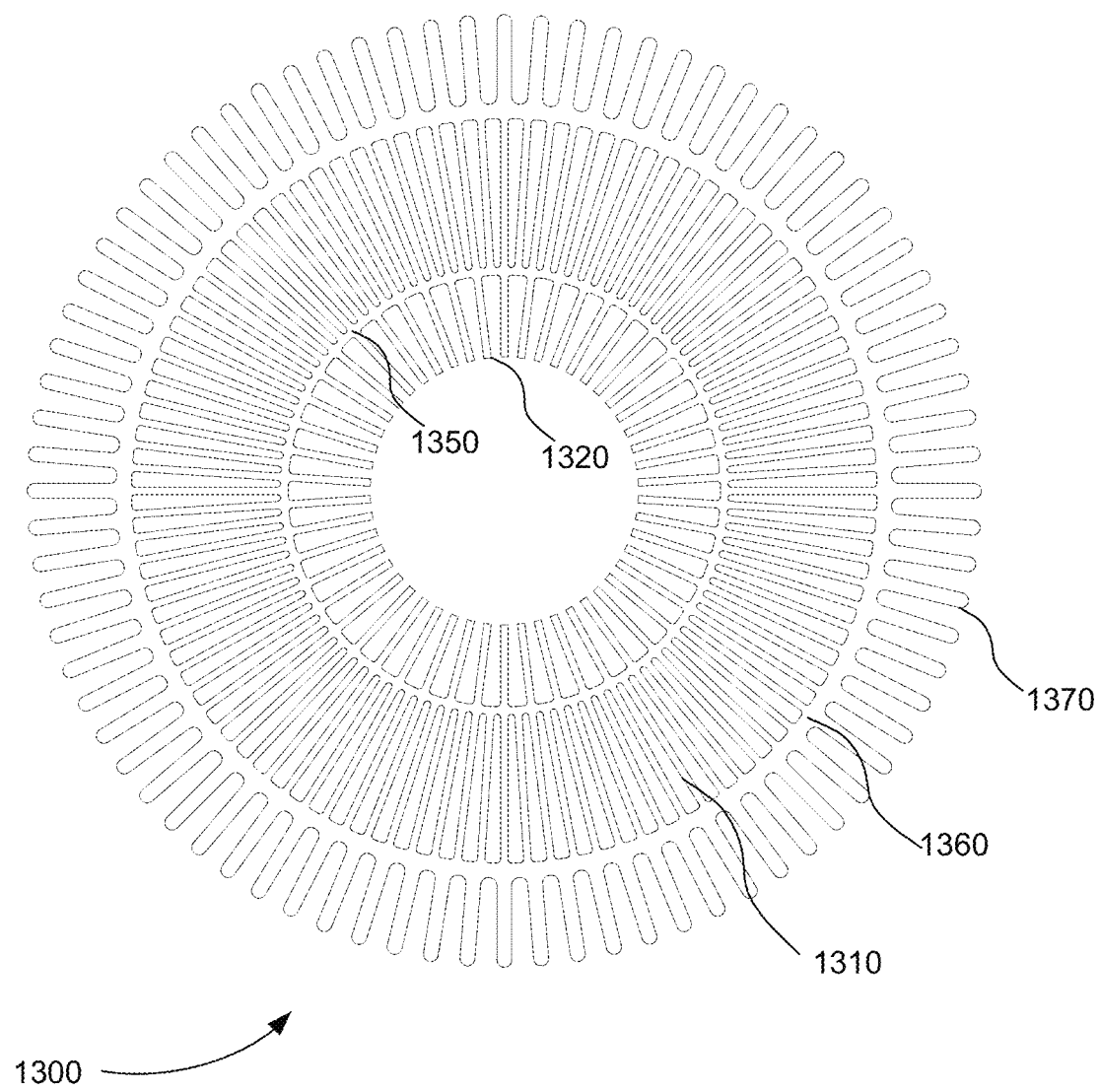
FIG. 13 is an exemplary diagram showing a round heat transfer chamber of a single desiccant AWG consisting of heat dissipating outer fins, middle fins, inner fins, and a built in vacuum chamber, in accordance with various embodiments.

In the exemplary drawing 1300 present in FIG. 13, a similar image seen in FIG. 10 is presented, with the addition of another exterior layer of fins, in accordance with various embodiments. The middle fins 1310 are where hygroscopic material would coat, the inner fins 1320 are where water would condense, heat would flow through surface 1350, and exterior ring 1360 is the vacuum chamber.

Because the heat released from the condensation of liquid water inside the chamber does not directly equal the amount of heat energy lost due to evaporation of water from the hygroscopic material, there is likely to be a slight change in temperature from the surroundings. Often, the bonds between water molecules and the hygroscopic material are stronger than the bonds between two water molecules. For this reason, the amount of heat lost from the hygroscopic material is often greater than the amount of heat gained from the condensation of liquid water. This will cause the overall temperature of the system to go down. Extra energy is provided in one form by the compression of the water vapor, which takes energy and increases temperature. However, should this not be enough, extra heat energy can be provided by the surrounding environment and flow through the air through the exterior fins 1370 and throughout the heat transfer chamber.

Figure 14:
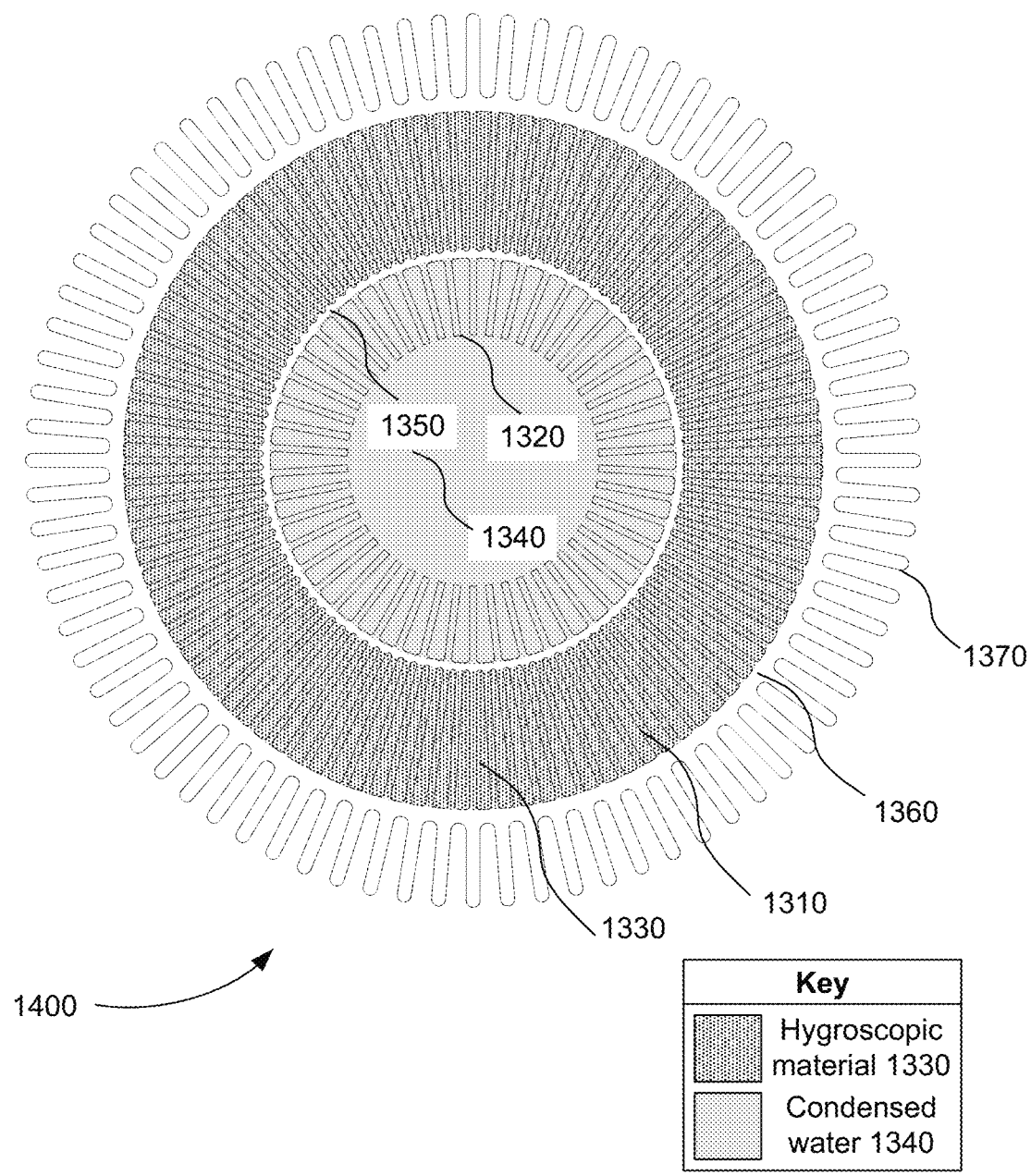
FIG. 14 is an exemplary diagram showing a round heat transfer chamber of a single desiccant AWG consisting of uncoated outer heat dissipating fins, a hygroscopic material coating the middle fins, condensed water coating the inner fins, and a built in vacuum chamber, in accordance with various embodiments.
Figure 15:
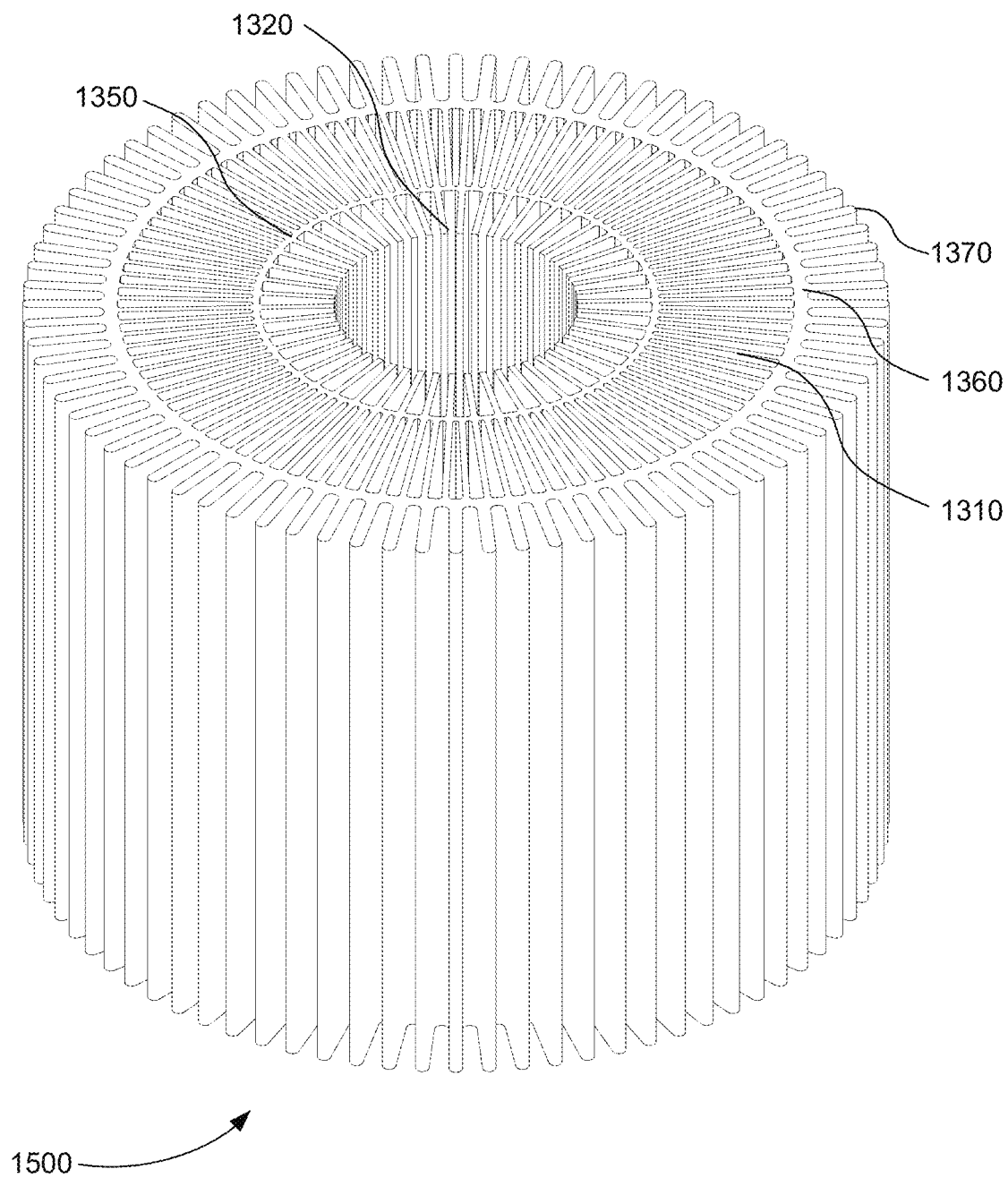
FIG. 15 is an exemplary diagram showing a three-dimensional view of a round heat transfer chamber for a single desiccant AWG with a built-in vacuum chamber and exterior heat dissipating fins, in accordance with various embodiments.

FIG. 14 is an exemplary drawing 1400 that details the addition of hygroscopic material 1330 and condensed water 1340 over the image in FIG. 13, in accordance with various embodiments. FIG. 15 is an exemplary drawing 1500 that details the three-dimensional view of this system, once again without showing the hygroscopic material for clarity purposes, in accordance with various embodiments.

Figure 16:
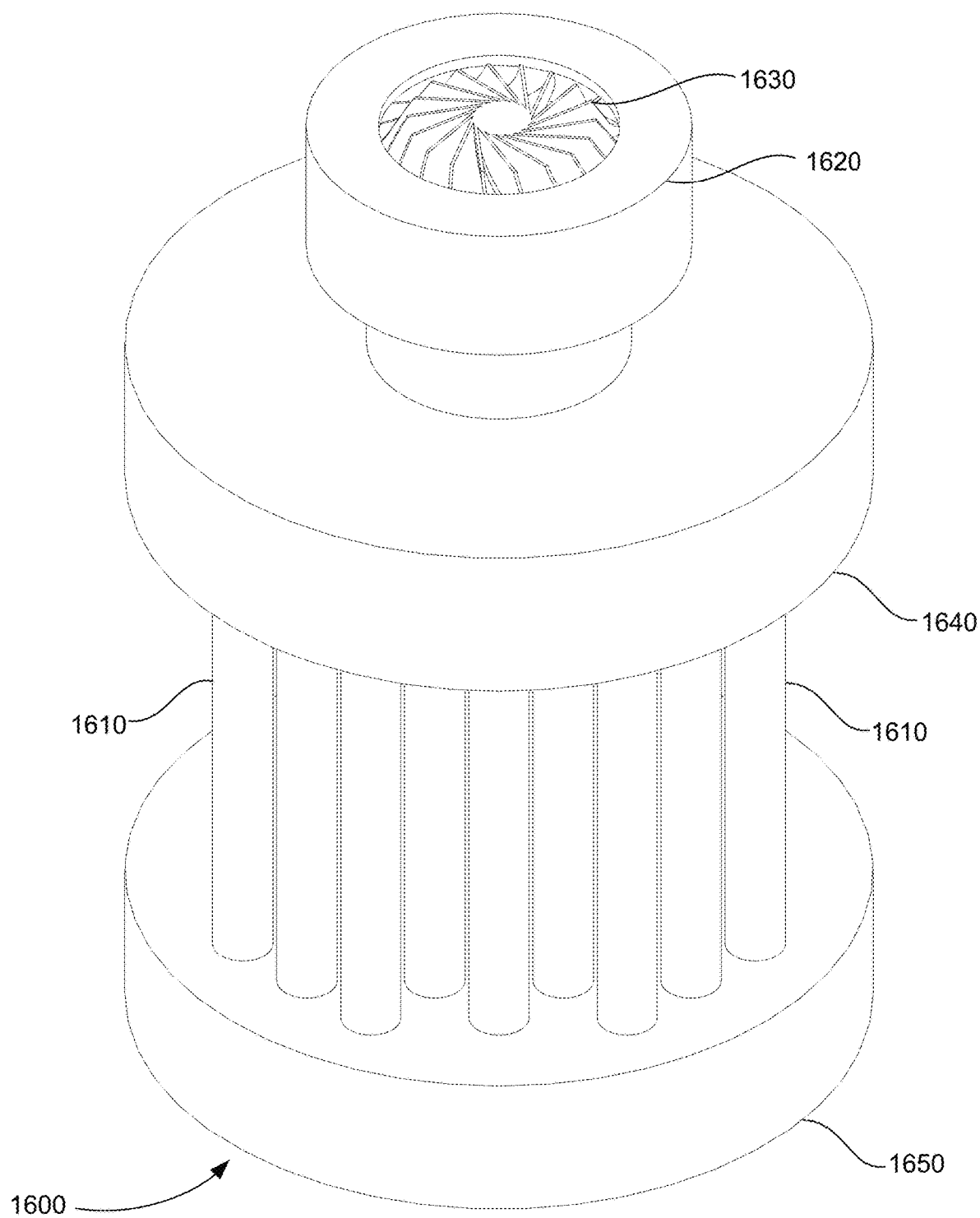
FIG. 16 is an exemplary diagram illustrating the heat transfer system of a single desiccant AWG utilizing a series of tubes that would be coated with a hygroscopic material and a vapor compression pump that condenses water inside of the tubes, in accordance with various embodiments.

FIG. 16 is an exemplary drawing 1600 that details an example of a different design of a heat transfer chamber of a single desiccant AWG containing tubes, in accordance with various embodiments. In this model, several tubes 1610 are coated on the exterior with a hygroscopic material, and left uncoated on their interior. This device when exposed to the atmosphere would absorb water from humidity into the hygroscopic material coating the tubes 1610. Then, this device would be placed inside a vacuum chamber and a vacuum would be generated. Water vapor is then released from the hygroscopic desiccant and flows through the water vapor compression pump 1620 via spinning compression blades 1630. The water vapor then enters chamber 1640, which connects the end of the compression pump to the interior of all of the tubes. Water is able to condense inside of the tubes 1610 and transfer heat energy to the outside of the tubes where the hygroscopic material is located. The water then drips down these tubes and fills reservoir 1650.

Figure 17:
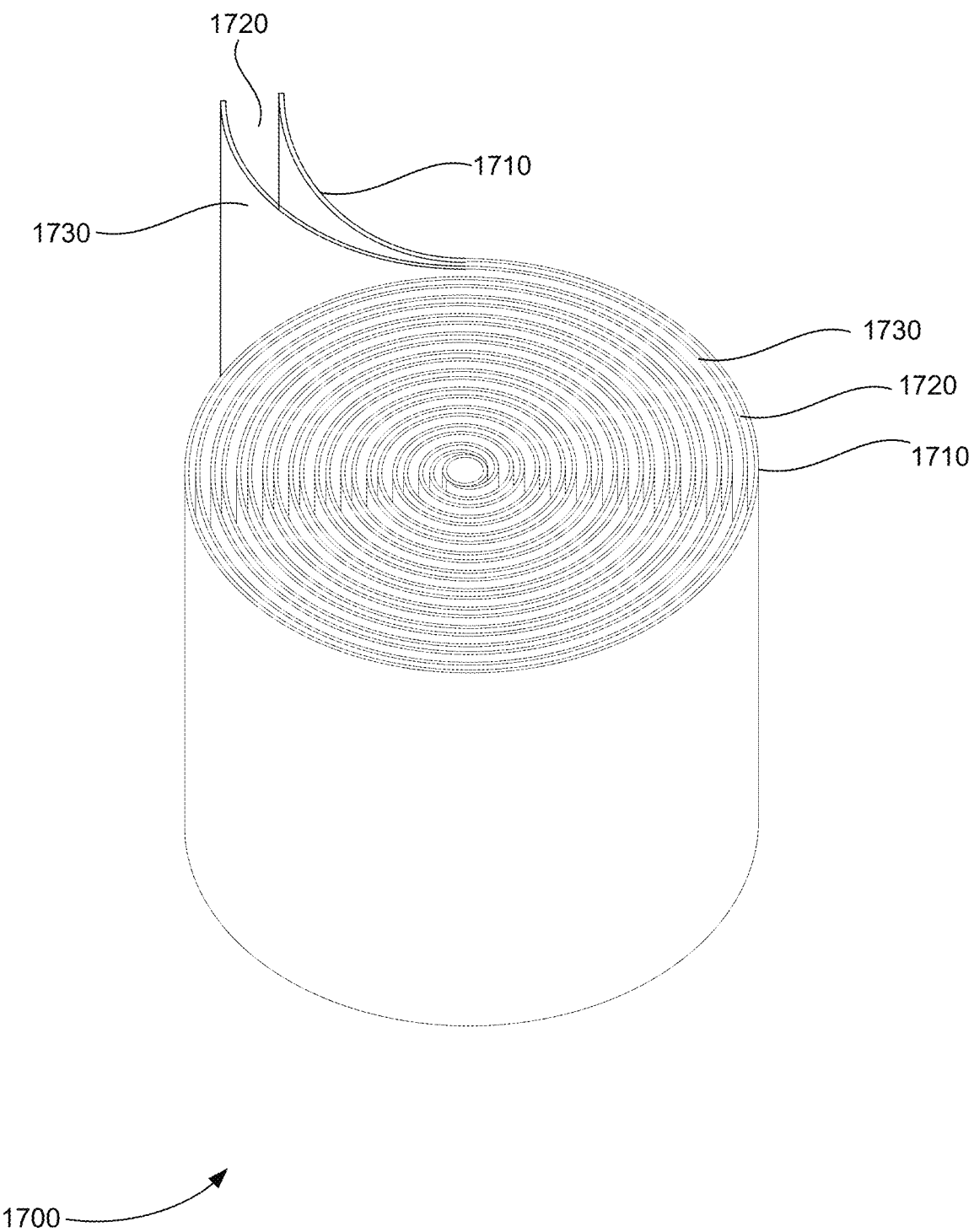
FIG. 17 is an exemplary diagram showing the system for conserving energy as a coiled tube or channel for a heat transfer system of a single desiccant AWG, in accordance with various embodiments.

FIG. 17 is an exemplary drawing 1700 that details another example of a possible design for the heat transfer system of a single desiccant atmospheric water generator using spiraling chambers, in accordance with various embodiments. In this design, two sheets 1710 and 1730 are coiled into a roll. On one side of these sheets, a hygroscopic material is coated, and the other side of these sheets are left uncoated. Channel 1720 goes in between two of these sheets, with the side of the sheets facing channel 1720 being uncoated, and the other side being coated in the hygroscopic material. A cap would then be placed on top and below this roll, creating two sealed rolled chambers, one which is 1720, and the other is the exterior sides of 1720. Under a vacuum, a water vapor compression pump would pull water out of the spiraling chamber coated in the hygroscopic material, and compress the water vapor into the spiraling condensation chamber 1720. This provides a very high heat transfer. Note that this design does not need to be spiraled, but can also be layered in flat sheets. A spiral was chosen here as it forms a cylinder to maximize volume in a cylindrical vacuum chamber.

Dual Desiccant Heat Transfer Chamber

Figure 18:
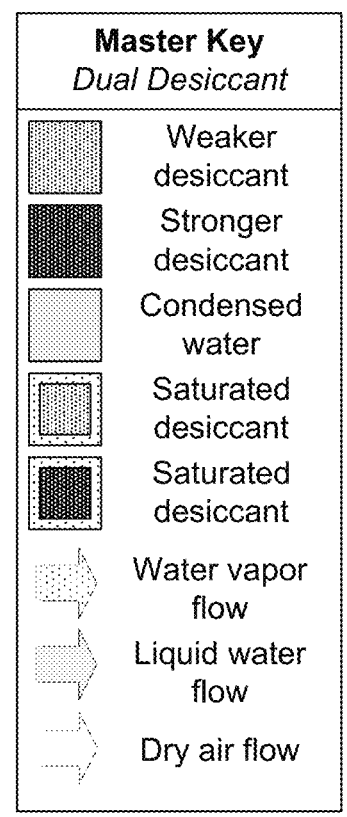
FIG. 18 is a key of information describing symbols seen from FIGS. 19 through 70.
Figure 19:
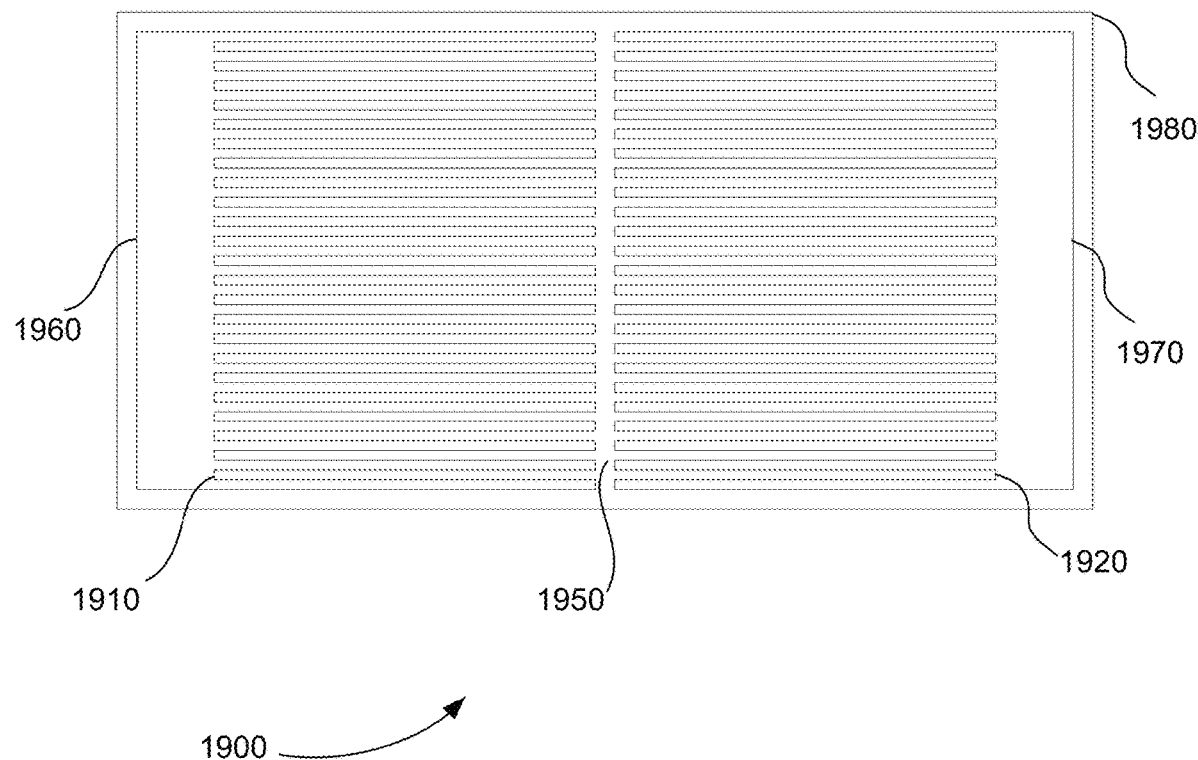
FIG. 19 is an exemplary diagram showing a heat transfer system of a dual desiccant AWG consisting of two chambers of high area heat transfer surfaces, in accordance with various embodiments.
Figure 70:
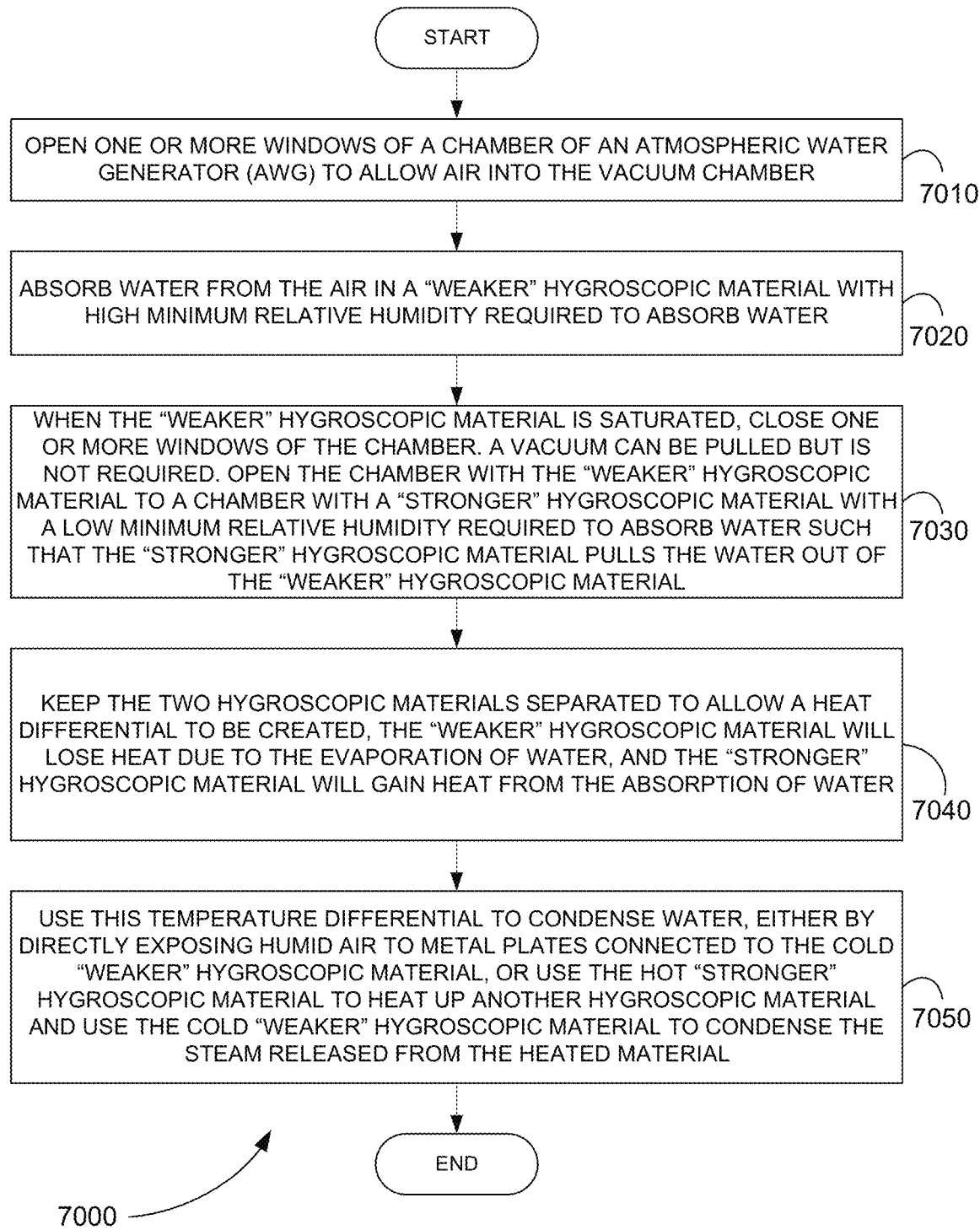
FIG. 70 is a flowchart showing a method for generating liquid water from air via a dual desiccant system, in accordance with various embodiments.

FIG. 18 is an exemplary drawing 1800 that illustrates the key for symbols seen in FIGS. 19 through 70. A lighter dot-shaded surface represents a weaker desiccant, and a darker dot-shaded surface represents a stronger desiccant. The terms weaker and stronger in this instance refer to how low of a relative humidity is the hygroscopic material still able to absorb water from the air or surroundings, or the desiccant "critical relative humidity" as described before. A weak desiccant therefore has a high "critical relative humidity," with a strong desiccant having a low "critical relative humidity." This means that a weak hygroscopic material, for example, is only able to absorb water down to roughly 30% relative humidity. On the other hand, a strong hygroscopic material or desiccant would be able to absorb water down to about 10% relative humidity. Calcium chloride is a weaker hygroscopic material in this sense, with an ability to absorb water down to 30% RH, whereas MOF-303 is a stronger desiccator, with an ability to absorb water down to close to 10% RH. While both compounds have a remarkable ability to absorb high levels of water from the atmosphere, it is rare that two separate hygroscopic compounds are combined in a device. The device described herein utilities this property between the defined weak and strong desiccants. Furthermore in the key, a solid gray surface represents condensed liquid water. A lighter dot-shaded surface in a chamber filled with a very lightly dot-shaded background represents a chamber containing a saturated weak desiccant. A darker dot-shaded surface in a chamber with a very lightly dot-shaded background represents a chamber containing a fully saturated strong desiccant. An arrow with a very light dot-shading represents the flow of water vapor. A solid gray arrow represents the flow of liquid water. Empty or unshaded arrows represent the flow of dry air. The term "dual desiccant AWG" describes this atmospheric water generator that combines the properties of a weak and strong desiccant.

FIG. 19 is an exemplary image 1900 showing the initial layout of a dual desiccant heat transfer system of an AWG, in accordance with various embodiments. In this model, vacuum chamber 1980 encloses two separate chambers 1960 and 1970. In chamber 1960, fins 1910 provide high surface area. In chamber 1970, fins 1920 provide high surface area. In previous examples, a black bar was shown down the middle to represent a heat transfer surface. However, in this diagram, the center bar is not filled in, representing an insulating layer between these two chambers. For instance, the black bar seen in FIG. 3 separating the two chambers is not seen in FIG. 19. Therefore, FIG. 19 contains a non-thermally conductive barrier 1950 between the two chambers.

Figure 20:
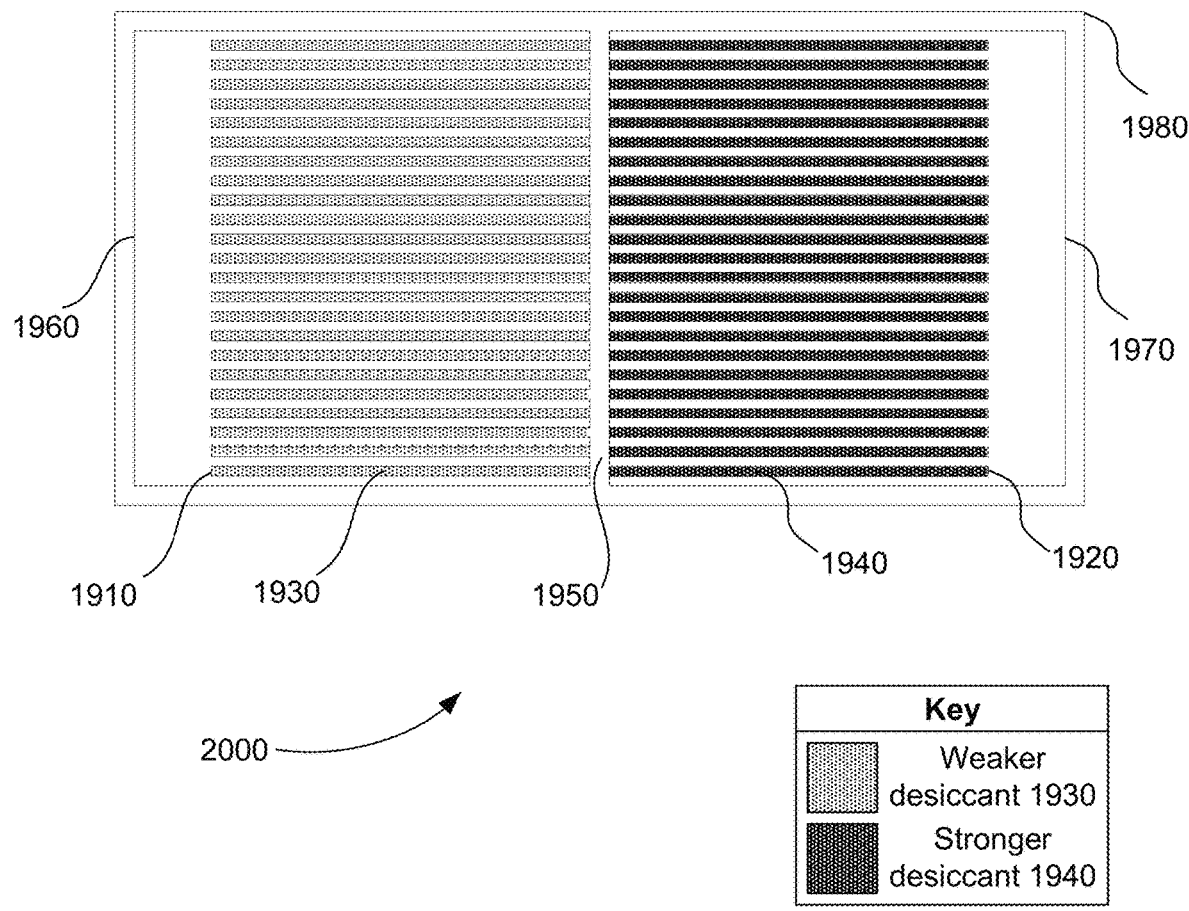
FIG. 20 is an exemplary diagram showing a heat transfer system of a dual desiccant AWG consisting of two chambers of high area heat transfer surfaces, with one chamber coated in a weaker desiccant, and one chamber coated in a stronger desiccant, in accordance with various embodiments.

In FIG. 20, exemplary image 2000, the same system seen in FIG. 19 is present, with the addition of a weaker desiccant 1930 coating fins 1910 of chamber 1960, and a stronger desiccant 1940 coating the fins 1920 in chamber 1970, in accordance with various embodiments. Again, the surface 1950 is insulating and does not conduct heat between the weaker or strong desiccants. Both the weak and strong desiccants are dry at this point and have not absorbed water.

Figure 21:
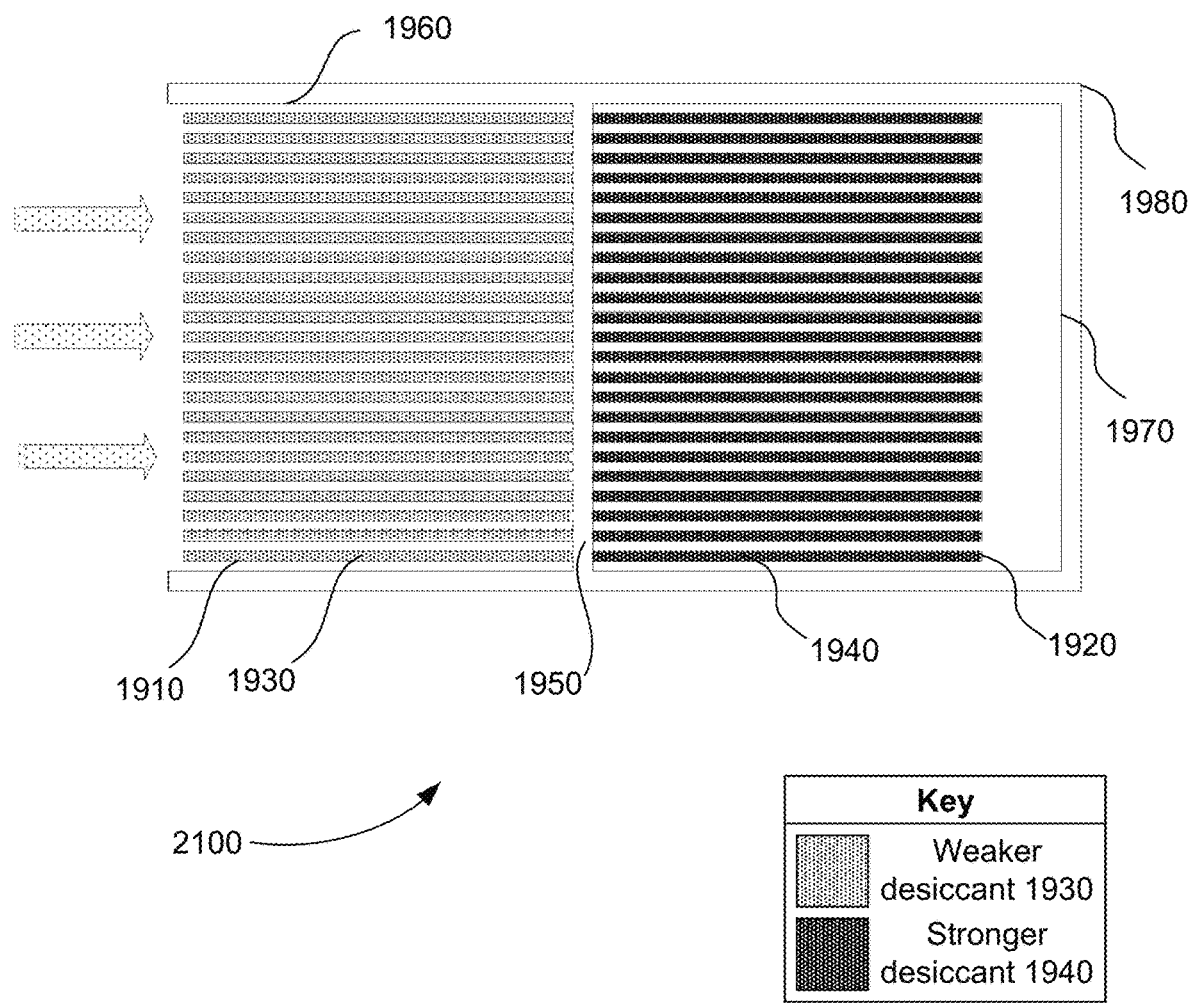
FIG. 21 is an exemplary diagram of a heat transfer system of a dual desiccant AWG consisting of two chambers, with the chamber coated in the weaker hygroscopic material open to the atmosphere, in accordance with various embodiments.

FIG. 21 is an exemplary image 2100 that illustrates the same device as FIG. 20 is shown in a step where the chamber 1960 containing fins 1910 coated in weaker hygroscopic material 1930 is opened to the atmosphere, in accordance with various embodiments. As long as the relative humidity in the atmosphere is greater than the minimum relative humidity required for the weaker desiccant to absorb water, the weaker desiccant will become saturated. In most environments around the earth, the relative humidity is often well over 30%. California for example, a state that often faces severe droughts, has an average relative humidity roughly between 60 and 70% RH. The weaker desiccant will absorb water vapor in most environments. For more severe and dry environments, only single desiccant devices containing a strong desiccant should be implemented.

Figure 22:
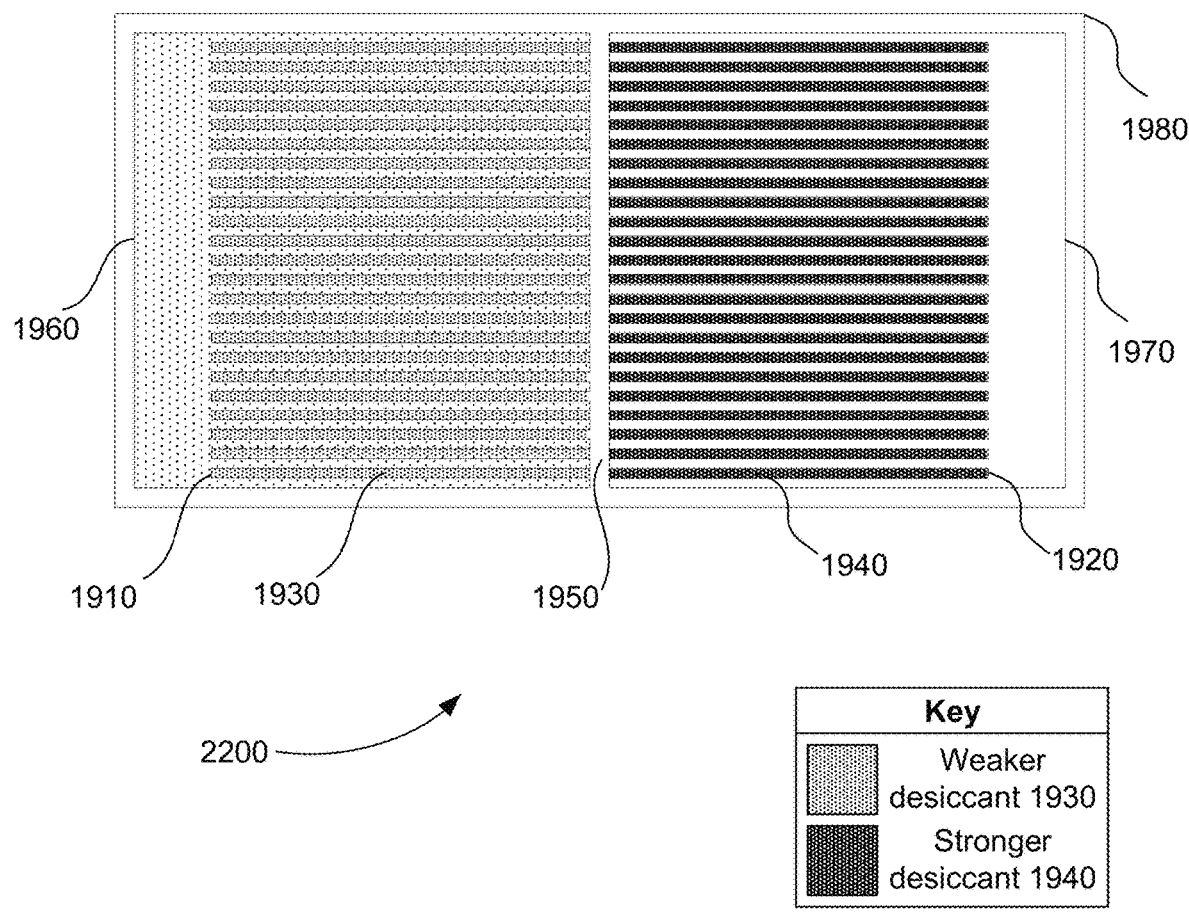
FIG. 22 is an exemplary diagram of a heat transfer system of a dual desiccant AWG consisting of two chambers, with the chamber coated in the weaker hygroscopic material fully saturated and closed to the atmosphere, in accordance with various embodiments.

FIG. 22, detailing exemplary image 2200, illustrates the same device present in FIG. 21, where the weaker desiccant 1930 is now fully saturated and closed off to the atmosphere, in accordance with various embodiments. This is noted with the light dot-shading in the background of chamber 1960.

Figure 23:
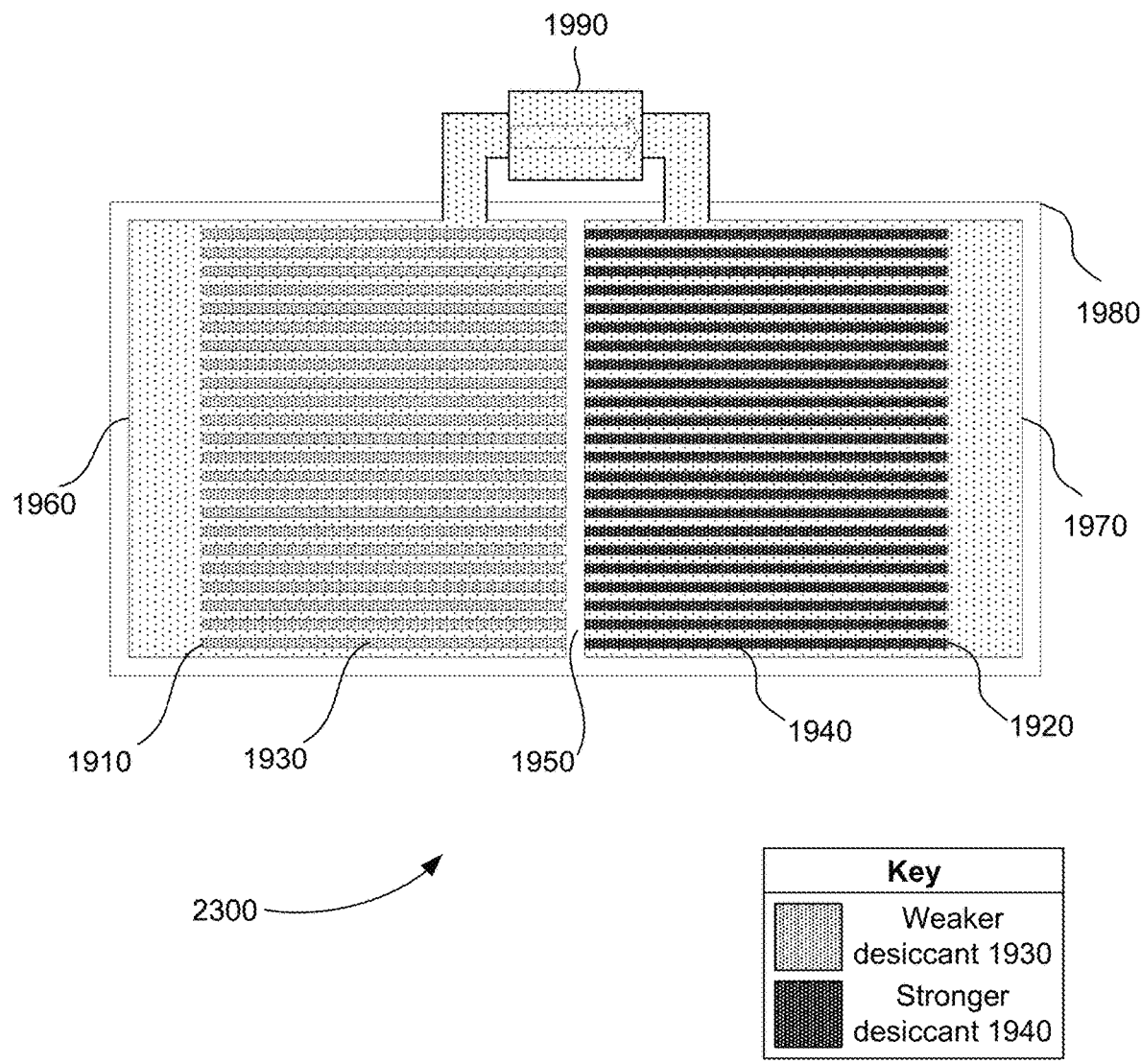
FIG. 23 is an exemplary diagram illustrating the flow of water vapor in a heat transfer chamber of a dual desiccant AWG with water vapor flowing from the weaker hygroscopic material to the stronger hygroscopic material via a channel, one way valve, and/or vapor compression pump, in accordance with various embodiments.

FIG. 23 is an exemplary image 2300 that illustrates the same device as FIG. 22, with a new activated vapor transfer component 1990, in accordance with various embodiments. 1990 is an open channel, a one way valve, and/or a vapor compression pump. This connects the chamber with the saturated weak desiccant to the chamber with the dry stronger desiccant. Since the weak desiccant is fully saturated, it will readily give off water vapor. On the other side, stronger desiccant 1940 is dry and rapidly absorbs water. Since the strong desiccant can absorb water down to about 10% relative humidity, the humidity therefore dips below 30%. As the humidity dips below 30% relative humidity, or the threshold and "critical relative humidity" for the weaker desiccant, the weaker desiccant no longer serves as a dehumidifier and instead serves as a humidifier, releasing water vapor into the environment until at least a 30% relative humidity is achieved. It is important to note that these percentages are estimates and may vary depending on the weak and strong hygroscopic materials chosen. Because the stronger desiccant is able to absorb water down to a lower humidity than the weaker desiccant, virtually all of the water in the system should naturally flow through channel 1990 and fully saturate the stronger desiccant. If necessary, 1990 can also be a one way valve, or a water vapor compression pump, to ensure all of the water is transferred from the weaker desiccant to the stronger desiccant.

Figure 24:
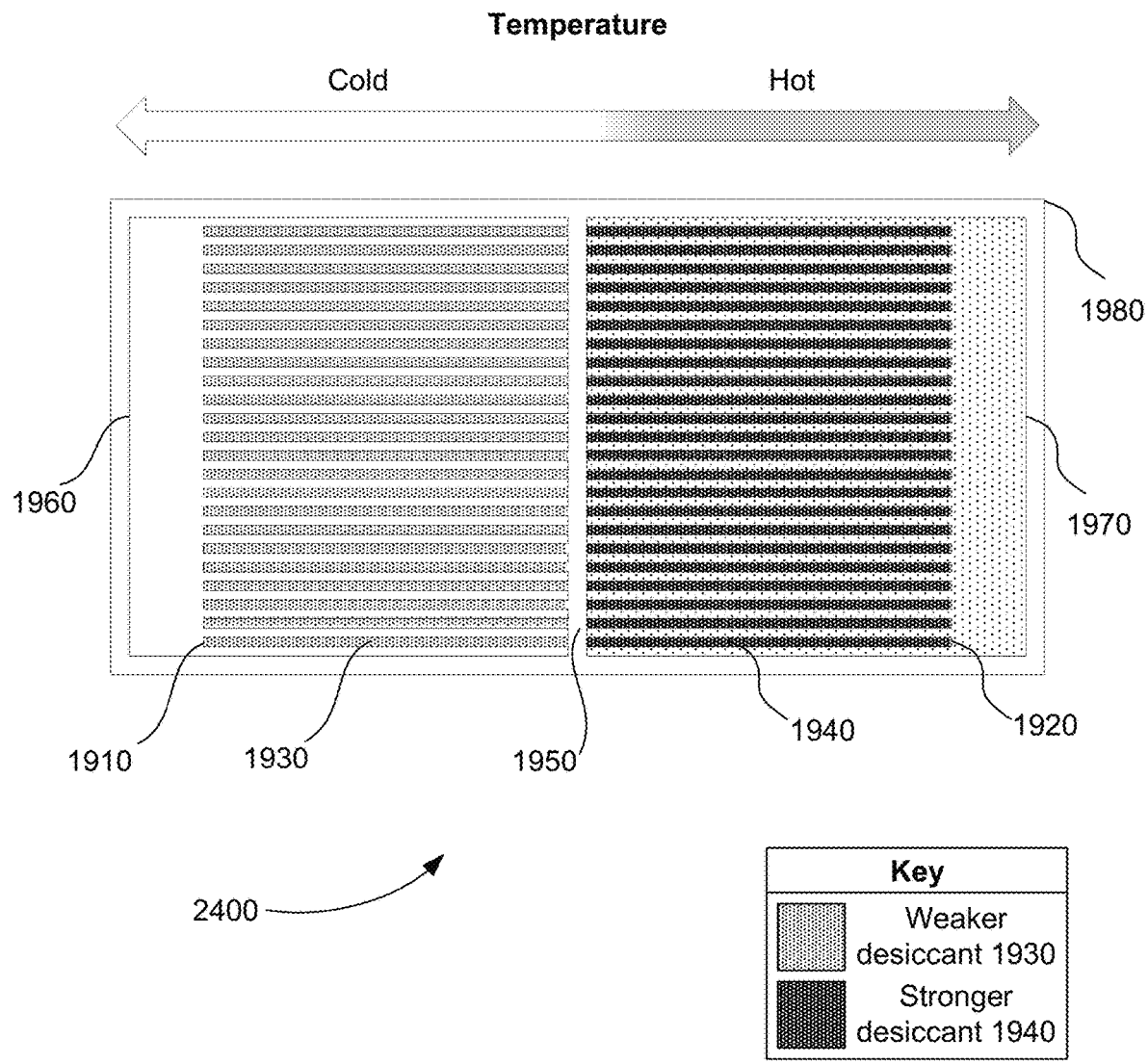
FIG. 24 is an exemplary diagram demonstrating a heat differential created in a heat transfer chamber of a dual desiccant AWG by the evaporation of water from the weaker desiccant and the condensation of water in the stronger desiccant, in accordance with various embodiments.
Figure 25:
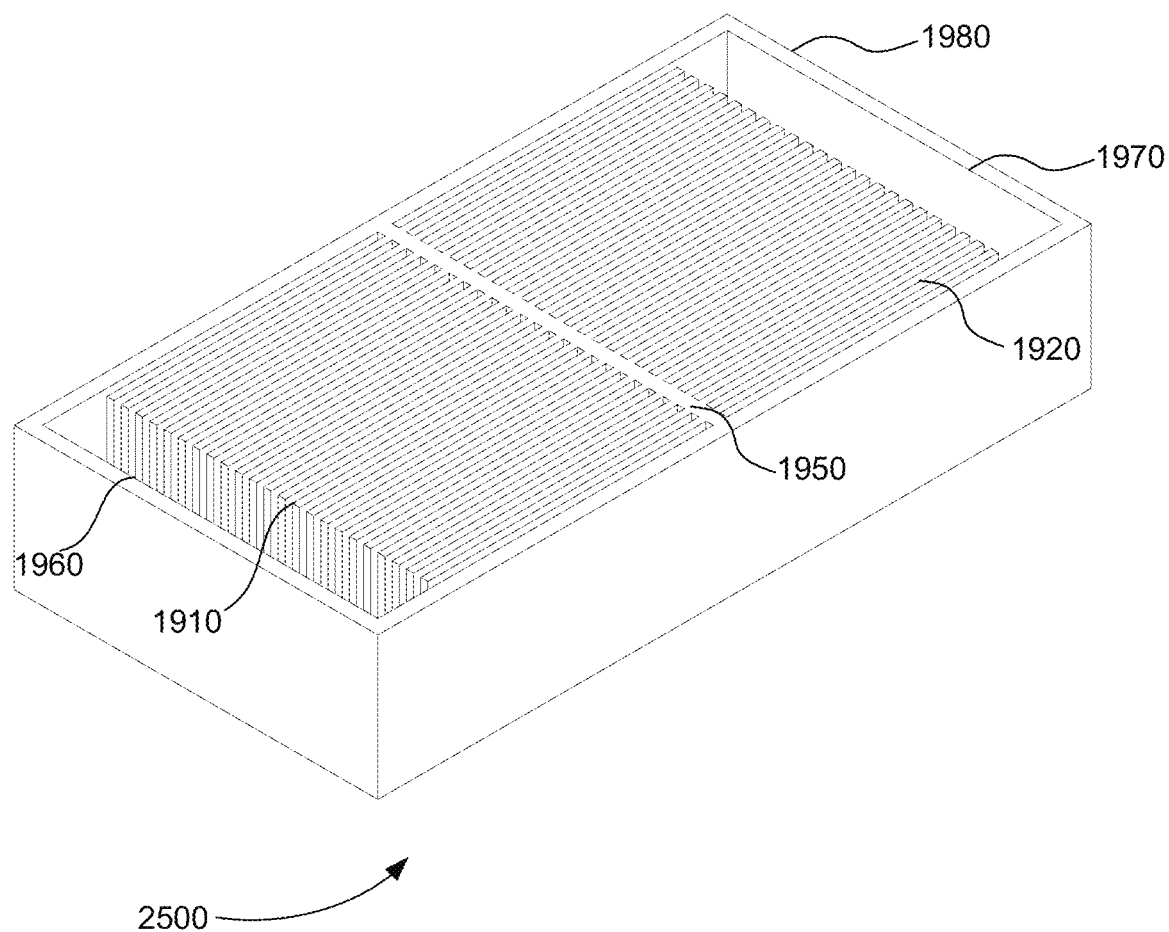
FIG. 25 is an exemplary diagram showing a three-dimensional view of a heat transfer system of a dual desiccant AWG consisting of two chambers of several parallel heat transfer surfaces, in accordance with various embodiments.

FIG. 24 is an exemplary image 2400 that illustrates the next step from FIG. 23, with the dual desiccant chamber forming a temperature differential, in accordance with various embodiments. Once again, since the surface 1950 is insulating and does not allow heat to flow between the two chambers, chamber 1960 will cool down drastically due to the forced evaporation of water vapor from hygroscopic material 1930, and chamber 1970 will heat up drastically due to the absorption of water into the stronger hygroscopic material 1940. This will cause a large buildup of heat in chamber 1970 with the stronger desiccant, and a strong cooling effect in the weaker desiccants chamber. FIG. 25 is an exemplary drawing 2500 detailing a three-dimensional view of a two chambered dual desiccant heat transfer system of an AWG, in accordance with various embodiments.

Returning to FIG. 23, this transfer of water vapor can either be done directly in the closed chamber filled with air, or under a vacuum. Under a vacuum this effect may be faster and there will be less heat lost through diffusion from air contact throughout the system. However, a vacuum may prevent the stronger desiccant from maintaining a low "critical relative humidity" depending on the desiccant.

Furthermore, since the temperature difference will be quickly created due to the high energy of phase change of water, this temperature difference can be created and sustained for significant portions of time as all of the water is slowly transferred from the weaker hygroscopic material to the stronger hygroscopic material.

This temperature differential seen in FIG. 24 can be used to raise the efficiency of water harvesters. For example, the cold weaker desiccant can be thermodynamically connected to metal plates exposed to humid air, and condense water from the air onto this cold surface.

Additionally, to take advantage of the heat created, the hot stronger desiccant can be thermodynamically connected to plates connected to another desiccant, which would then be heated and whose water could be condensed by the cooling effect of the weaker desiccant, a method described below.

This system is further developed later starting with FIG. 26 with system 2600. In the exemplary drawing 2600 in FIG. 26, there are six chambers present in the entire vacuum chamber 2690, in accordance with various embodiments. Chambers 2610, 2620, 2630, 2640, 2650, and 2660 are filled with high surface area plates. These plates are thermodynamically connected through the center black bar plate 2670. The perimeter and vertical columns colored in white represent insulating walls where heat cannot transfer. Therefore, only vertically connected chambers such as 2610 and 2660 can transfer heat between one another, same with 2620 and 2650, and with 2630 and 2640. All other chambers that are horizontally next to each other, such as 2610 and 2620, cannot transfer heat between one another and are insulated from one another.

Figure 26:
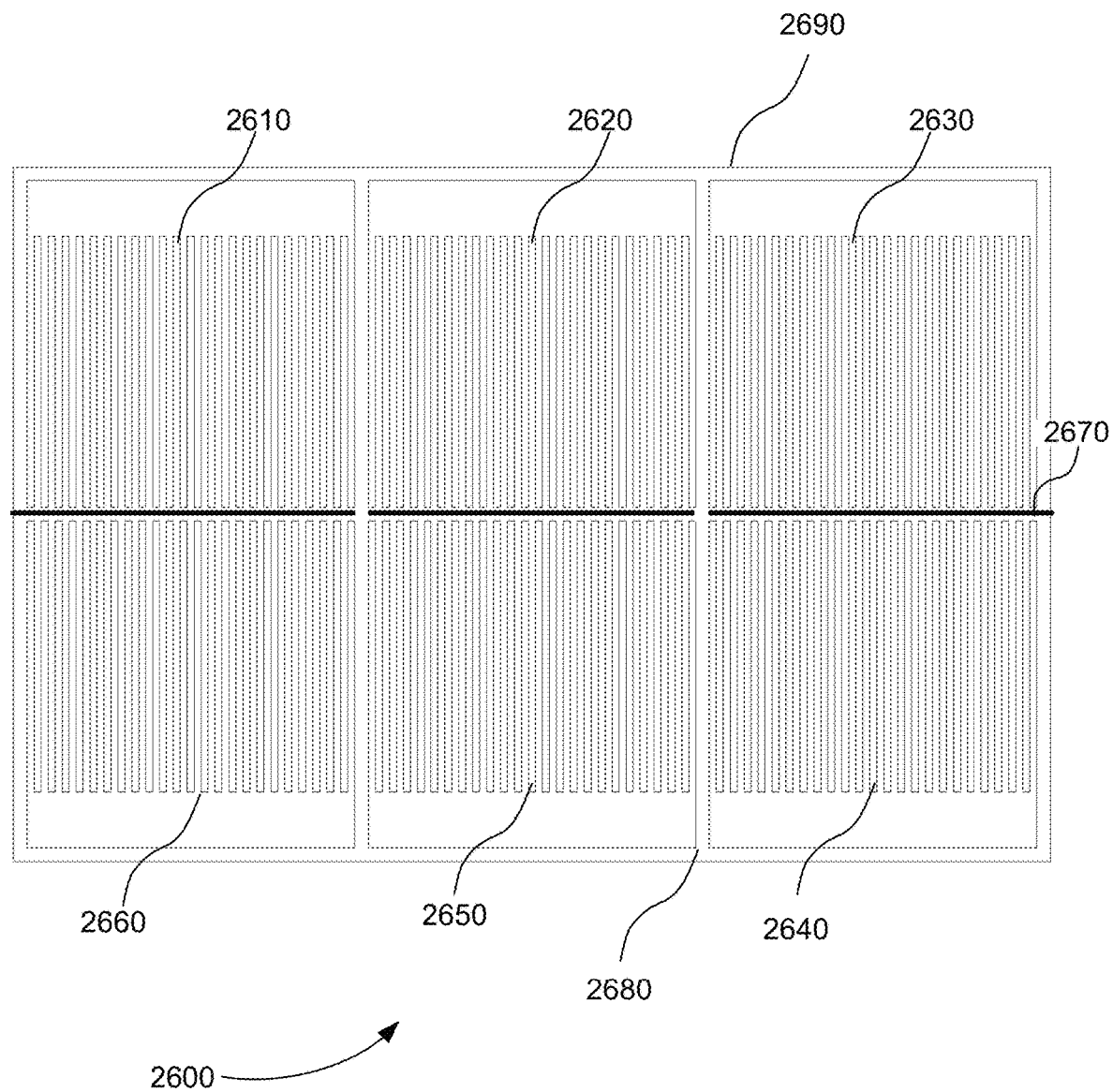
FIG. 26 is an exemplary diagram showing a heat transfer chamber of a dual desiccant AWG consisting of six high surface area sections, in accordance with various embodiments.
Figure 27:
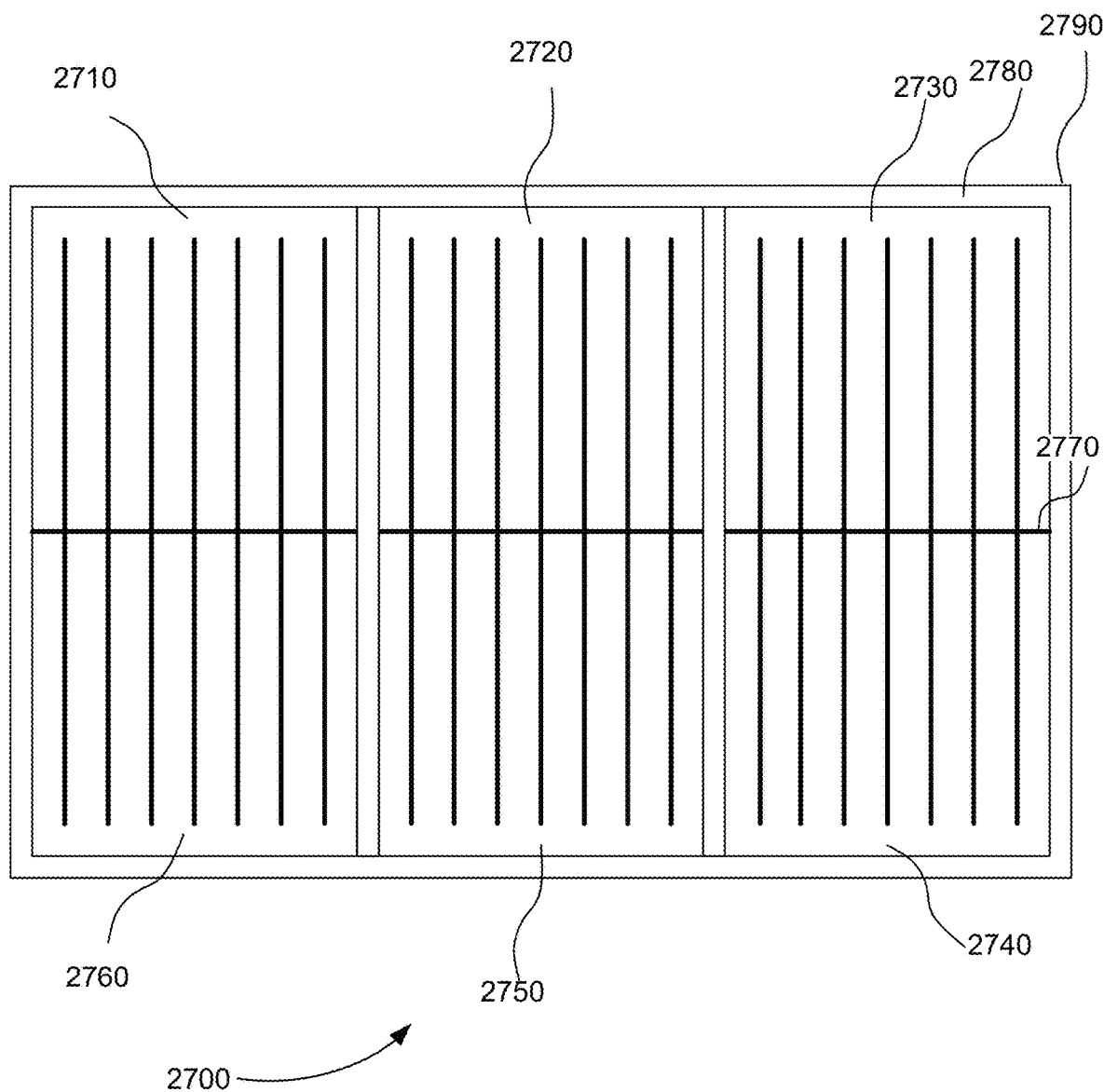
FIG. 27 is an exemplary diagram showing a simplified heat transfer chamber of a dual desiccant AWG containing six high surface area sections, in accordance with various embodiments.

FIG. 27 is an exemplary drawing 2700 that shows a simplified version of a dual desiccant 6 chamber heat transfer system seen previously in FIG. 26, in accordance with various embodiments. Here, vacuum chamber 2790 encloses the entire system, and the white perimeter 2780 as well as the white vertical columns represent insulating barriers. Center bar 2770 is the only surface that allows heat to transfer between top and bottom chambers, with chambers 2710 and 2760 thermodynamically connected, chambers 2720 and 2750 thermodynamically connected, and chambers 2730 and 2740 thermodynamically connected. This is a crucial setup for the functionality of the device.

Figure 28:
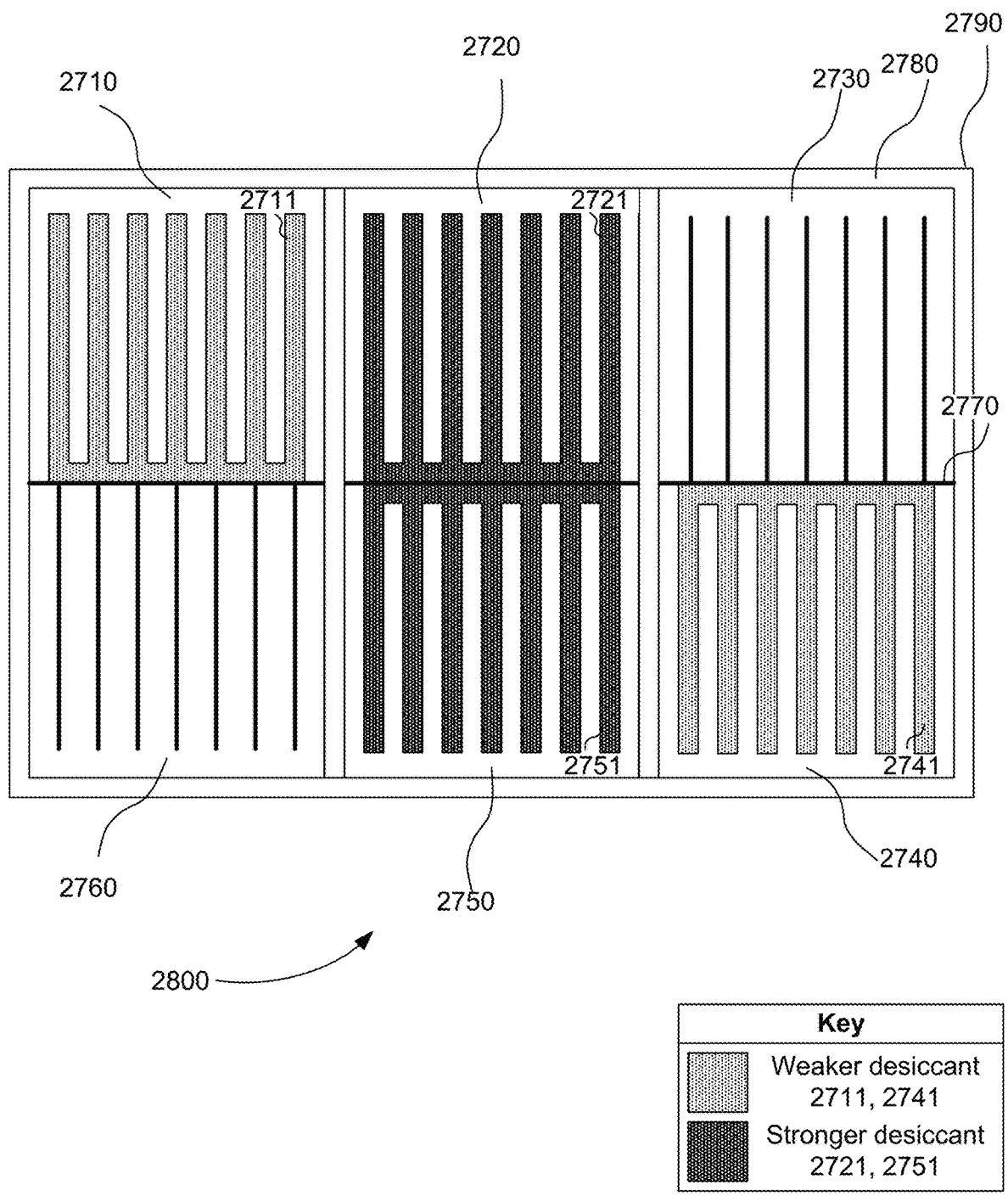
FIG. 28 is an exemplary diagram showing a simplified heat transfer chamber of a dual desiccant AWG with the top left and bottom right sections containing a weak desiccant, the middle two sections containing a strong desiccant, and the top right and bottom left sections left uncoated, in accordance with various embodiments.

FIG. 28 is an exemplary drawing 2800 that develops on the system from FIG. 27, showing the placement of a weaker desiccant 2711 inside of chamber 2710, a weaker desiccant 2741 inside chamber 2740, a stronger desiccant 2721 placed inside chamber 2720, and a stronger desiccant 2751 inside of chamber 2750, in accordance with various embodiments. Each of these desiccants coat the conductive plates of their respective chamber, and are in thermodynamic equilibrium with the chambers either directly above or below them.

Figure 29:
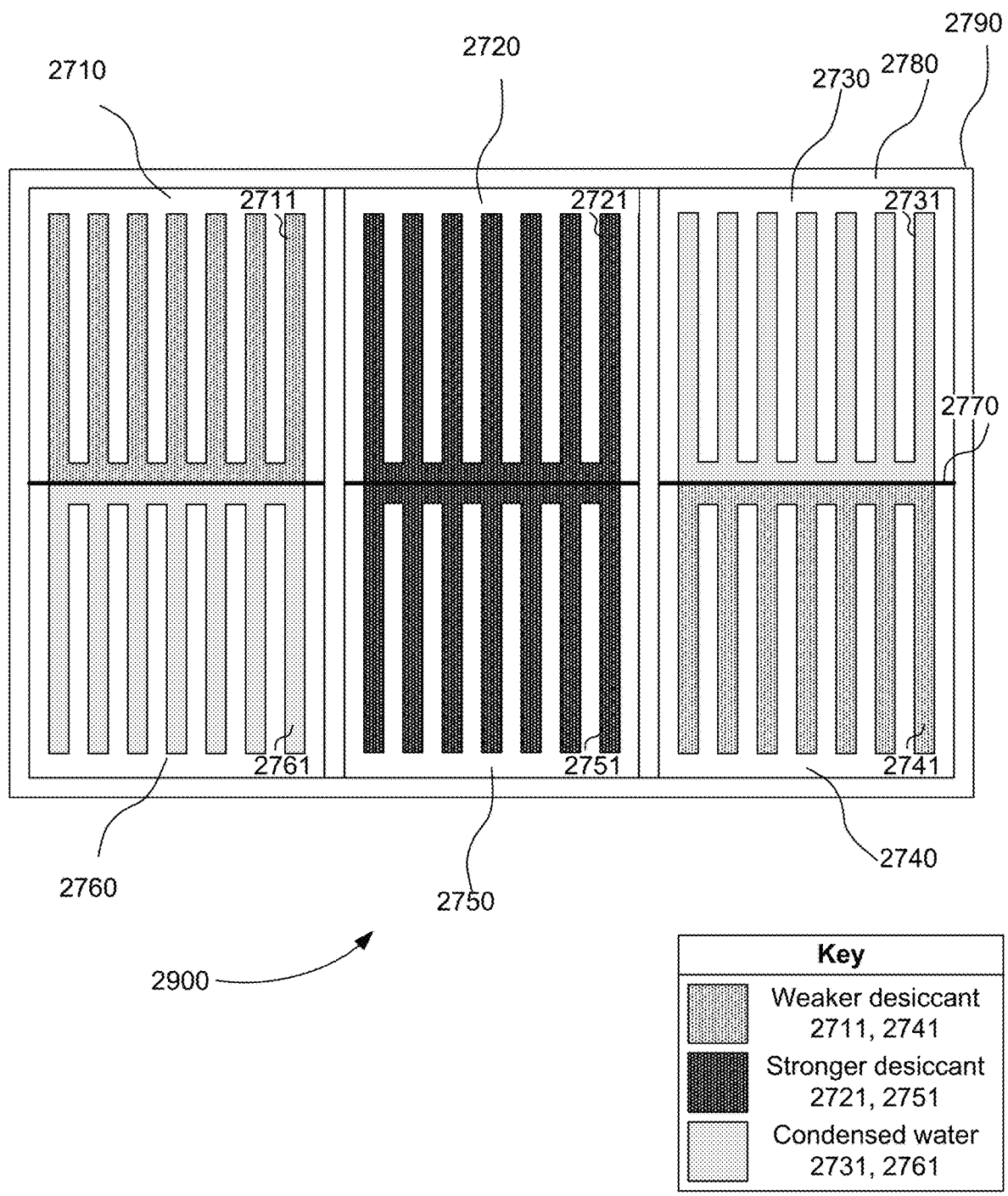
FIG. 29 is an exemplary diagram showing a simplified heat transfer chamber of a dual desiccant AWG with the top left and bottom right sections containing a weak desiccant, the middle two sections containing a strong desiccant, and the top right and bottom left sections containing water condensation, in accordance with various embodiments.

FIG. 29 is an exemplary image 2900 showing the location of where water will condense in the device imaged in FIG. 28. Chambers 2730 and 2760 contain conductive plates that are left uncoated. Water can therefore condense on these plates, with condensed water 2731 forming in chamber 2730, and condensed water 2761 forming on the plates of chamber 2760.

Figure 30:
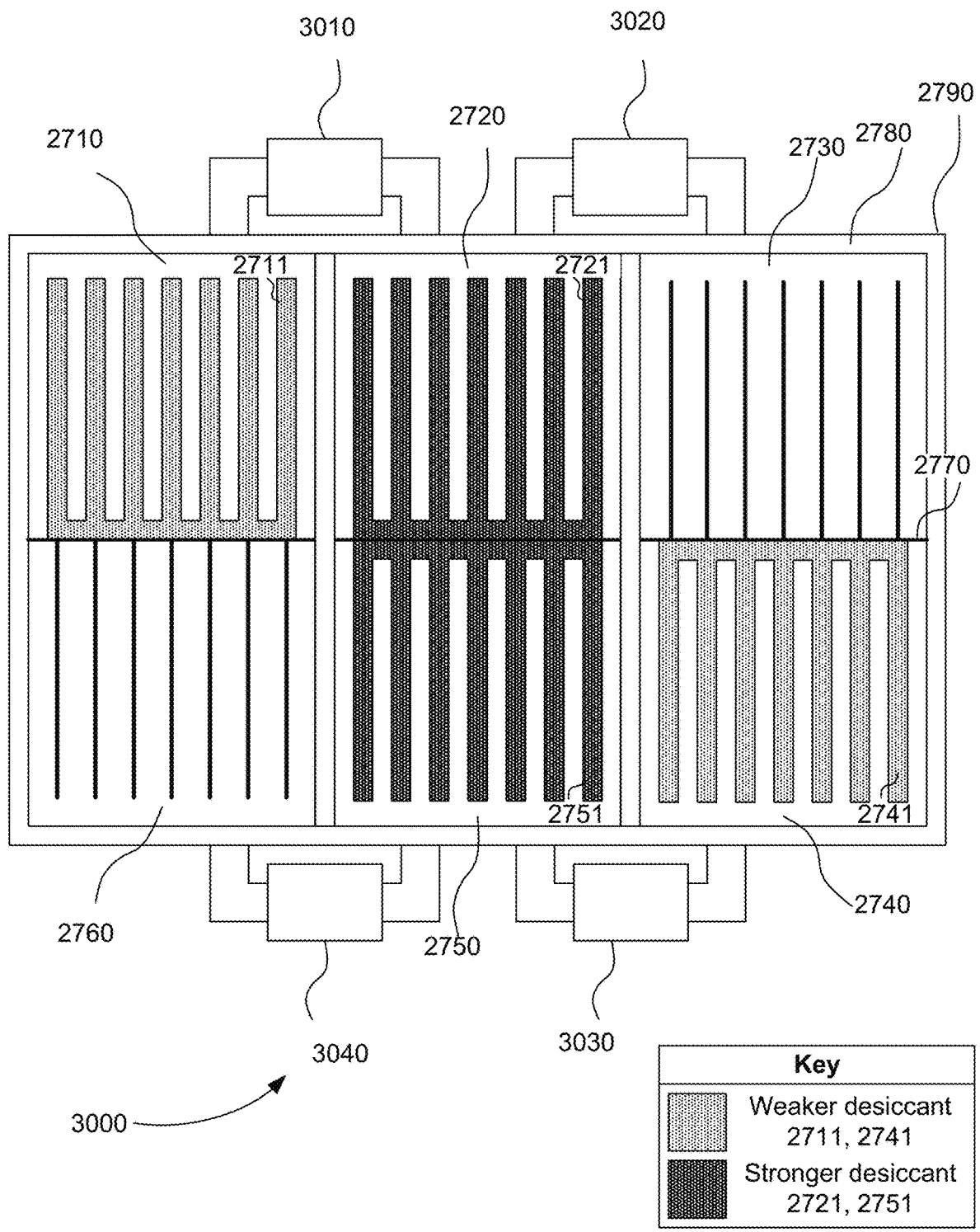
FIG. 30 is an exemplary diagram showing a simplified heat transfer chamber of a dual desiccant AWG with the addition of four channels, one way valves, and/or vapor compression pumps, connecting all chambers that are directly horizontally next to one another, in accordance with various embodiments.

FIG. 30 is an exemplary drawing 3000 that develops on FIG. 28, detailing the placement of several channels, one way valves, and/or vapor compression pumps throughout the device, in accordance with various embodiments. In this design, channel 3010 connects chambers 2710 and 2720, channel 3020 connects chambers 2720 and 2730, channel 3030 connects chambers 2740 and 2750, and channel 3040 connects chambers 2750 and 2760. Since each chamber is independent of the other chambers and able to sustain their own pressures, the only way for water vapor to transfer between chambers is through one of these four channels. FIG. 30 details one method in which a dual desiccant water harvesting device can be manufactured with connecting channels.

In a dual desiccant system, the heat properties of exchanging water between a weaker desiccant and a stronger desiccant that were discussed in FIGS. 20 through 24 are implemented. Returning to FIG. 30, in order to harvest water, the device must first be set up so that at least one of the strong desiccants contains water. This can be done by directly exposing strong desiccant 2721 to the atmosphere by opening chamber 2720. However, in order to prevent the creation of 2 extra windows for chambers 2720 and 2750, the device is set up in the same manner in which it cycles later on.

Figure 31:
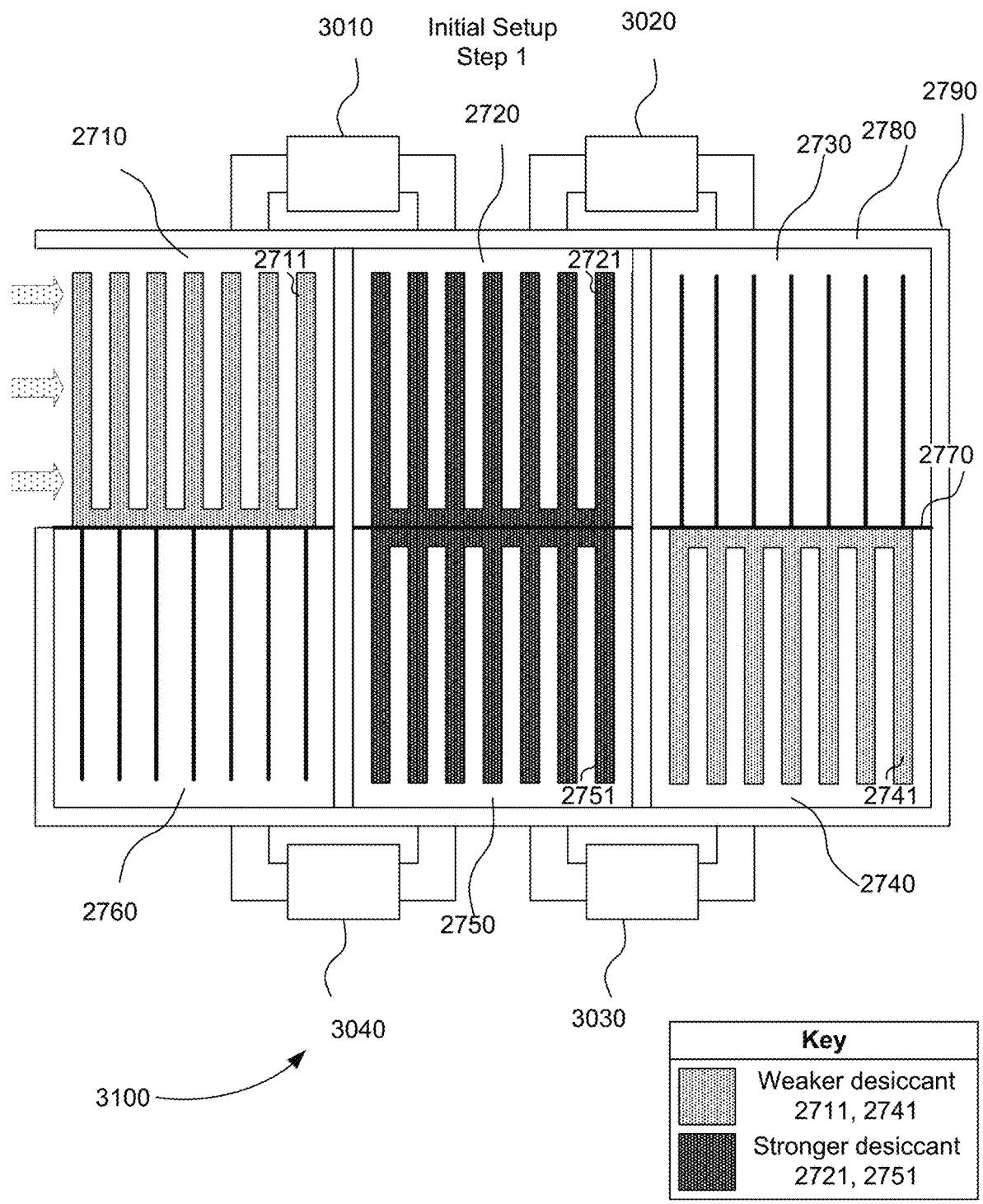
FIG. 31 is an exemplary diagram illustrating the first phase of the setup of a heat transfer chamber of a dual desiccant AWG, in accordance with various embodiments.

The first step, seen in exemplary drawing 3100 in FIG. 31, is to open chamber 2710 to the atmosphere as to let weaker desiccant 2711 absorb water and become saturated, in accordance with various embodiments.

Figure 32:
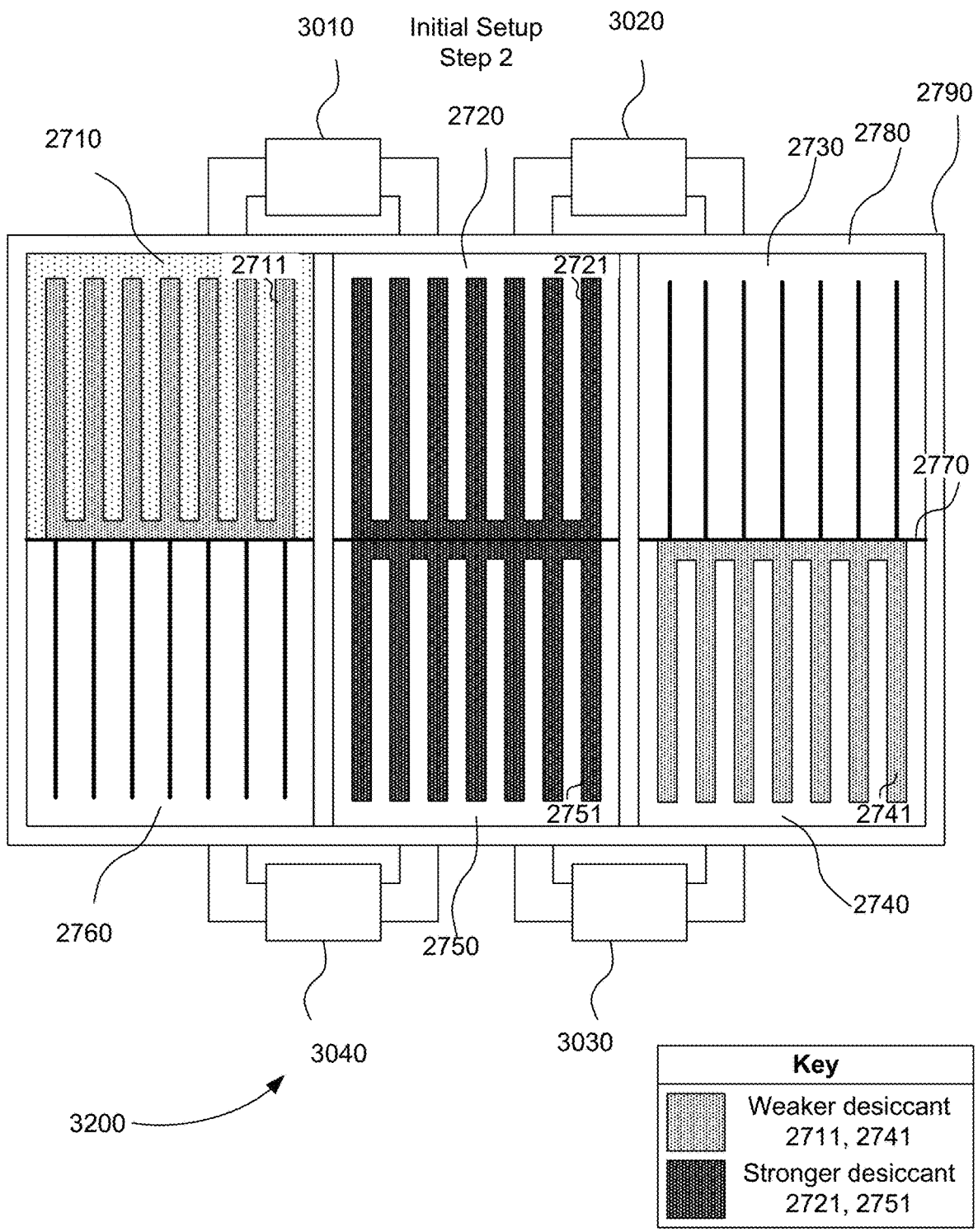
FIG. 32 is an exemplary diagram illustrating the second phase of the setup of a heat transfer chamber of a dual desiccant AWG, in accordance with various embodiments.

In FIG. 32, which details exemplary drawing 3200, it is indicated that the weaker desiccant is fully saturated by the light dot-shading surrounding the hygroscopic material. At this point, the chamber can remain at atmospheric pressure and is not placed under a vacuum.

Figure 33:
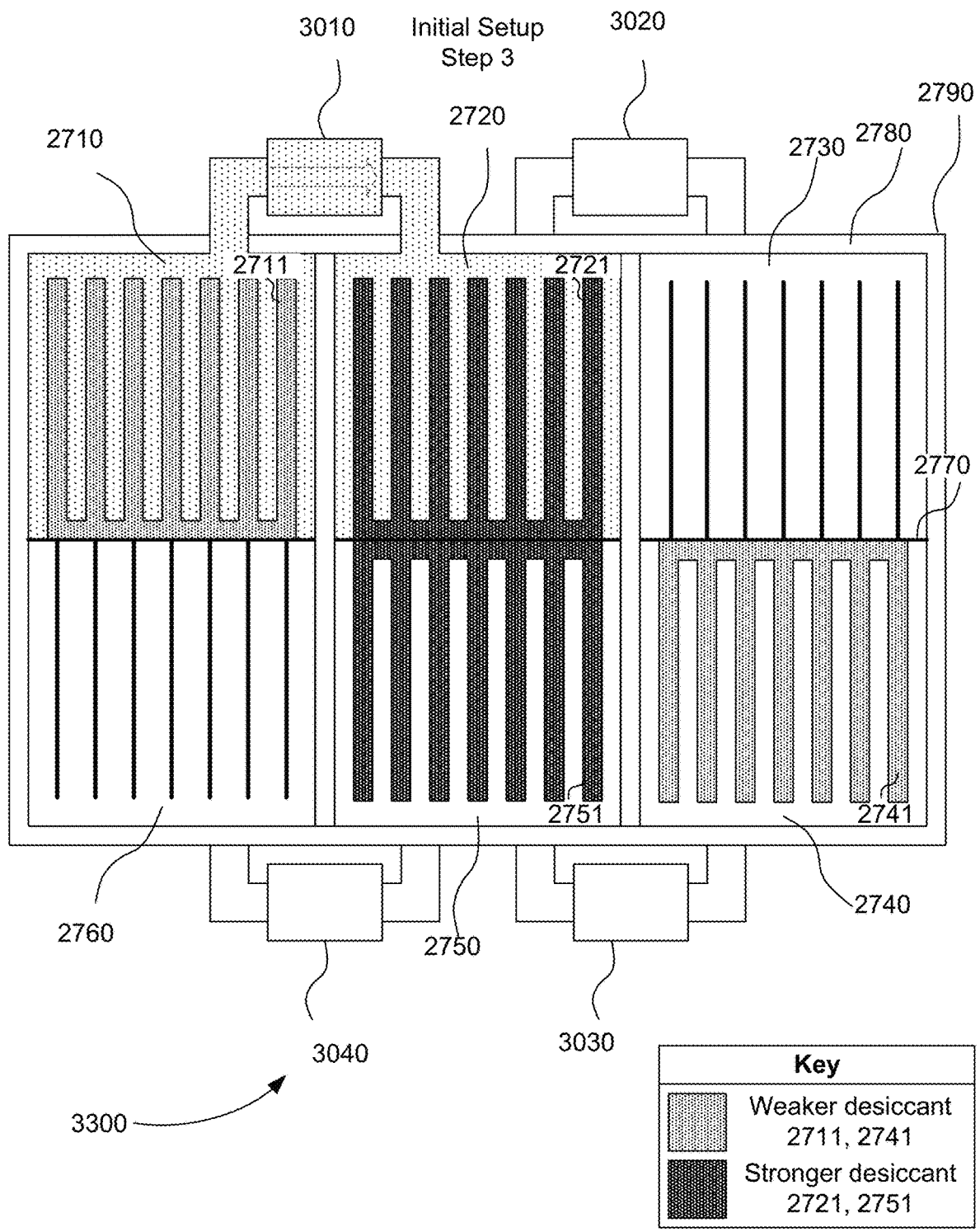
FIG. 33 is an exemplary diagram illustrating the third phase of the setup of a heat transfer chamber of a dual desiccant AWG, in accordance with various embodiments.

FIG. 33 is an exemplary drawing 3300 that illustrates the next exemplary step of the set-up process of a dual desiccant device for an AWG, in accordance with various embodiments and order of steps. Channel, one way valve, and/or vapor compression pump 3010 is opened, and connects chambers 2710 and 2720. This exposes the weaker desiccant 2711 to the stronger desiccant 2741. As described before, the stronger desiccant is able to absorb water down to a lower humidity than the weaker desiccant. For this reason, water vapor will naturally flow through channel 3010 and to the stronger desiccant. This absorption of water will occur at atmospheric pressure. A vacuum is not ideally created inside of chambers 2710 and 2720 at this point, and through canal 3010. This is because even strong desiccants cannot absorb significant water under a vacuum as the boiling point of water is lower than room temperature.

Figure 34:
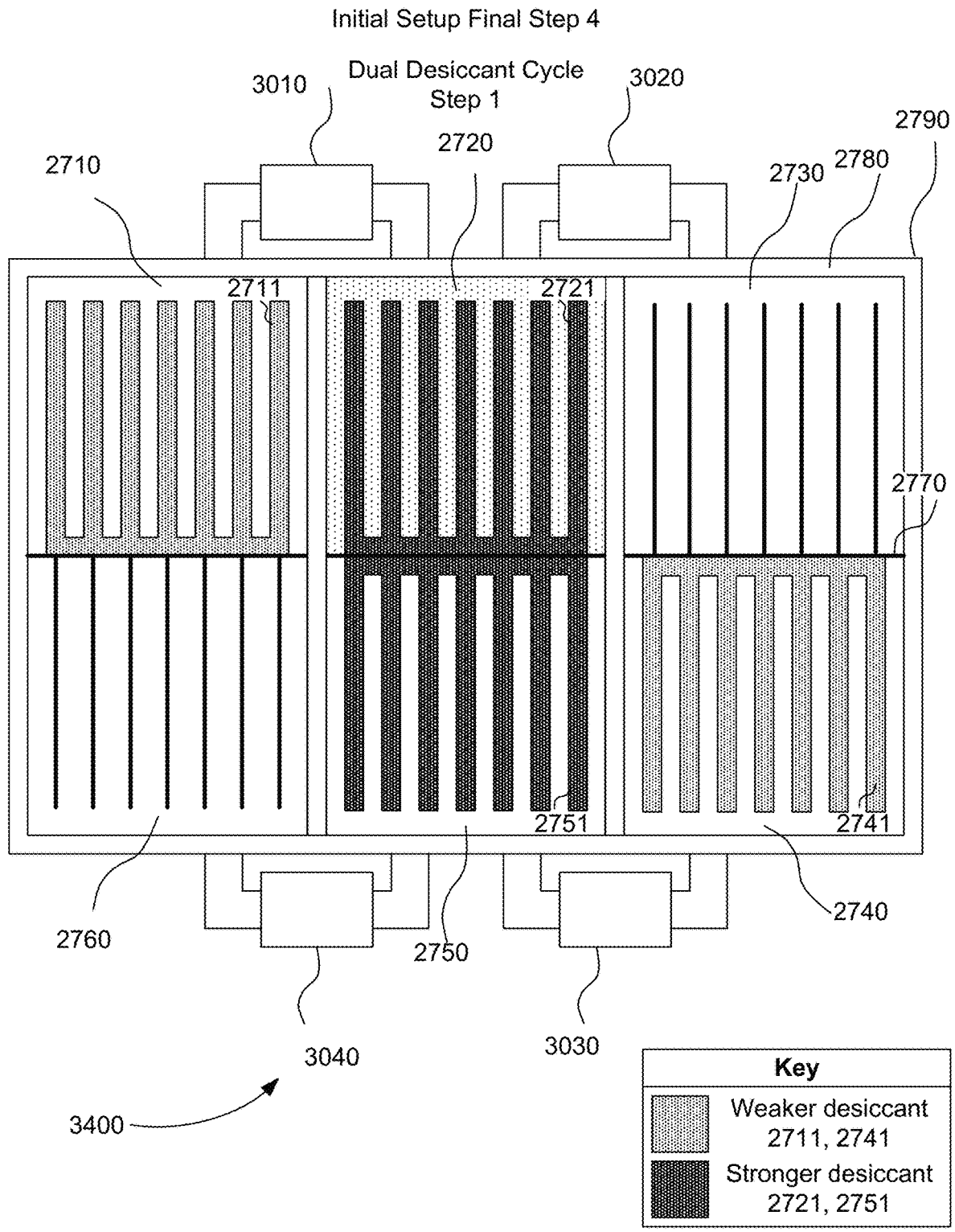
FIG. 34 is an exemplary diagram illustrating the fourth and final phase of the setup of a heat transfer chamber of a dual desiccant AWG, and the first step of the repeated cycle of a heat transfer chamber of a dual desiccant AWG, in accordance with various embodiments.
Figure 35:
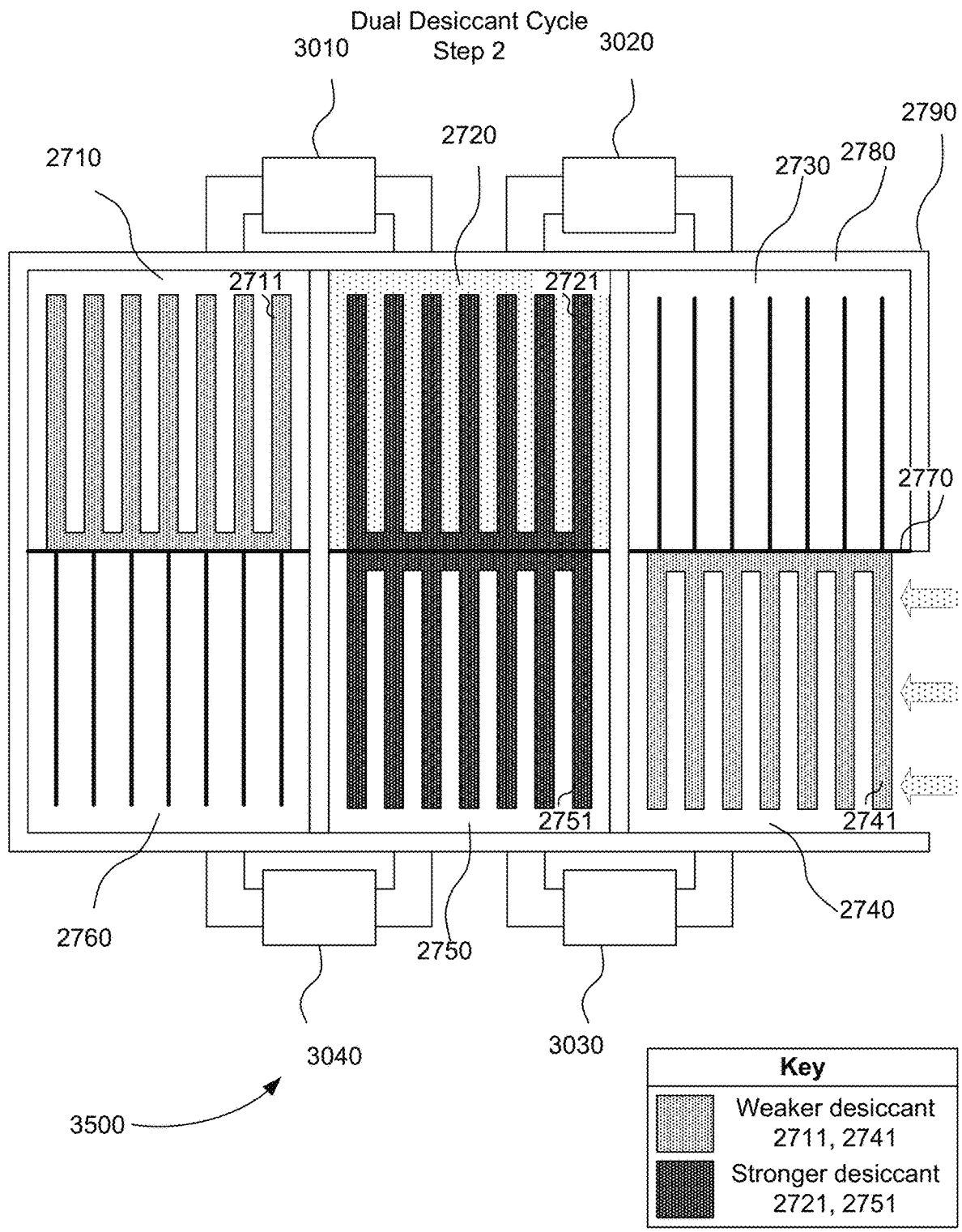
FIG. 35 is an exemplary diagram illustrating the second step of the repeated cycle of a heat transfer chamber of a dual desiccant AWG, in accordance with various embodiments.
Figure 36:
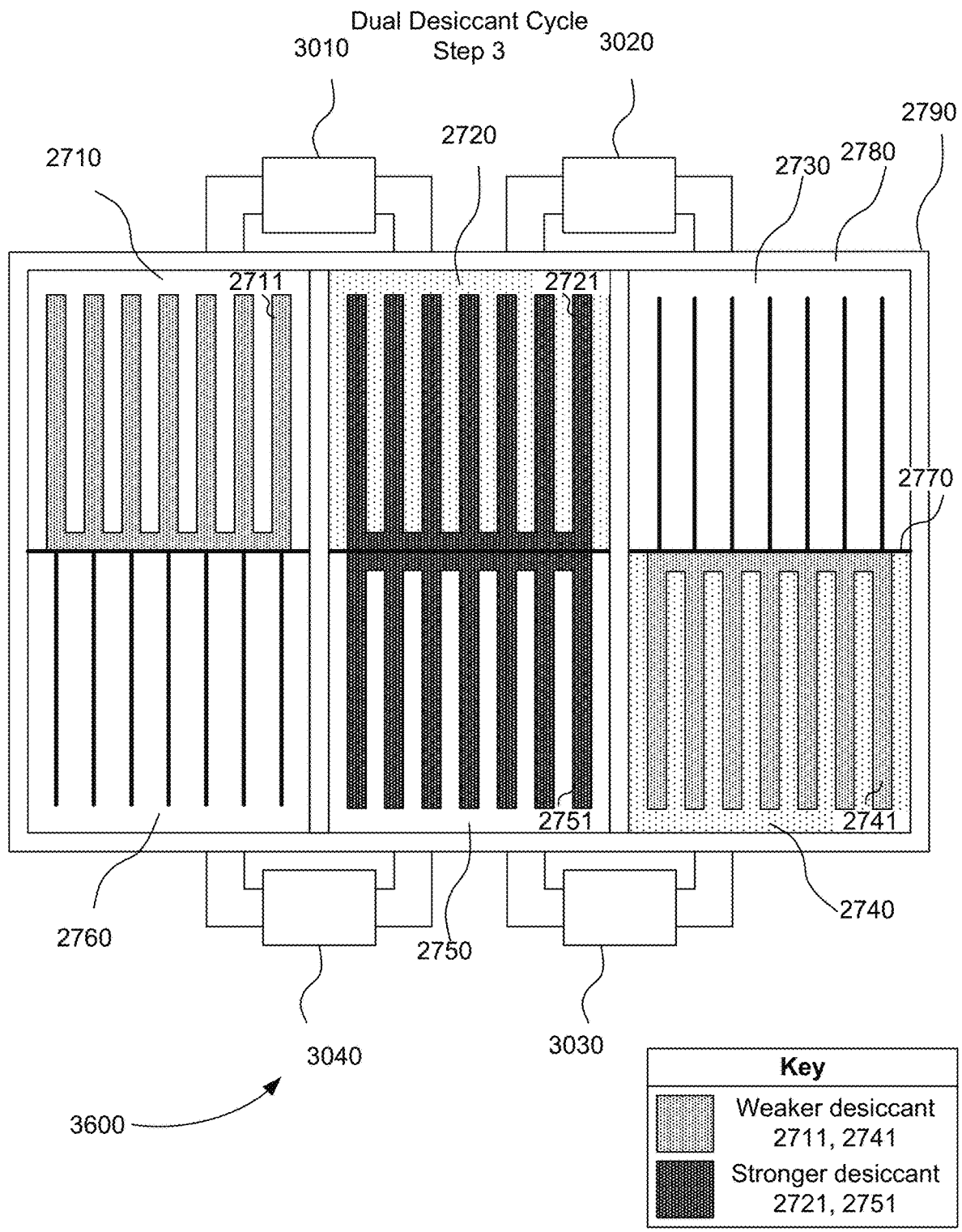
FIG. 36 is an exemplary diagram illustrating the third step of the repeated cycle of a heat transfer chamber of a dual desiccant AWG, in accordance with various embodiments.

FIG. 34 is an exemplary drawing 3400 that demonstrates the last step of the set-up process of the dual desiccant six chambered device of an atmospheric water generator, and also the first step of the repeated cycle of the dual desiccant six chambered device of an AWG, in accordance with various embodiments. Here, the stronger desiccant 2721 has fully absorbed (or adsorbed, depending on the desiccant) all of the water from the weaker hygroscopic material 2711, and channel 3010 has been closed. The system 3400 shows a dual desiccant AWG device that has now been prepped and is ready to repeatedly cycle in order to produce pure water from the atmosphere. The device is allowed to equilibrate to room temperature before the repeated cycle, from any heat generated or lost from the previous method.

The main goal of the dual desiccant AWG is to cycle the two systems present: the top three chambers, and the bottom three chambers. The total mass flow of water vapor for the top system comes as water vapor from the atmosphere into weaker desiccant 2711. Then the water is transferred from weaker desiccant 2711 to the stronger desiccant 2721. L. Lastly, the water is condensed in chamber 2770. The same idea occurs for the bottom 3 chambers, starting with weaker desiccant 2741 absorbing water and resulting in water condensing in chamber 2760. The top and bottom systems run at opposing times. For example, while the top weaker desiccant 2711 and the stronger desiccant 2721 are exchanging water vapor, the bottom stronger desiccant 2751 will be releasing water vapor and pure water will be collected in chamber 2760. This concept is clearly illustrated in FIGS. 34 through 44. It should be noted that the cycle described through these figures are to provide a deeper understanding of a dual desiccant AWG, and is not meant to limit the construction or layout of a dual desiccant device.

The first step in the repeated cycle of the dual desiccant system is shown in FIG. 34 through exemplary drawing 3400. The second step is illustrated in exemplary drawing 3500 in FIG. 35, with the opening of chamber 2740 to allow air from the atmosphere to transfer inside the chamber and be collected in the weaker desiccant 2741. This weaker desiccant fully absorbs water until it is saturated, and exemplary drawing 3600 in FIG. 36 demonstrates the third step with the chamber 2740 now containing a fully saturated weaker desiccant 2741 that is now closed to the atmosphere.

Figure 37:
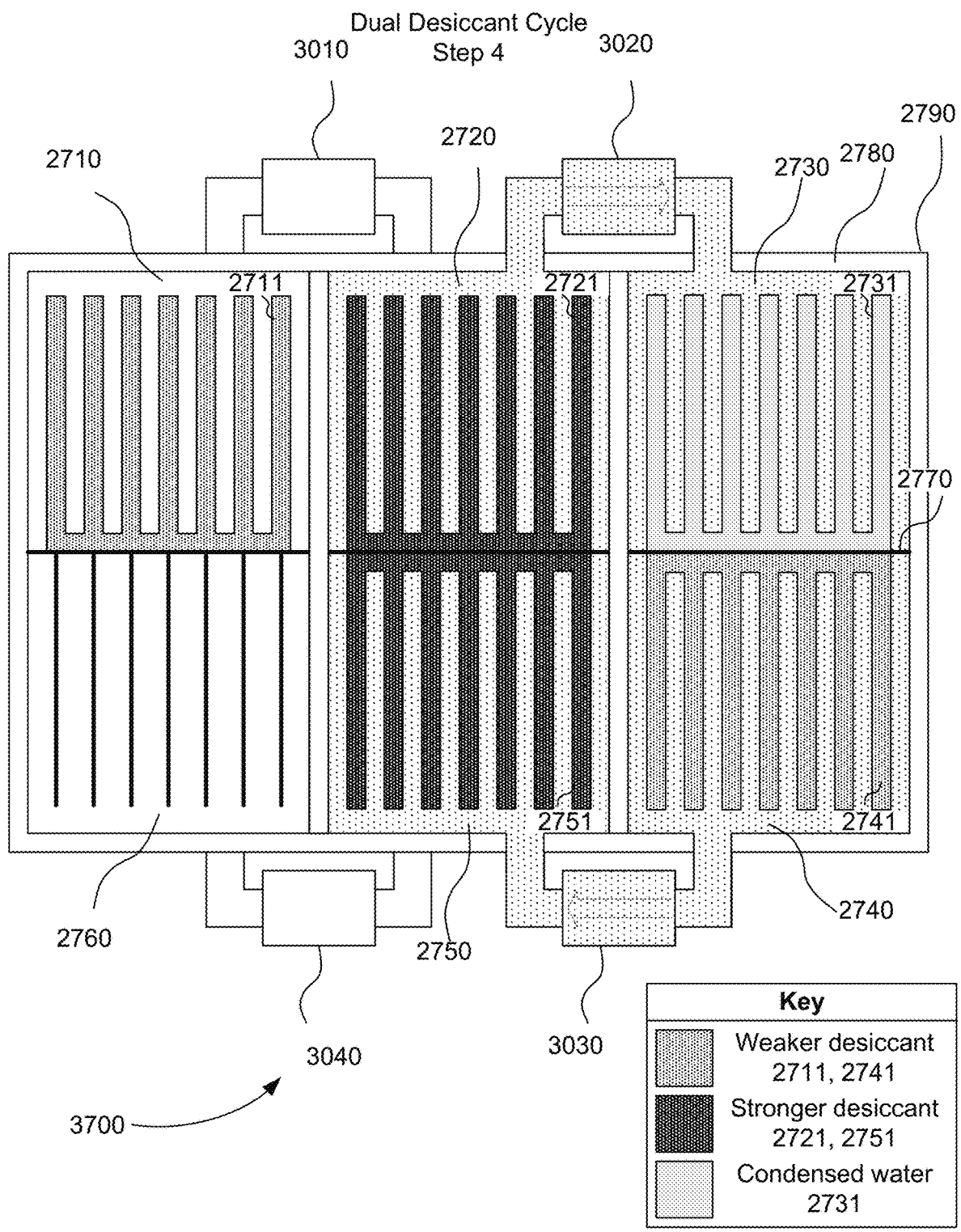
FIG. 37 is an exemplary diagram illustrating the fourth step of the repeated cycle of a heat transfer chamber of a dual desiccant AWG, in accordance with various embodiments.

FIG. 37 is an exemplary drawing 3700 that demonstrates the fourth step in the dual desiccant system. In this step, channel 3020 is opened to connect the stronger desiccant 2721 in chamber 2720 to the condensation plates 2731. This system, chambers 2720 and 2730, and canal 3020, is placed under a vacuum for the top system. This lowers the boiling point of the water trapped inside the stronger desiccant 2721 to below room temperature and causes the release of water vapor.

In contrast, as canal 3030 is opened to connect chambers 2740 and 2750, a vacuum is not necessary for the bottom system. As the weaker desiccant 2741 is exposed to the stronger desiccant 2751 under standard pressure, the humidity will decrease due to the absorption of water by stronger desiccant 2751, and water will flow out of the weaker desiccant 2741 through the canal, one way valve, and/or pump 3030 to the stronger desiccant in chamber 2750. As the stronger desiccant absorbs water, it heats up. This thermal energy is transferred across the conductive middle barrier 2770 drawn in a dark black line, and flows from the stronger desiccant 2751 to the strong desiccant 2721 above it. At the same time, the weaker desiccant is losing water through evaporation. Due to the high energy of phase change in water, a small amount of water absorbed or released causes large temperature changes. With this in mind, the cooling weaker desiccant 2741 is connected thermally to the above condensation plates in chamber 2730. Since the hot stronger desiccant 2751 is insulated from the cold weaker desiccant 2741, this temperature difference is created and sustained for the duration of the water transfer through channel 3030.

With the strong desiccant 2721 in the above system being heated under a vacuum, it will release water vapor. The flow of water vapor is shown as arrows in channels 3020 and 3030. This water vapor flows through channel 3020 and is condensed onto the cooled plates as condensed water 2731. Since the temperature difference is created naturally by the transfer of water vapor between a weaker and stronger desiccant, there is no energy input required in the form of heating and cooling. This is often the largest consumption of energy for traditional water generators, and shows how this device creates high efficiencies. Therefore, the only required energy inputs is the energy required to create the vacuum in the top system, and the energy to activate the optional pumps in canals 3020 and 3030.

Figure 38:
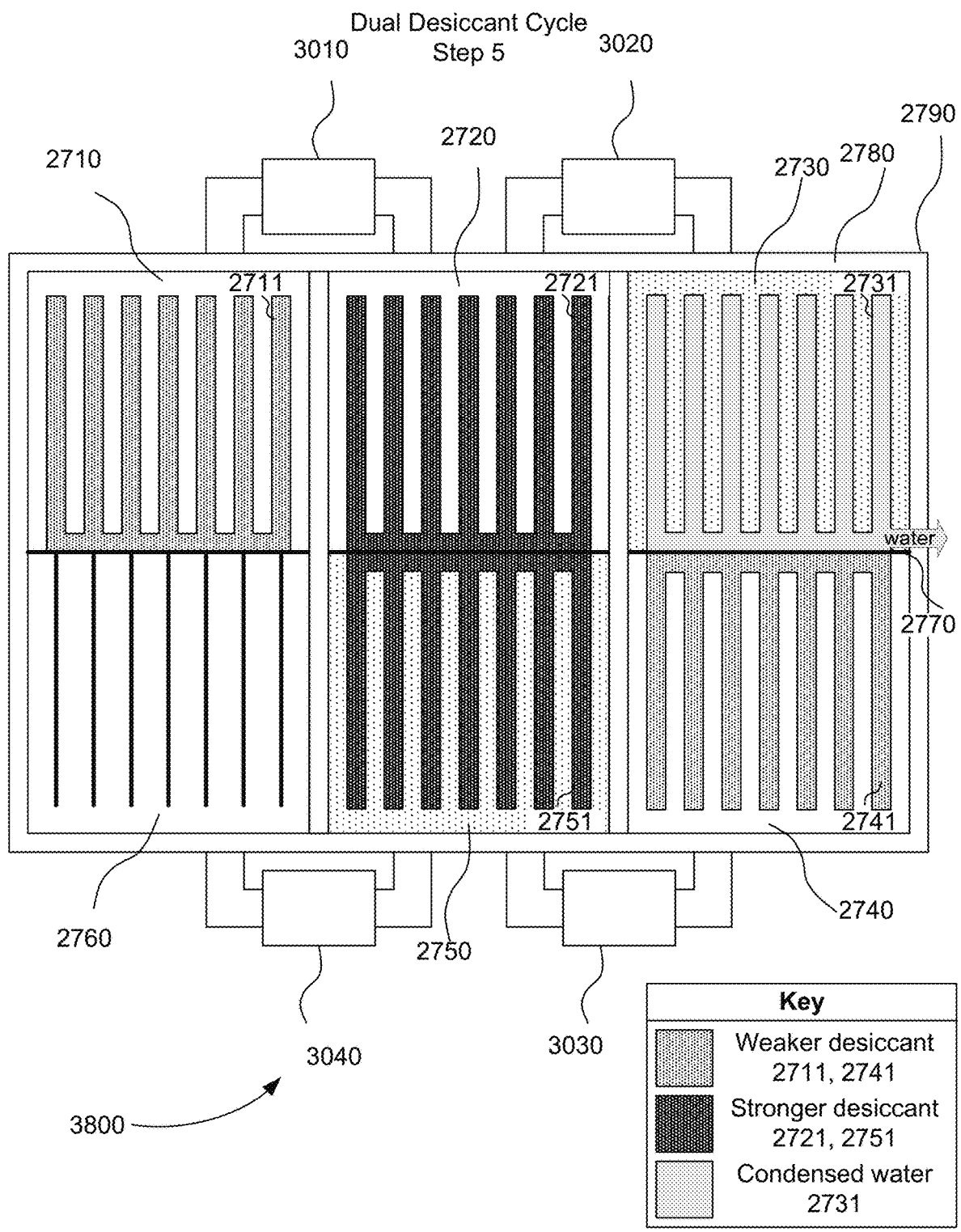
FIG. 38 is an exemplary diagram illustrating the fifth step of the repeated cycle of a heat transfer chamber of a dual desiccant AWG, in accordance with various embodiments.

FIG. 38 is an exemplary drawing 3800 that illustrates the fifth step of a dual desiccant AWG, in accordance with various embodiments. In this Figure, the water has been fully absorbed from the weaker desiccant 2741 into the stronger desiccant 2751, indicated by the clear background in chamber 2740 and the lightly dot-shaded background in chamber 2750. Channel 3030 has been closed. For the top system, all water has been released from the strong desiccant 2721 and condensed into the chamber 2730. The canal 3020 has been closed. The vacuum can then be released from chambers 2720 and 2731, and the canal 3020, and the collected water in chamber 2730 can be harvested and used for its intended purpose, as seen with the gray arrow leaving chamber 2731 labeled "water."

Figure 39:
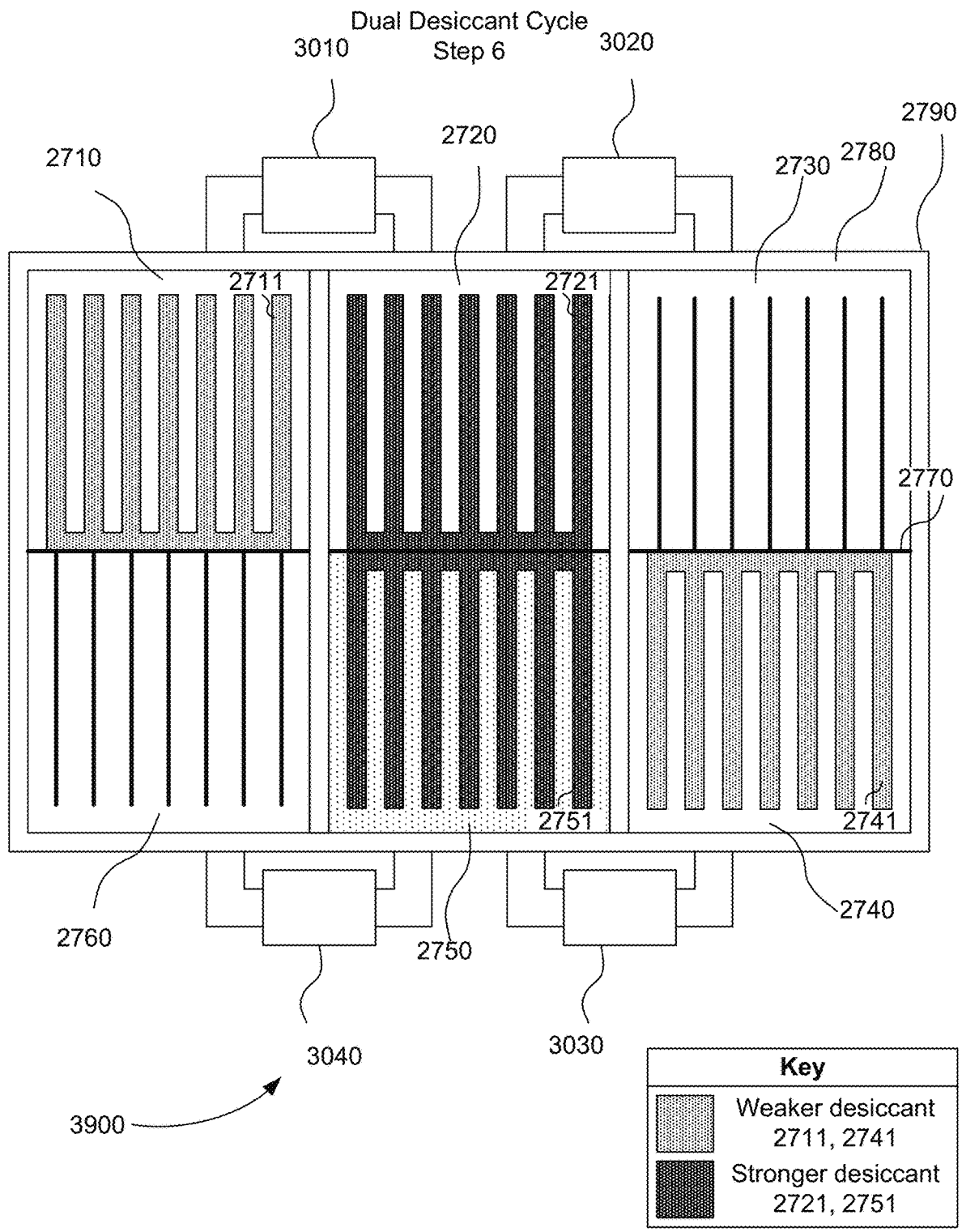
FIG. 39 is an exemplary diagram illustrating the sixth step of the repeated cycle of a heat transfer chamber of a dual desiccant AWG, in accordance with various embodiments.

This cycle is repeated on the other half of the system, with the sixth step illustrated in exemplary drawing 3900 in FIG. 39. In this image, the bottom stronger desiccant 2751 is fully saturated.

Figure 40:
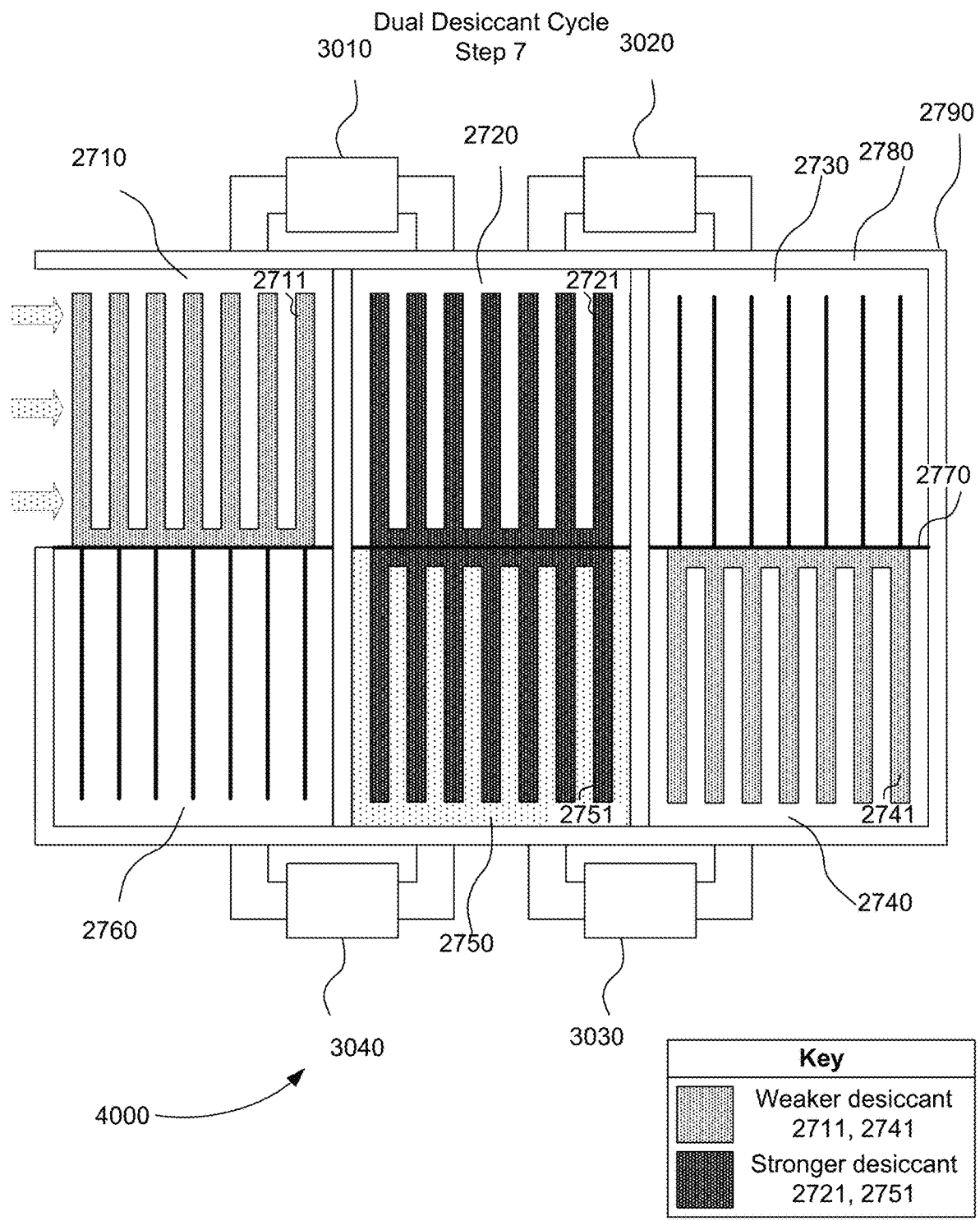
FIG. 40 is an exemplary diagram illustrating the seventh step of the repeated cycle of a heat transfer chamber of a dual desiccant AWG, in accordance with various embodiments.
Figure 41:
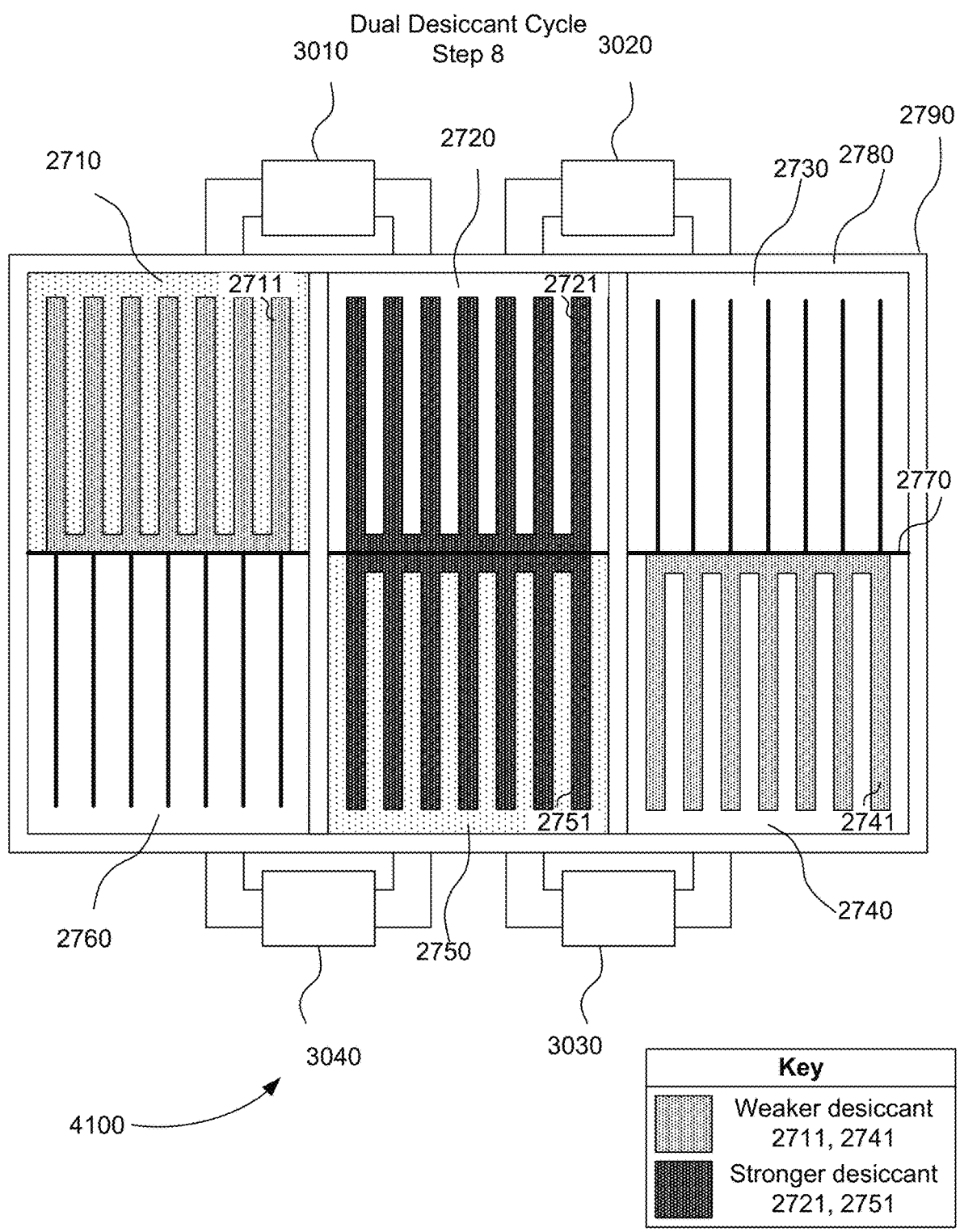
FIG. 41 is an exemplary diagram illustrating the eighth step of the repeated cycle of a heat transfer chamber of a dual desiccant AWG, in accordance with various embodiments.

In the seventh step, the weaker desiccant 2711 in chamber 2710 is exposed to the atmosphere by opening chamber 2710 as detailed in exemplary drawing 4000 as seen in FIG. 40. The weaker desiccant 2711 then absorbs water and becomes fully saturated, as detailed in the eighth step of the process seen in exemplary drawing 4100 in FIG. 41, where the chamber 2710 is then closed to the atmosphere.

Figure 42:
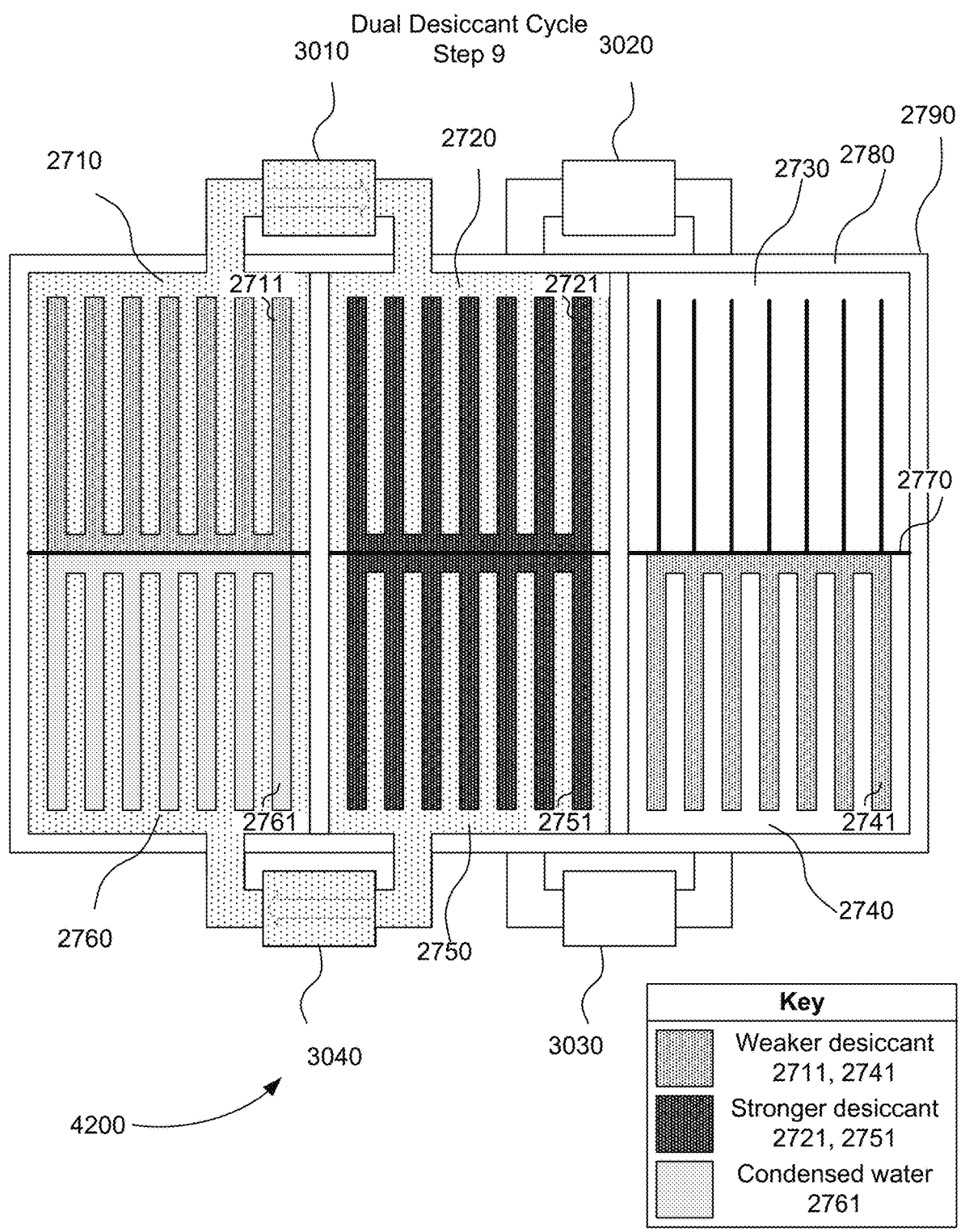
FIG. 42 is an exemplary diagram illustrating the ninth step of the repeated cycle of a heat transfer chamber of a dual desiccant AWG, in accordance with various embodiments.

In the ninth step of the dual desiccant AWG system seen in FIG. 42 through exemplary drawing 4200, channel 3010 is opened to connect the weaker desiccant 2711 with the stronger desiccant 2721, and channel 3040 is opened to connect the stronger desiccant 2751 with the condensation chamber 2760. The top system, chambers 2710 and 2720, is not ideally placed under a vacuum but could be if necessary. The bottom chambers 2760 and 2750 must be placed under a vacuum to promote the release of water vapor from the stronger desiccant 2750. Water vapor flows from the weaker desiccant in chamber 2710 to the stronger desiccant in chamber 2720, causing a temperature differential where heat is transferred from the strong desiccant 2721 to the strong desiccant 2751 via the heat transfer centerline 2770 indicated in black. L. Likewise the weaker desiccant is losing water vapor and therefore cools the condensation plates in chamber 2760. This causes the release of water vapor from the strong desiccant 2751 under a vacuum and the condensation of water in chamber 2760.

Figure 43:
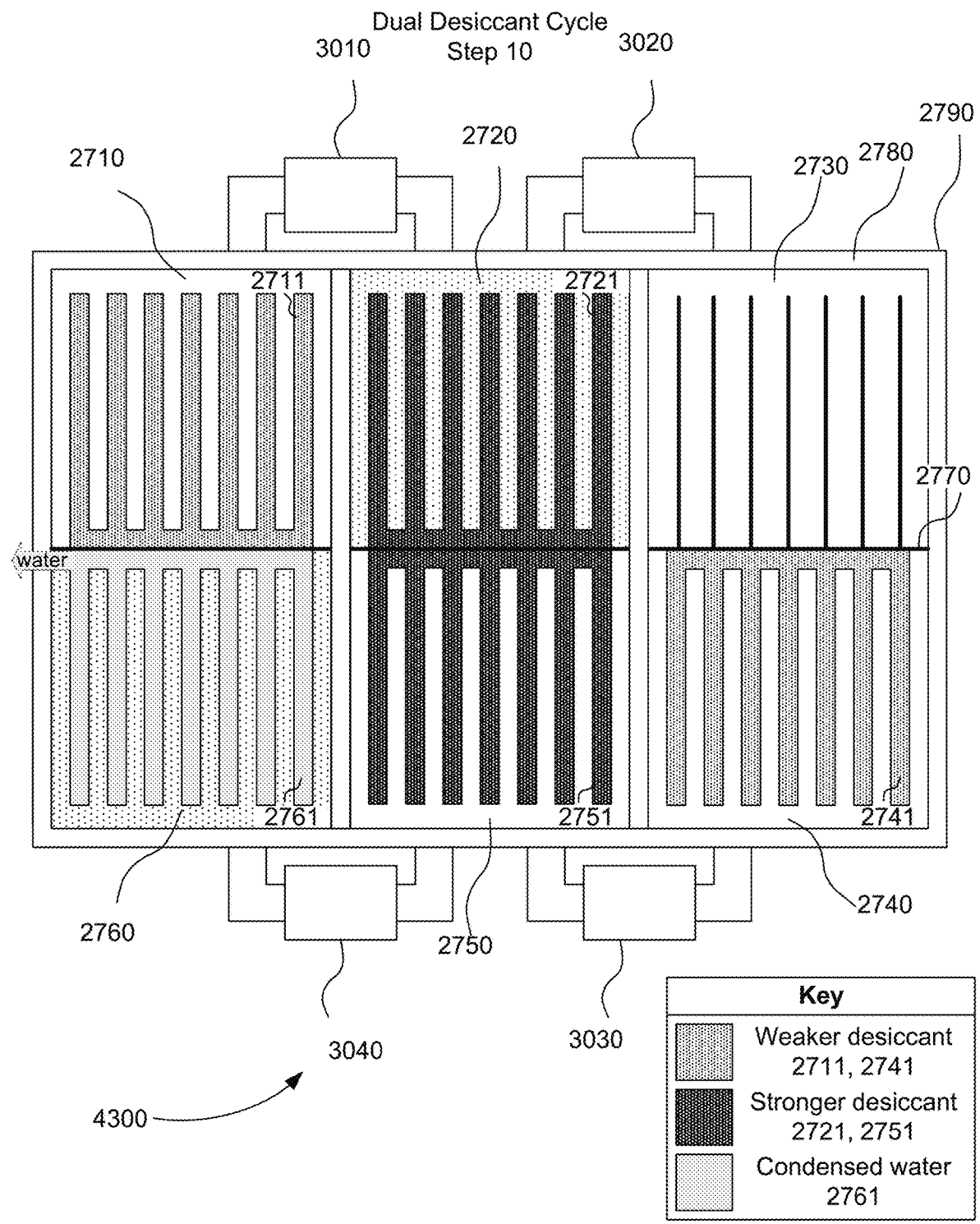
FIG. 43 is an exemplary diagram illustrating the tenth step of the repeated cycle of a heat transfer chamber of a dual desiccant AWG, in accordance with various embodiments.

The vacuum in the bottom system can be released, and the water condensed in chamber 2760 can then be collected, as seen in exemplary drawing 4300 in FIG. 43 during the tenth step of the dual desiccant AWG.

Figure 44:
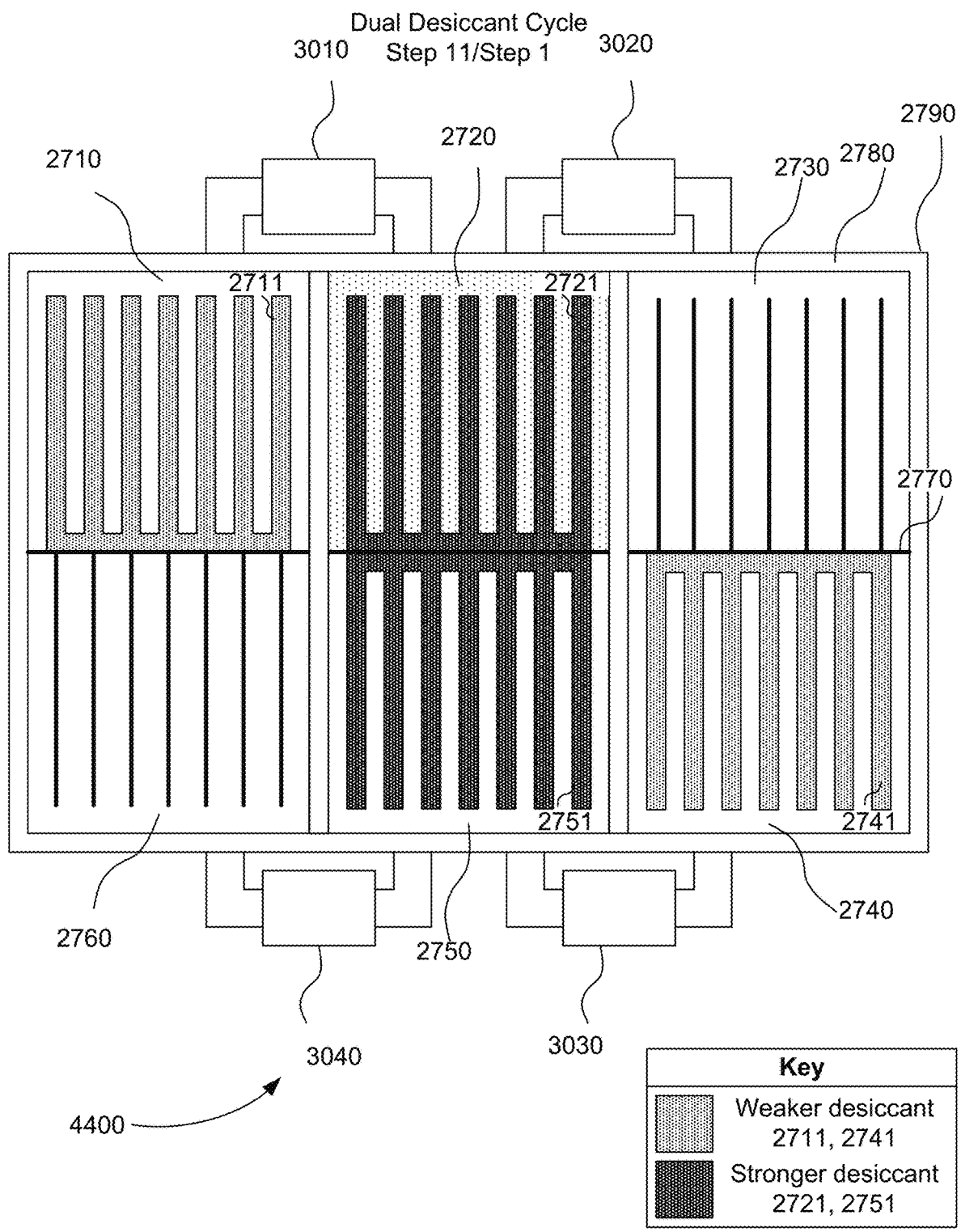
FIG. 44 is an exemplary diagram illustrating the eleventh step of the repeated cycle of a heat transfer chamber of a dual desiccant AWG, which is equal to the first step of the cycle and can continue to repeat steps 1-10, in accordance with various embodiments.

With this water removed, in the eleventh step in exemplary drawing 4400 in FIG. 44, the only component in the dual desiccant AWG containing water is the strong desiccant 2721. This is the exact same setup as in the first step shown in FIG. 34 and can repeat through the 10 steps. Therefore, the process can then repeat indefinitely to generate efficient and low cost water.

Figure 45:
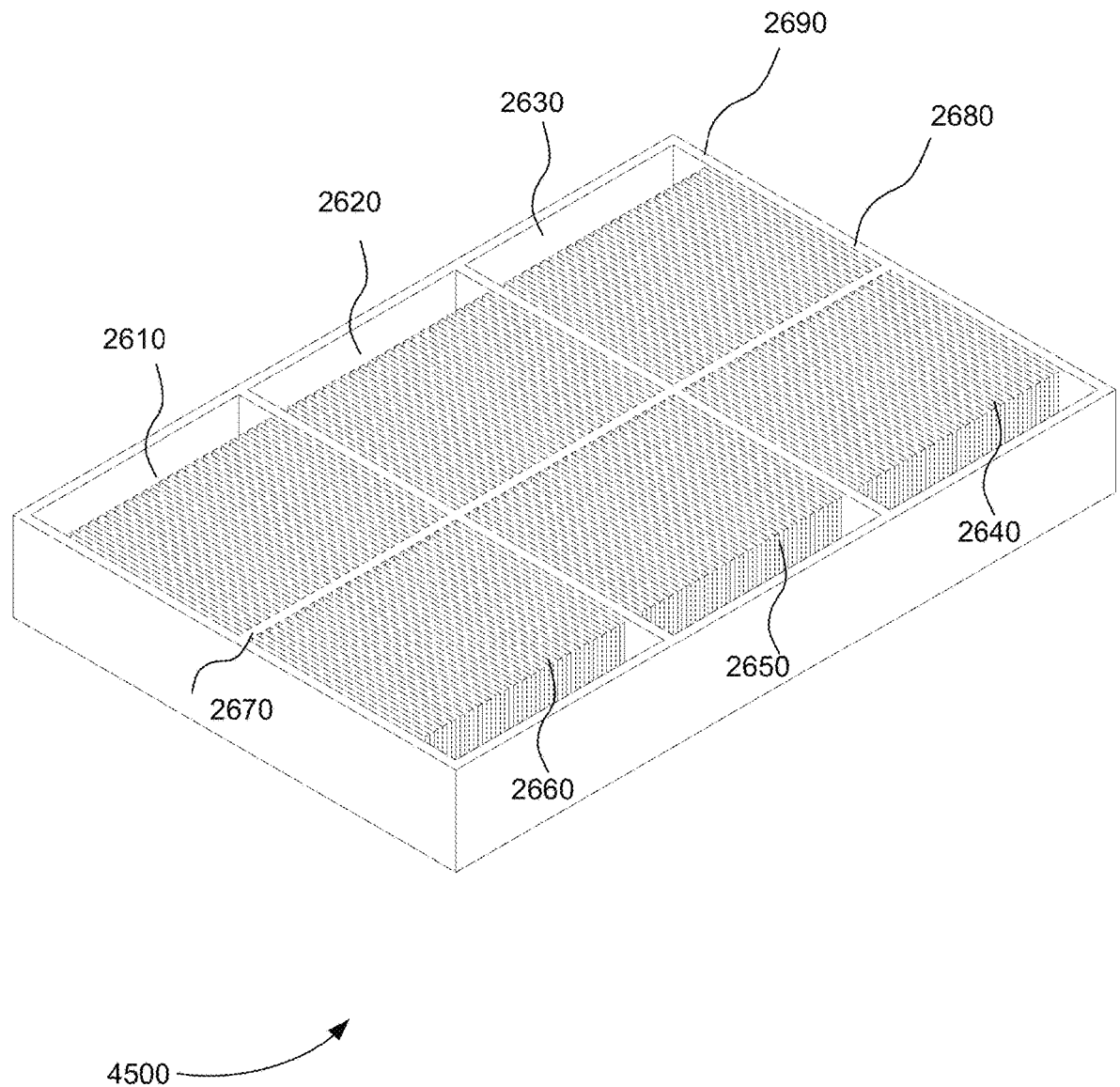
FIG. 45 is an exemplary diagram showing a three-dimensional view of a heat transfer chamber of a dual desiccant AWG containing six high surface area sections, in accordance with various embodiments.

FIG. 45 is an exemplary image 4500 detailing a three-dimensional outside view of the six chambered dual desiccant heat transfer chamber of an AWG, in accordance with various embodiments.

Figure 46:
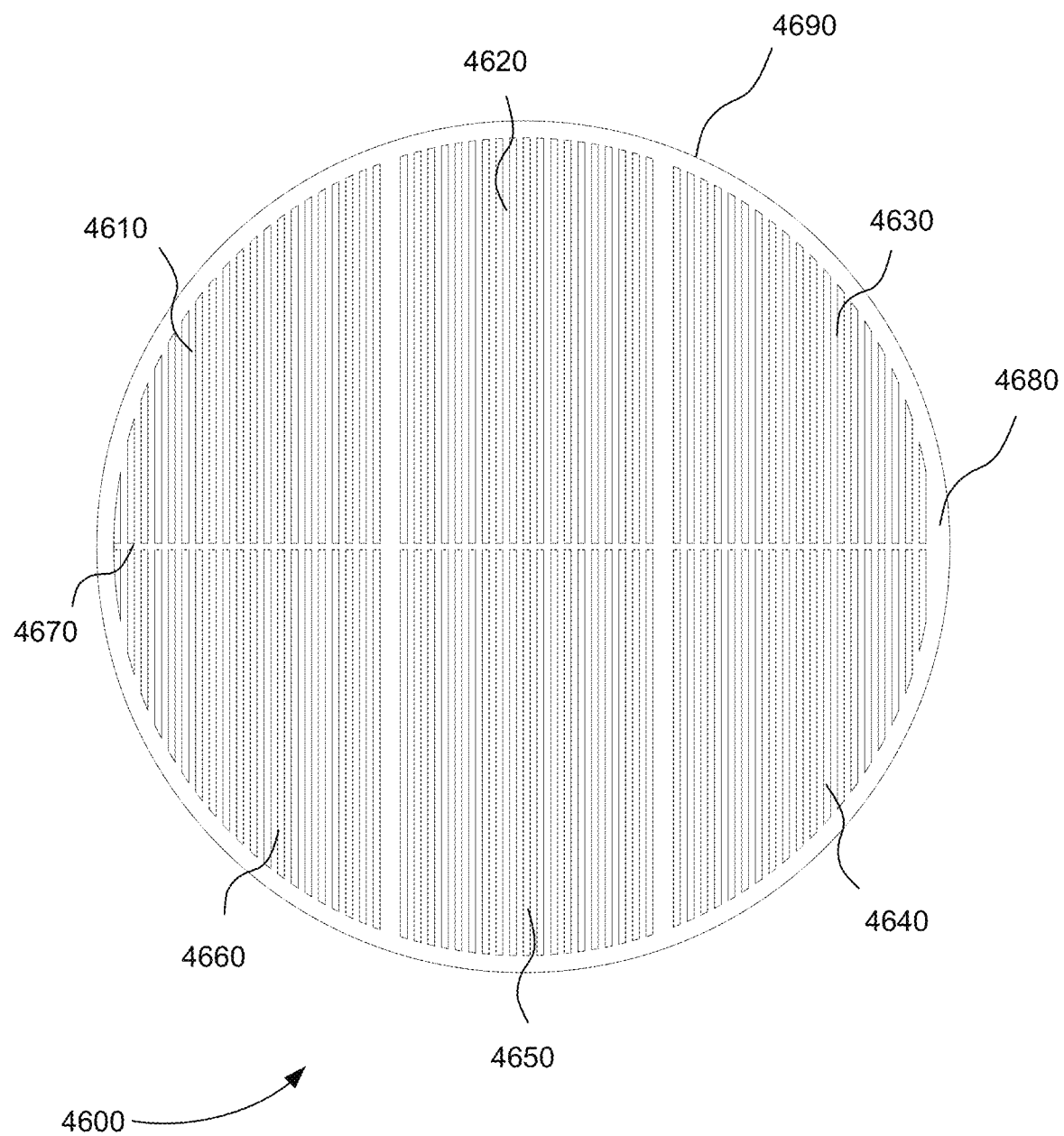
FIG. 46 is an exemplary diagram showing a heat transfer chamber of a dual desiccant AWG containing six high surface area sections, with a built-in vacuum chamber, in accordance with various embodiments.
Figure 47:
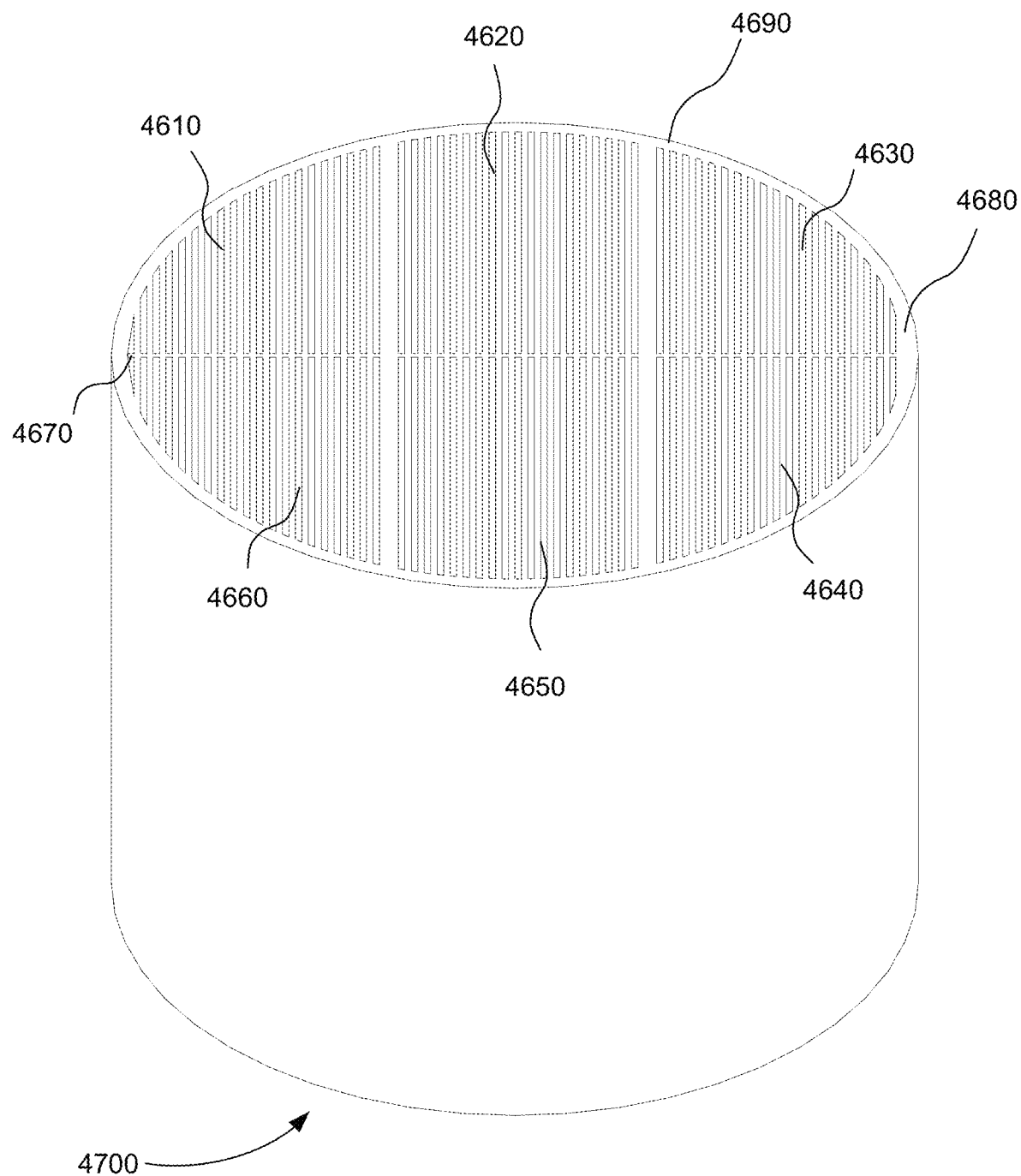
FIG. 47 is an exemplary diagram showing a three-dimensional view of a heat transfer chamber of a dual desiccant AWG containing six high surface area sections, with a built-in vacuum chamber, in accordance with various embodiments.

FIG. 46 is an exemplary drawing 4600 that offers another view of the dual desiccant chamber, this time in a rounded form. This demonstrates the exterior insulated vacuum chamber 4690, with internal chambers 4610, 4620, and 4630 representing the top system, and chambers 4660, 4650, and 4640 representing the bottom system. The top and bottom systems are divided by the conductive wall 4670, and separated by the two vertical large white columns. FIG. 47 is an exemplary drawing 4700 that offers a three-dimensional view of this system. This form demonstrates that a dual desiccant system can take many different forms and shapes compared to seen here, and can consist of several more types of desiccants and layouts of condensation and evaporation chambers.

Weight System

In various embodiments, the AWG includes a weight system to determine when to open and close the vacuum chamber. These systems work best for single desiccant AWGs as they cycle between absorbing and desorbing water, constantly changing weight, but could also be applied to dual desiccant systems or any AWG. In this system, the hygroscopic compounds in the center of the device sit on a movable platform over a spring, or any similar balancing system, connected to gears. When there is no water absorbed, the hygroscopic compounds are light, and the spring is raised. The gears keep the windows of the vacuum chamber open while the device is still absorbing water. When water is fully absorbed to a set point, the hygroscopic compounds are heavier, thereby compressing the spring, lowering it, and at the same time moving gears to close the windows of the vacuum chamber, sealing it.

Figure 48:
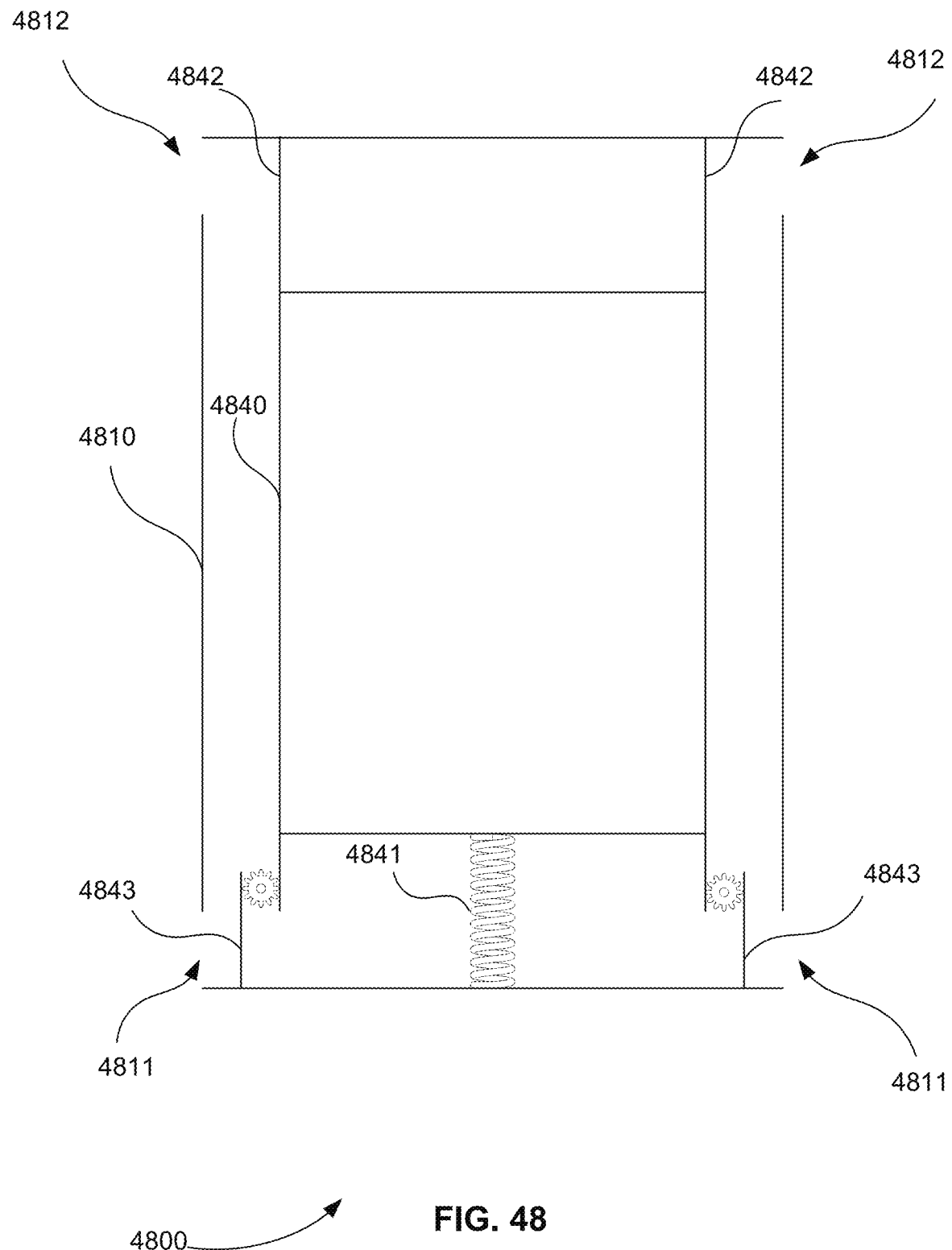
FIG. 48 is an exemplary diagram showing a cross-sectional inside view of the weight system of an AWG keeping the windows of the vacuum chamber open, in accordance with various embodiments.

FIG. 48 is an exemplary diagram 4800 showing a cross-sectional inside view of the weight system of an AWG keeping the windows of the vacuum chamber open, in accordance with various embodiments. In FIG. 48, heat transfer chamber 4840 containing a hygroscopic material has not yet absorbed enough water from the outside air to increase in weight enough to compress spring 4841. The bottom plate is secured to the ground. As a result, the positive gear system 4842 of heat transfer chamber 4840 is raised keeping open top windows 4812 of vacuum chamber 4810. Similarly, negative or reverse gear system 4843 of heat transfer chamber 4840 is lowered keeping open bottom windows 4811 of vacuum chamber 4810.

Figure 49:
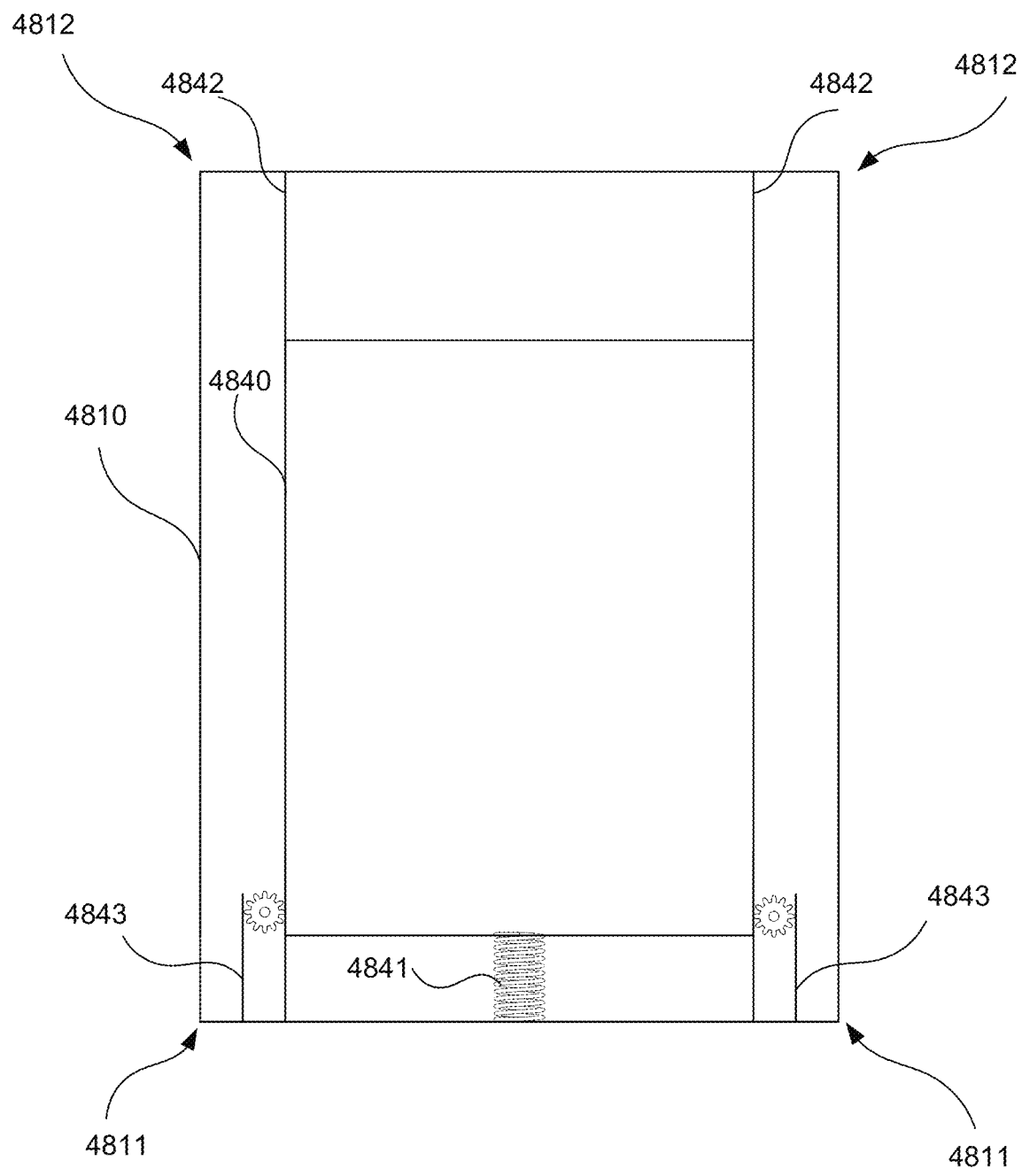
FIG. 49 is an exemplary diagram showing a cross-sectional inside view of the weight system of an AWG keeping the windows of the vacuum chamber closed, in accordance with various embodiments.

FIG. 49 is an exemplary diagram 4900 showing a cross-sectional inside view of the weight system of an AWG keeping the windows of the vacuum chamber closed, in accordance with various embodiments. In FIG. 49, heat transfer chamber 4840 has absorbed enough water from the outside air to increase in weight enough to compress spring 4841. As a result, the positive gear system 4842 of heat transfer chamber 4840 is lowered closing open top windows 4812 of vacuum chamber 4810. Similarly, negative or reverse gear system 4843 of heat transfer chamber 4840 is raised closing bottom windows 4811 of vacuum chamber 4810.

In various embodiments, the weight system further includes magnets to ensure the vacuum chamber closes and opens instantaneously.

Figure 50:
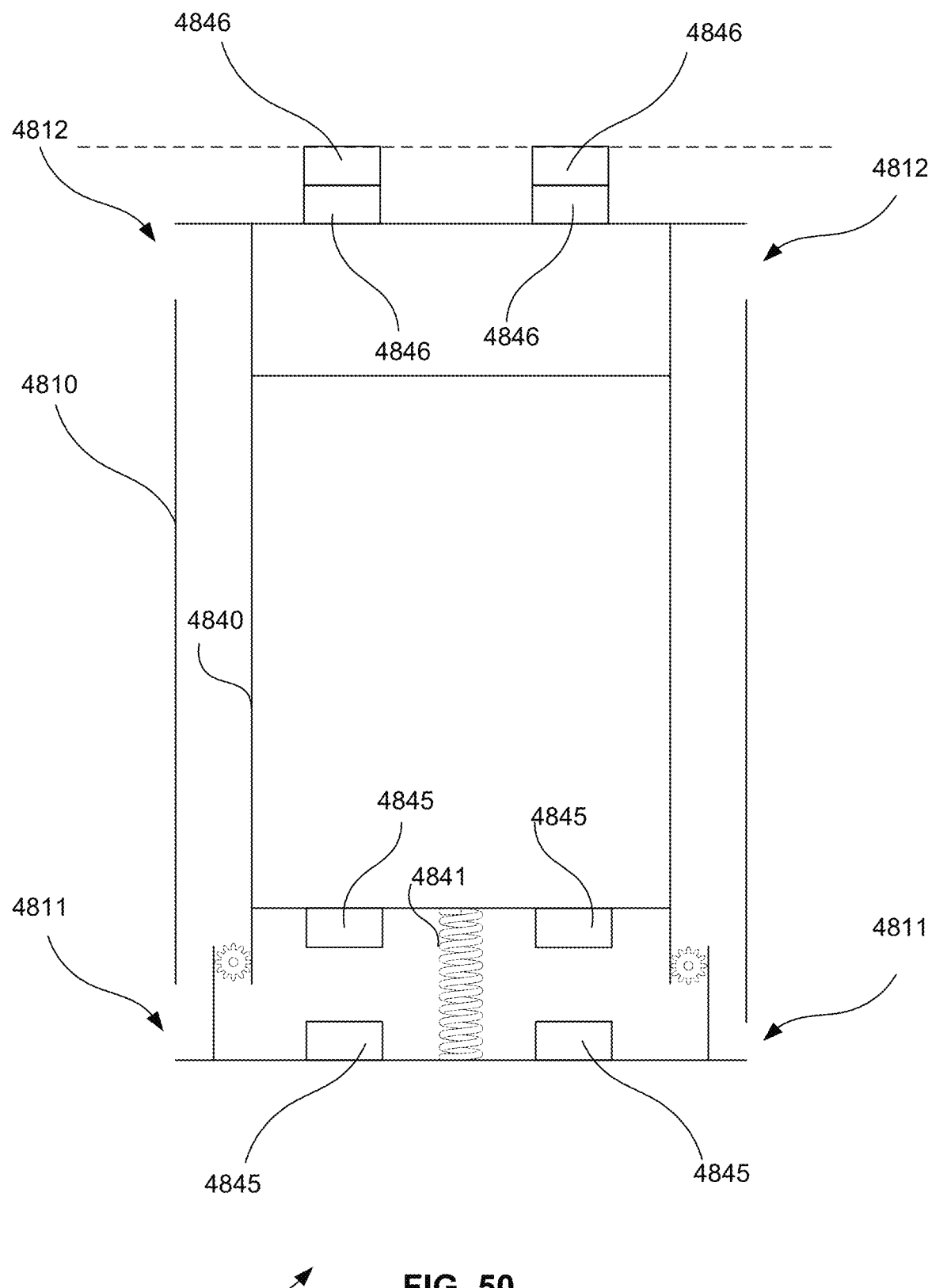
FIG. 50 is an exemplary diagram showing a cross-sectional inside view of the weight system of an AWG that includes magnets to secure the windows of the vacuum chamber open, in accordance with various embodiments.

FIG. 50 is an exemplary diagram 5000 showing a cross-sectional inside view of the weight system of an AWG that includes magnets to keep the windows of the vacuum chamber open, in accordance with various embodiments. In FIG. 50, heat transfer chamber 4840 has not yet absorbed enough water from the outside air to increase in weight enough to overcome the attraction of top magnets 4846. The force needed to overcome the attraction of top magnets 4846 is greater than or equal to the force to entirely compress spring 4841. Thus, once the attraction of top magnets 4846 is overcome, heat transfer chamber 640 falls instantaneously closing windows 4811 and 4812 of vacuum chamber 4810. Bottom magnets 4845, then come into contact.

Figure 51:
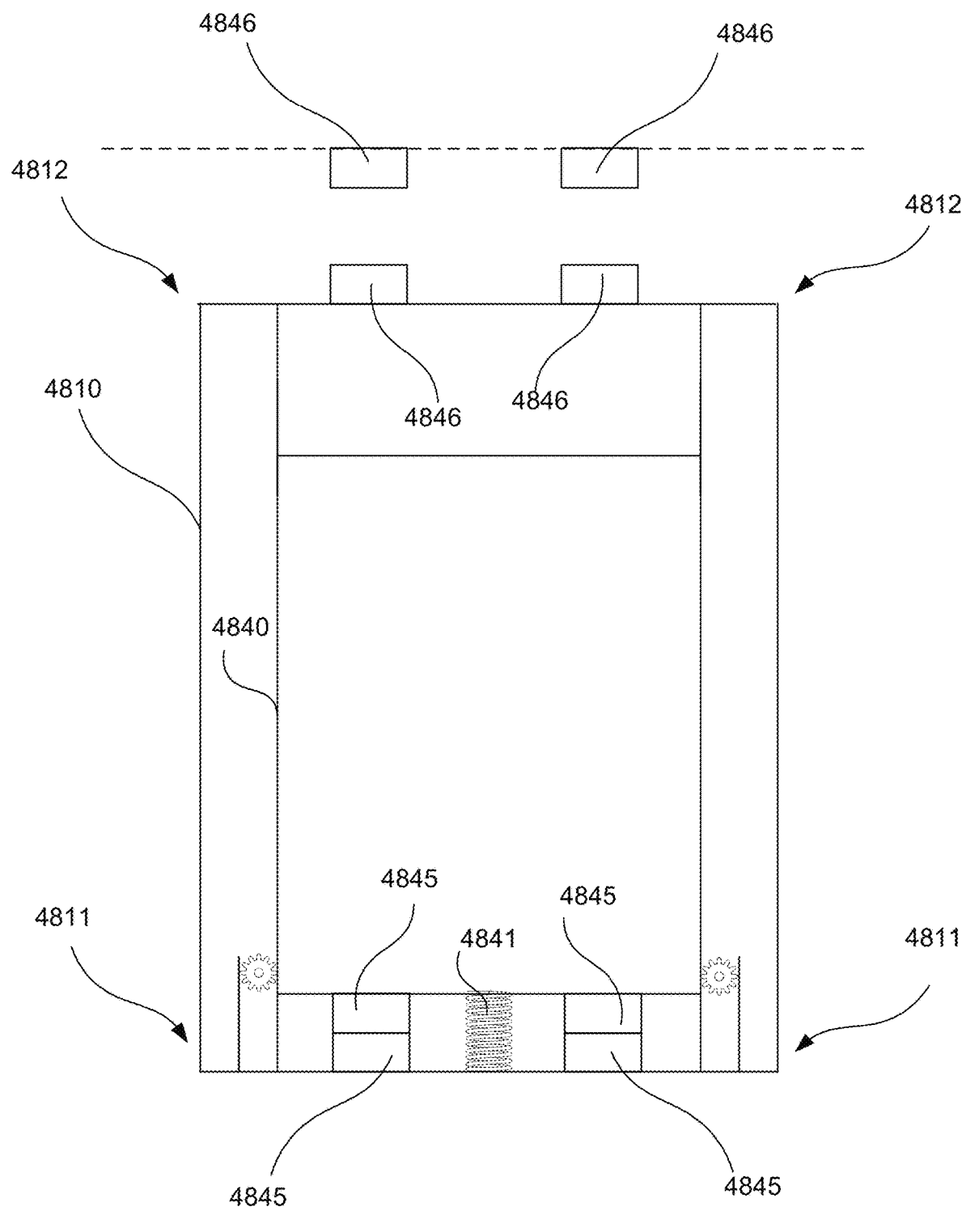
FIG. 51 is an exemplary diagram showing a cross-sectional inside view of the weight system of an AWG that includes magnets to secure the windows of the vacuum chamber closed, in accordance with various embodiments.

FIG. 51 is an exemplary diagram 5100 showing a cross-sectional inside view of the weight system of an AWG that includes magnets to keep the windows of the vacuum chamber closed, in accordance with various embodiments. In FIG. 51, heat transfer chamber 4840 has absorbed enough water from the outside air to increase in weight enough to break the attraction of magnets 4846 and to compress spring 4841, closing vacuum chamber 4810.

For vacuum chamber 4810 to open back up and open windows 4811 and 4812, heat transfer chamber 4840 needs to release enough water so that the force of spring 4841 force is greater than both the weight of heat transfer chamber 4840 and the attraction from bottom magnets 4845. So, once heat transfer chamber 4840 loses enough water weight, spring 4841 breaks the attraction from bottom magnets 4845. Once this happens, all of the force that bottom magnets 4845 were using to hold heat transfer chamber 4840 down is lost, so the force of spring 4841 pushes heat transfer chamber 4840 up instantly. At the same time, top magnets 4846 catch heat transfer chamber 4840, holding it in place until it regains enough water. The cycle of FIGS. 50 and 51 then repeats.

In various embodiments, the weight system further includes magnets that aid in releasing the vacuum pressure in the vacuum chamber. For example, the bottom magnets of the weight system are made to touch after the windows of the vacuum chamber close. They are also made to open slightly before the windows of the vacuum chamber open. The bottom magnets connected to the vacuum chamber include a hole to carry air into or out of the vacuum chamber that is closed when the bottom magnets connected to the heat transfer chamber contact them. Thus, right before the windows of the vacuum chamber open, the bottom magnets separate, opening the holes in the bottom magnets connected to the vacuum chamber, allowing air into the vacuum chamber, and releasing the vacuum.

Figure 52:
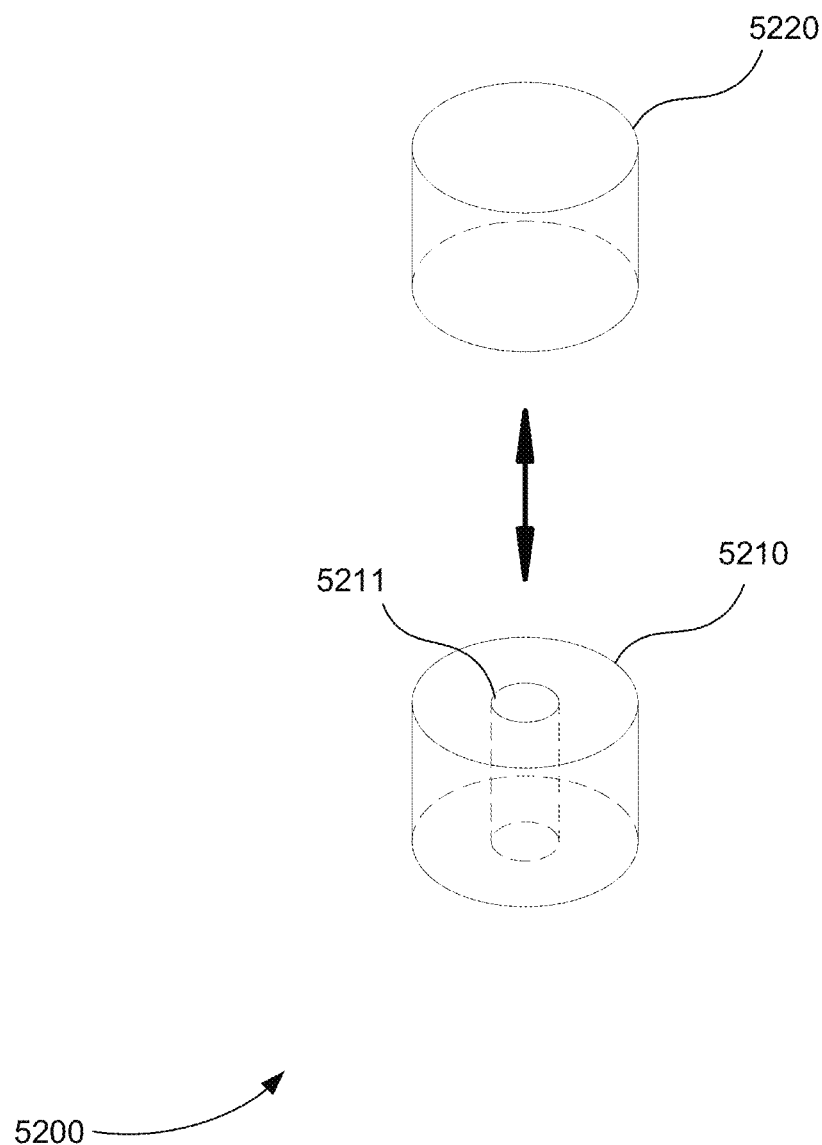
FIG. 52 is an exemplary diagram showing a circular magnet with a central hole and solid circular magnet, in accordance with various embodiments.

FIG. 52 is an exemplary diagram 5200 showing a circular magnet with a central hole, in accordance with various embodiments. In FIG. 52, circular magnet 5210 includes hole 5211 through the center of circular magnet 5210. Another magnet 5220 is present and illustrates how when it comes down and connects it seals the hole in magnet 5210.

Figure 53:
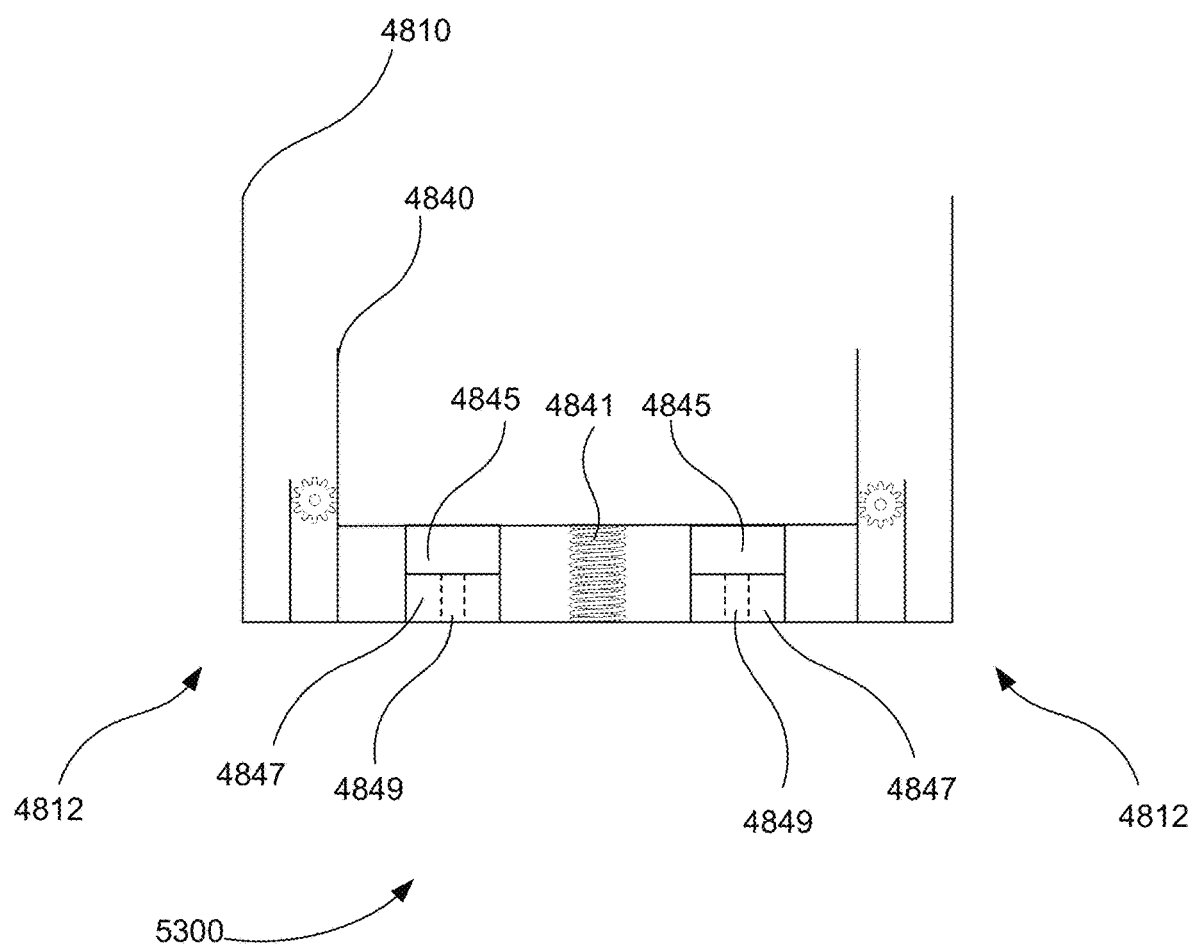
FIG. 53 is an exemplary diagram showing a lower portion of a cross-sectional inside view of the weight system of a sealed AWG that includes bottom magnets that include holes that are shown as being closed by contact with attracted magnets, in accordance with various embodiments.

FIG. 53 is an exemplary diagram 5300 showing a lower portion of a cross-sectional inside view of the weight system of an AWG that includes bottom magnets that include holes that are shown as being closed by contact with attracted magnets, in accordance with various embodiments. In FIG. 53, heat transfer chamber 4840 has absorbed enough water from the outside air to increase in weight enough to compress spring 4841. This causes each bottom magnet 4845 connected to heat transfer chamber 4840 to attract and touch each bottom magnet 4847 connected to vacuum chamber 4810.

Each bottom magnet 4847 includes a hole 4849 allowing bottom magnet 4847 to transmit air into vacuum chamber 4810. However, as shown in FIG. 51, when a bottom magnet 4845 contacts a bottom magnet 4847, hole 4849 of bottom magnet 4847 is closed. Thus, hole 4849 of each bottom magnet 4847 of FIG. 51 is closed.

Figure 54:
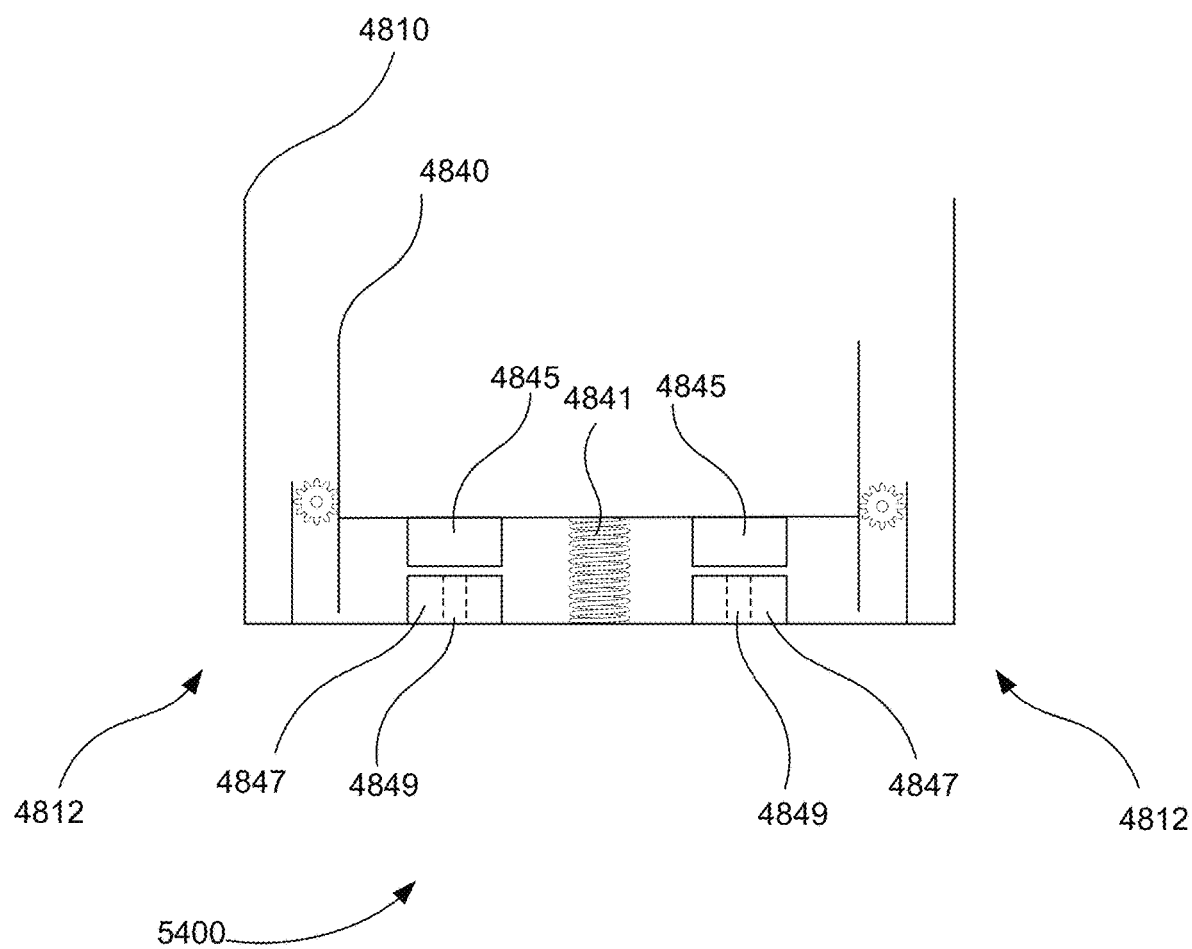
FIG. 54 is an exemplary diagram showing a lower portion of a cross-sectional inside view of the weight system of an AWG that includes bottom magnets that include holes that are shown as being opened by separation from attracted magnets before the windows of the vacuum chamber are open, in accordance with various embodiments.

FIG. 54 is an exemplary diagram 5400 showing a lower portion of a cross-sectional inside view of the weight system of an AWG that includes bottom magnets that include holes that are shown as being opened by separation from attracted magnets, in accordance with various embodiments. In FIG. 54, heat transfer chamber 4840 has started to remove its condensed water and has lost enough weight to cause spring 4841 to separate bottom magnets 4845 from bottom magnets 4847 but not to open windows 4812 of vacuum chamber 4810.

Bottom magnets 4845 can separate from bottom magnets 4847 even though vacuum chamber 4810 is still under vacuum. They can separate because they only have to overcome a small area of pressure proportional to the size of holes 4849 in bottom magnets 4847. In various embodiments, the size of holes 4849 is minimized to reduce the pressure required to open vacuum chamber 4810. Once holes 4849 in bottom magnets 4847 are opened, they release the vacuum of vacuum chamber 4810 by allowing air into vacuum chamber 4810.

Figure 55:
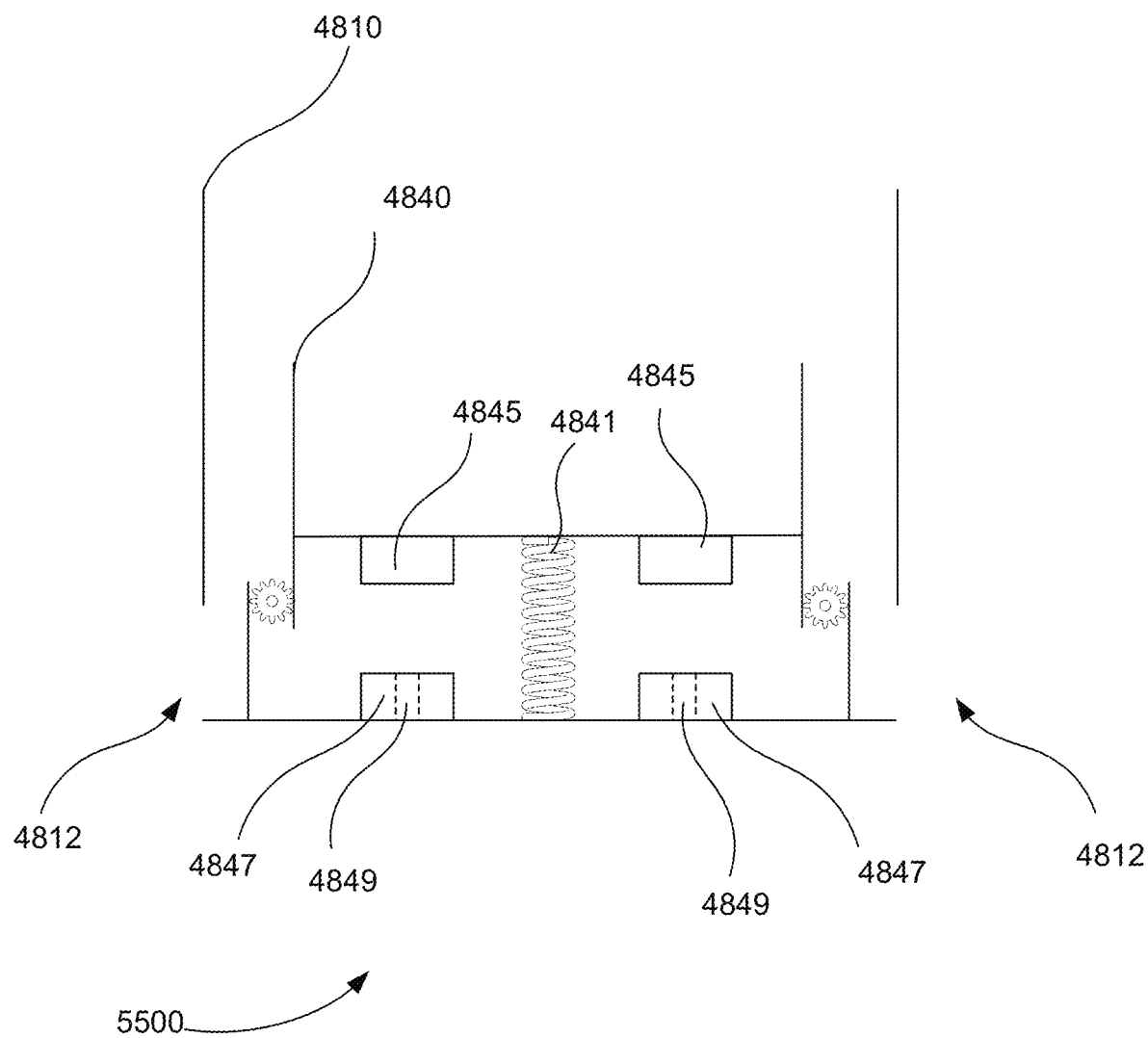
FIG. 55 is an exemplary diagram showing a lower portion of a cross-sectional inside view of the weight system of an opened AWG that includes bottom magnets that include holes that are shown as being fully opened by separation from attracted magnets, and the windows of the vacuum chamber are opened, in accordance with various embodiments.

FIG. 55 is an exemplary diagram 5500 showing a lower portion of a cross-sectional inside view of the weight system of an AWG that includes bottom magnets that include holes that are shown as being fully opened by separation from attracted magnets, along with the opening of windows, in accordance with various embodiments. In FIG. 55, heat transfer chamber 4840 has started to remove its condensed water and has lost enough weight to cause spring 4841 to separate bottom magnets 4845 from bottom magnets 4847 completely and to open windows 4812 of vacuum chamber 4810.

Steam Induced Vacuum

In various embodiments, the AWG uses a steam induced vacuum. When a small amount of hygroscopic material is heated suddenly, it fills the vacuum chamber with steam, creating a fully steamed system. As the steam fills the chamber from the top, given that steam rises, it displaces all of the air in it, which is pushed through a one-way valve at the bottom of the chamber. This creates a chamber of only steam. In the few minutes it takes to cool the system, it will reach a vacuum with only the pressure of the water vapor at the given temperature of the surrounding environment.

Figure 56:
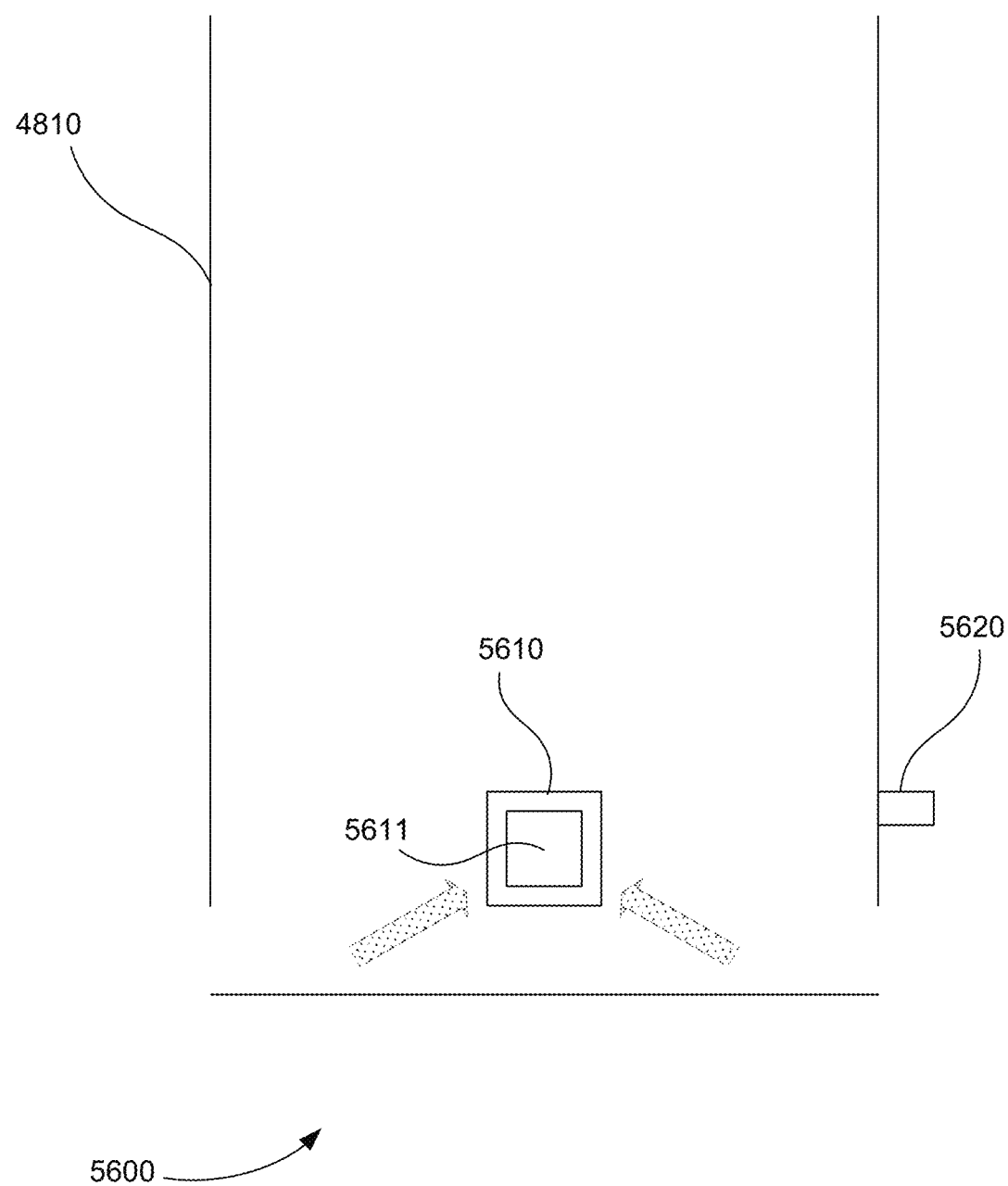
FIG. 56 is an exemplary diagram showing a cross-sectional inside view of the vacuum chamber of an AWG that includes an inactivated heating element embedded in a small amount of the hygroscopic material that is absorbing water from the atmosphere and a one-way valve before the initiation of a steam induced vacuum, or the generation and subsequent cooling of steam to create a vacuum, in accordance with various embodiments.

FIG. 56 is an exemplary diagram 5600 showing a cross-sectional inside view of the vacuum chamber of an AWG that includes a heating element and a one-way valve before the initiation of a steam induced vacuum, in accordance with various embodiments. In FIG. 56, vacuum chamber 4810 includes heating element 5610 and one-way valve 5620. Heating element 5610 is used to heat a small amount of hygroscopic material 5611. One-way valve 5620 is used to vent air and excess steam from vacuum chamber 4810, and only allows air to flow out of the vacuum chamber. Before heating element 5610 is activated the pressure inside and outside of vacuum chamber 4810 is the same.

Figure 57:
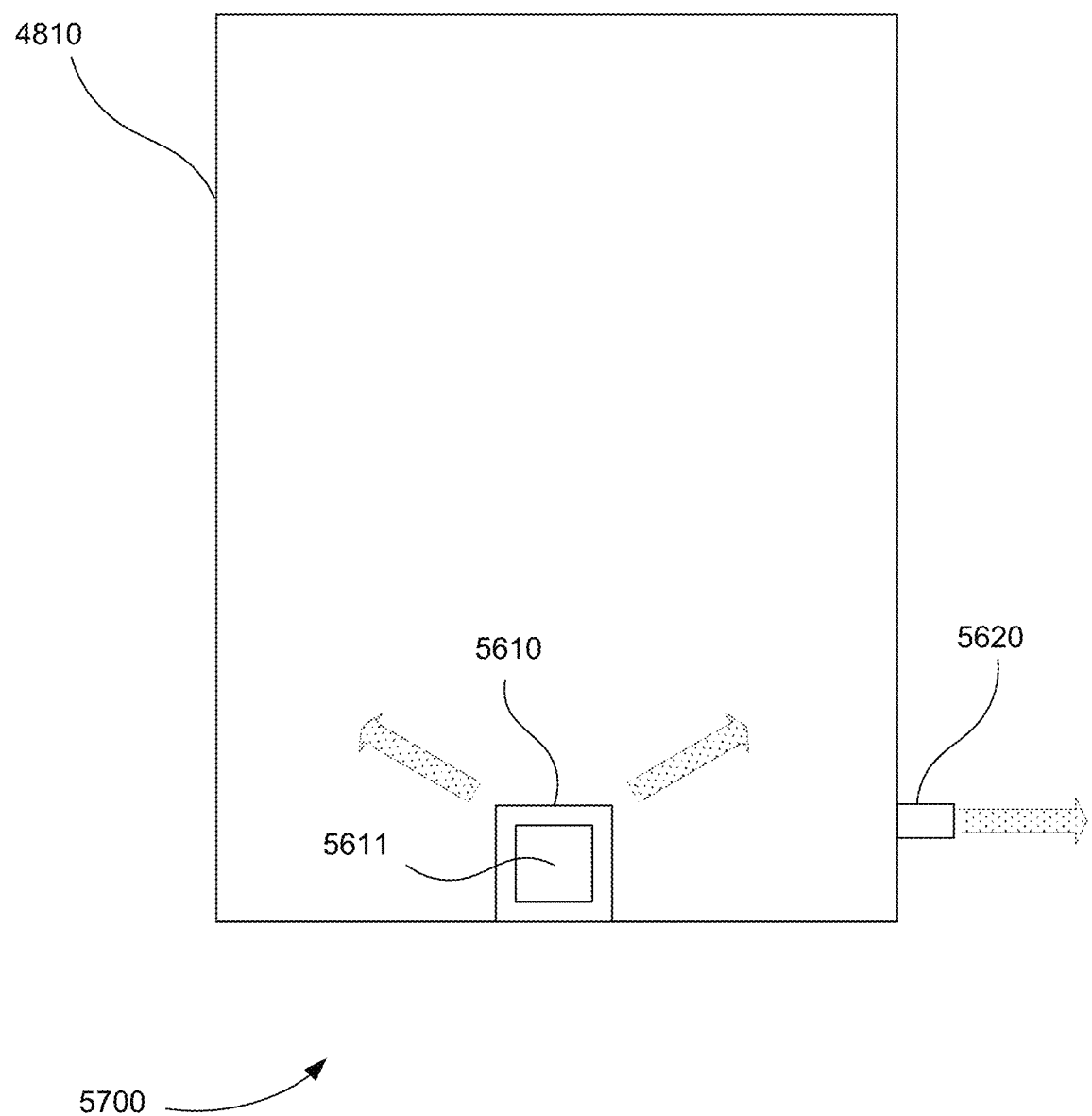
FIG. 57 is an exemplary diagram showing a cross-sectional inside view of the vacuum chamber of an AWG that includes an activated heating element embedded in a small amount of saturated hygroscopic material that is being heated and releasing steam along with a one-way valve during the initiation phase of a steam induced vacuum where air is displaced with steam, in accordance with various embodiments.

FIG. 57 is an exemplary diagram 5700 showing a cross-sectional inside view of the vacuum chamber of an AWG that includes a heating element and a one-way valve during the initiation of a steam vacuum pump, in accordance with various embodiments. In FIG. 57, the steam vacuum pump is initiated by suddenly activating heating element 5610 to heat saturated hygroscopic material 5611. In turn, hygroscopic material 5611 releases water vapor in the form of steam. The steam rises displacing the air in vacuum chamber 4810. One-way valve 5620 at the base of vacuum chamber 4810 is opened causing the heavier air to be released through the valve.

Figure 58:
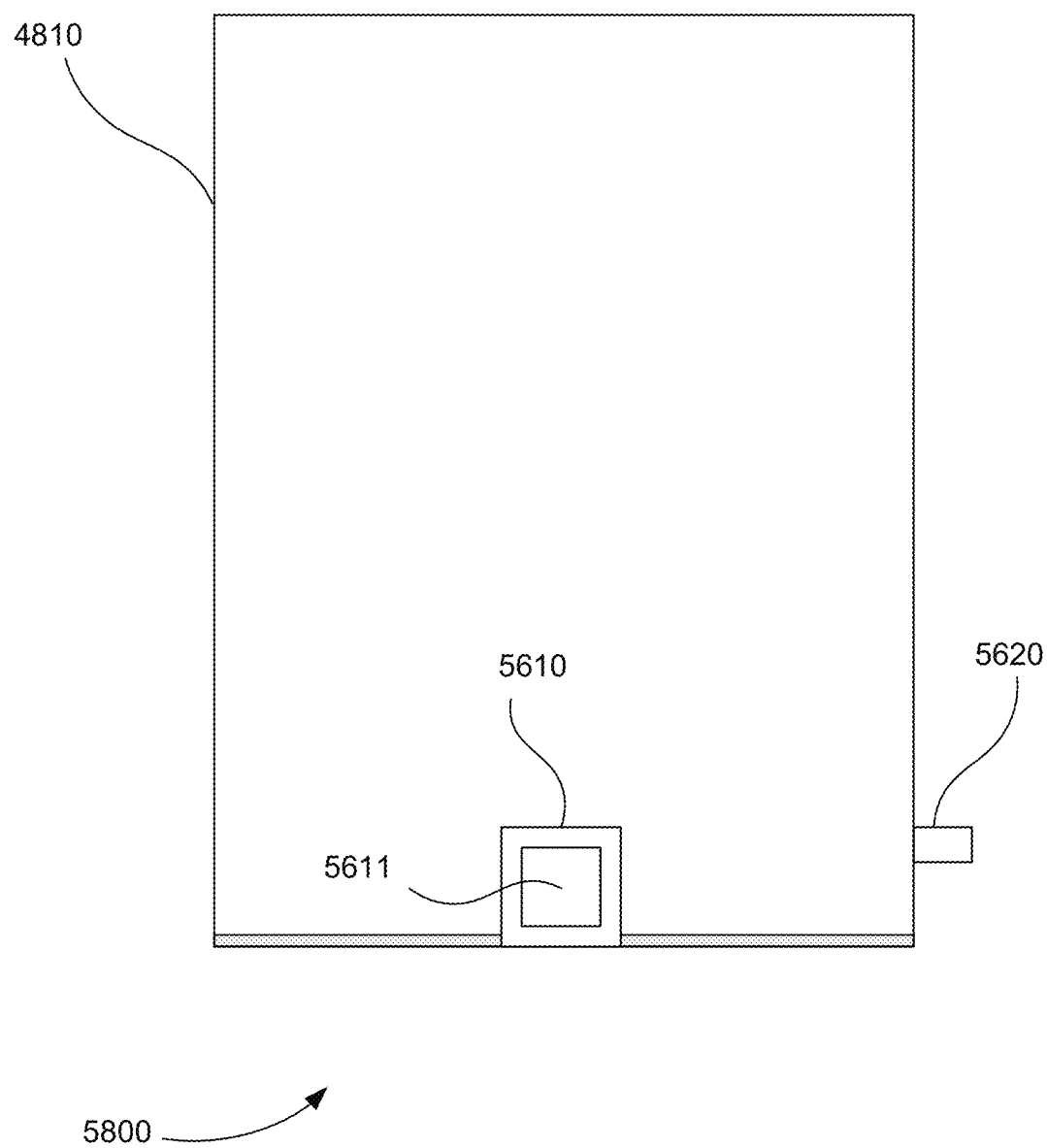
FIG. 58 is an exemplary diagram showing a cross-sectional inside view of the vacuum chamber of an AWG that includes an inactive heating element and a one-way valve after the steam generated has cooled and created a vacuum, in accordance with various embodiments.

FIG. 58 is an exemplary diagram 5800 showing a cross-sectional inside view of the vacuum chamber of an AWG that includes a heating element and a one-way valve after a steam induced vacuum has been created, in accordance with various embodiments. In FIG. 58, vacuum chamber 4810 now only includes water vapor. One-way valve 5620 has been closed and heating element 5610 is no longer activated. Therefore, hygroscopic material 5611 is no longer releasing steam.

At 100 C, water boils, with a vapor pressure equal to 1 atm. However, as this vapor cools to room temperature, ~20 C, the vapor pressure becomes around 0.02 atm. This means that there is 50 times less pressure inside vacuum chamber 4810 than normal atmosphere when the only pressure comes from water vapor.

Reservoir

In various embodiments, an AWG contains a reservoir to store the liquid water generated until it is used. For drinking purposes, extra filters, circulation pumps, ultraviolet lights, solar thermal heat, and other mechanisms can maintain the purity of the water and prevent the accumulation of particles or bacteria. Most desiccant and hygroscopic materials are inert and leave behind no organic or inorganic trace in the water produced. With salt based AWGs utilizing calcium chloride or an equivalent salt desiccant, the possibility of the salt becoming a saturated solution and leaking into the reservoir creates another concern. While this would be unlikely due to the gel the salt is infused with, to increase the safety and user trust of the device, and prevent the distribution of salt water, electronic sensors that measure particle concentration or electrical conductivity of the water in the reservoir can be implemented and connected with the computer system 100 to alert users of salt or other harmful particles present in the water.

Water produced from an AWG would be the equivalent of pure distilled water, lacking in minerals such as calcium, magnesium, sodium, fluoride, potassium, iron, and zinc. Distilled water is often unfavorable as it lacks the flavor and taste minerals provided in most water sources, such as tap water and bottled water. Further mineralization processes can be implemented for enhancing the taste of the water produced.

Atmospheric Water Generator with Heat Transfer Chamber

Figure 59:
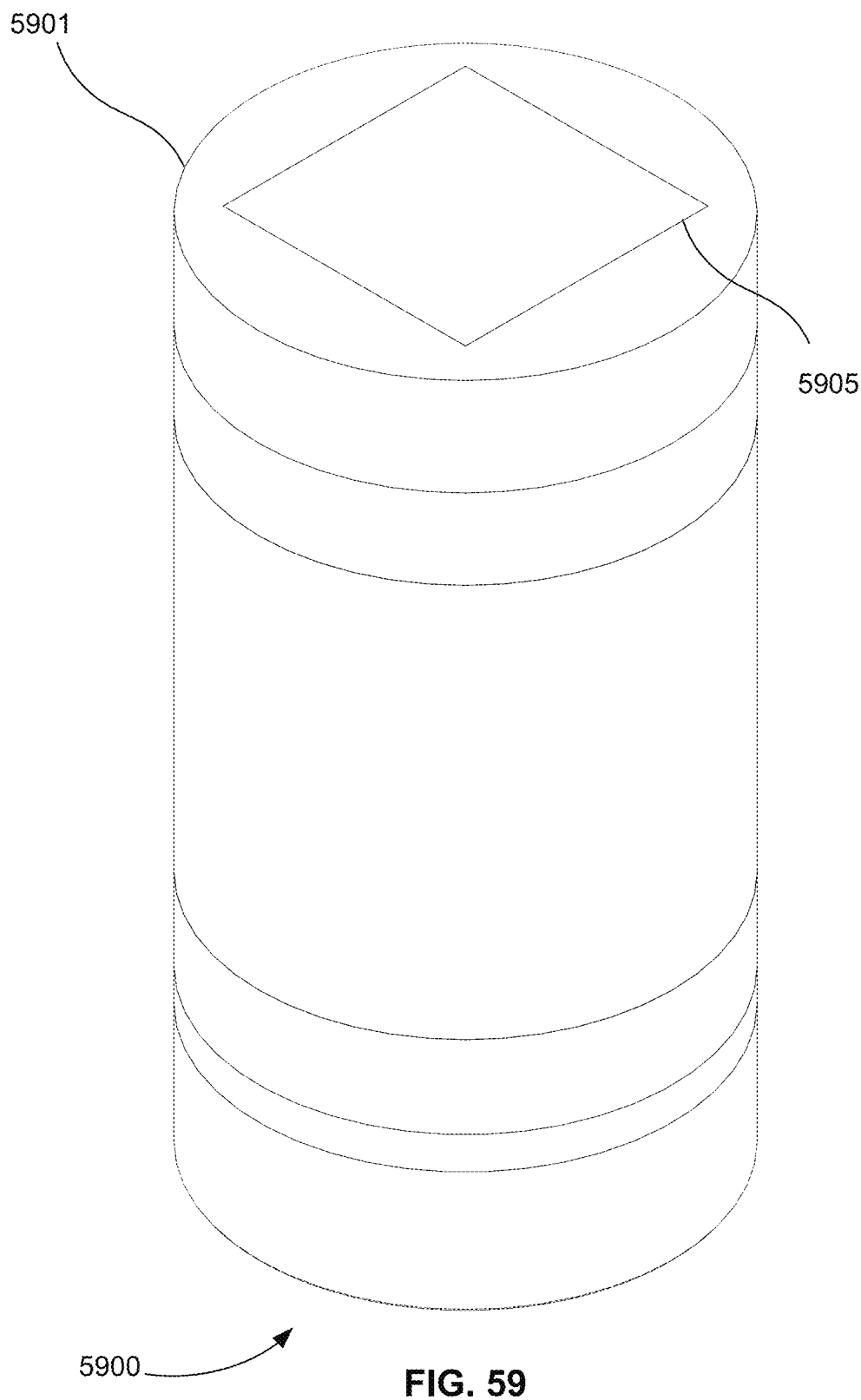
FIG. 59 is an exemplary diagram showing a three-dimensional outside view of an AWG that includes a heat transfer chamber, in accordance with various embodiments.

FIG. 59 is an exemplary diagram 5900 showing a three-dimensional outside view of an AWG that includes a heat transfer chamber, in accordance with various embodiments. AWG 5901 includes solar panel 5905. Solar panel 5905 is used to supply the electrical energy needed for AWG 5901. In various embodiments, AWG 5901 can also include a battery for storing electrical energy.

In FIG. 59, AWG 5901 is shown as having a cylindrical shape. In various alternative embodiments, the AWG can have a shape that is other than a cylindrical shape.

Figure 60:
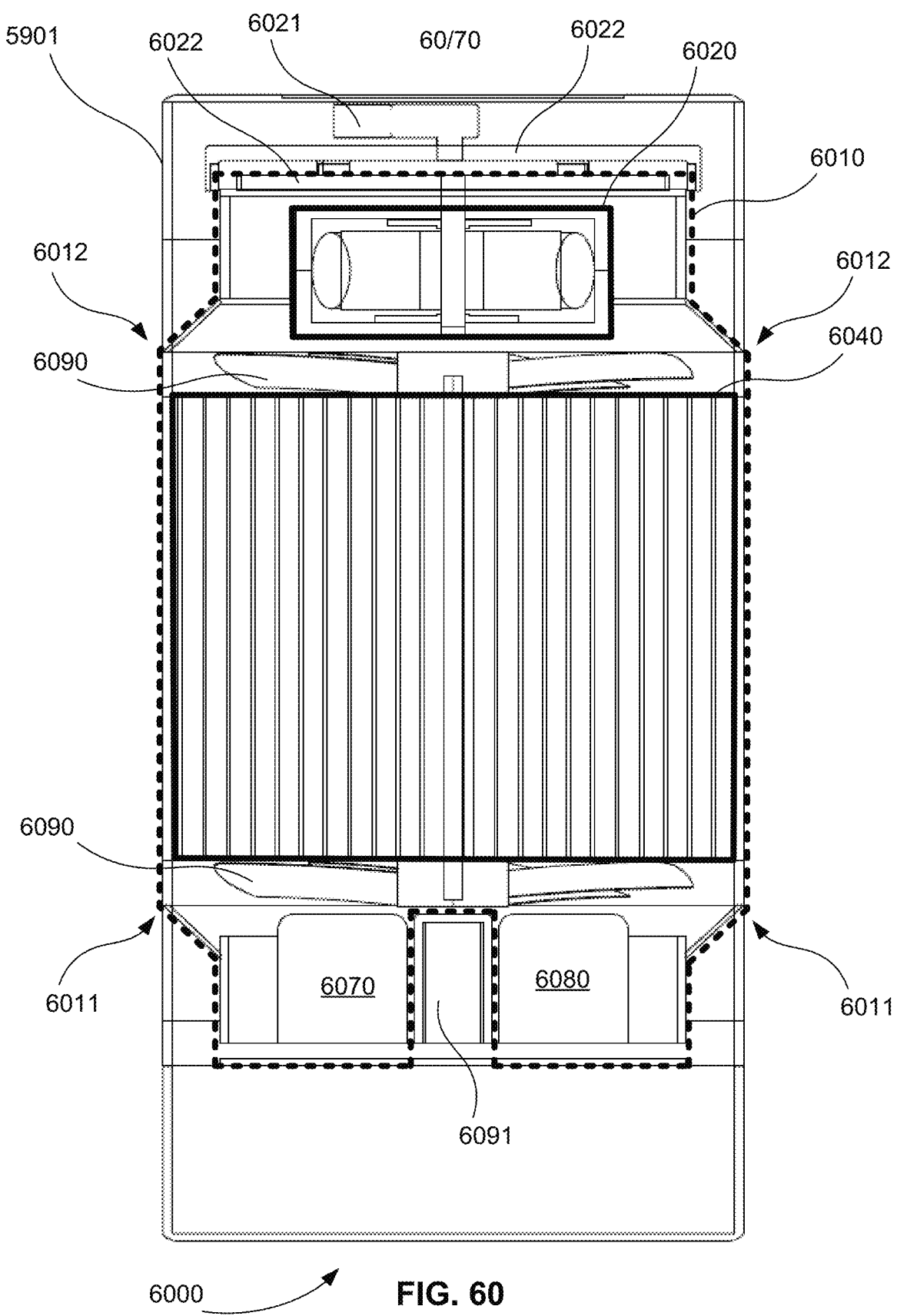
FIG. 60 is an exemplary diagram showing a cross-sectional inside view of an AWG that includes a heat transfer chamber, in accordance with various embodiments.

FIG. 60 is an exemplary diagram 6000 showing a cross-sectional inside view of an AWG that includes a heat transfer chamber, in accordance with various embodiments. In FIG. 60, AWG 5901 is shown to include vacuum chamber 6010. Vacuum chamber 6010 includes one or more windows 6011 and 6012 that can be opened. FIG. 49, for example, shows how one or more windows can be opened.

Returning to FIG. 60, vacuum chamber 6010 also includes heat transfer chamber 6040, pump 6020, and reservoir 6070.

Heat transfer chamber 6040 includes an area on the outside of heat transfer chamber 6040 that is coated with a hygroscopic material. In FIG. 60, heat transfer chamber 6040 is shown as a coiled channel.

Figure 61:
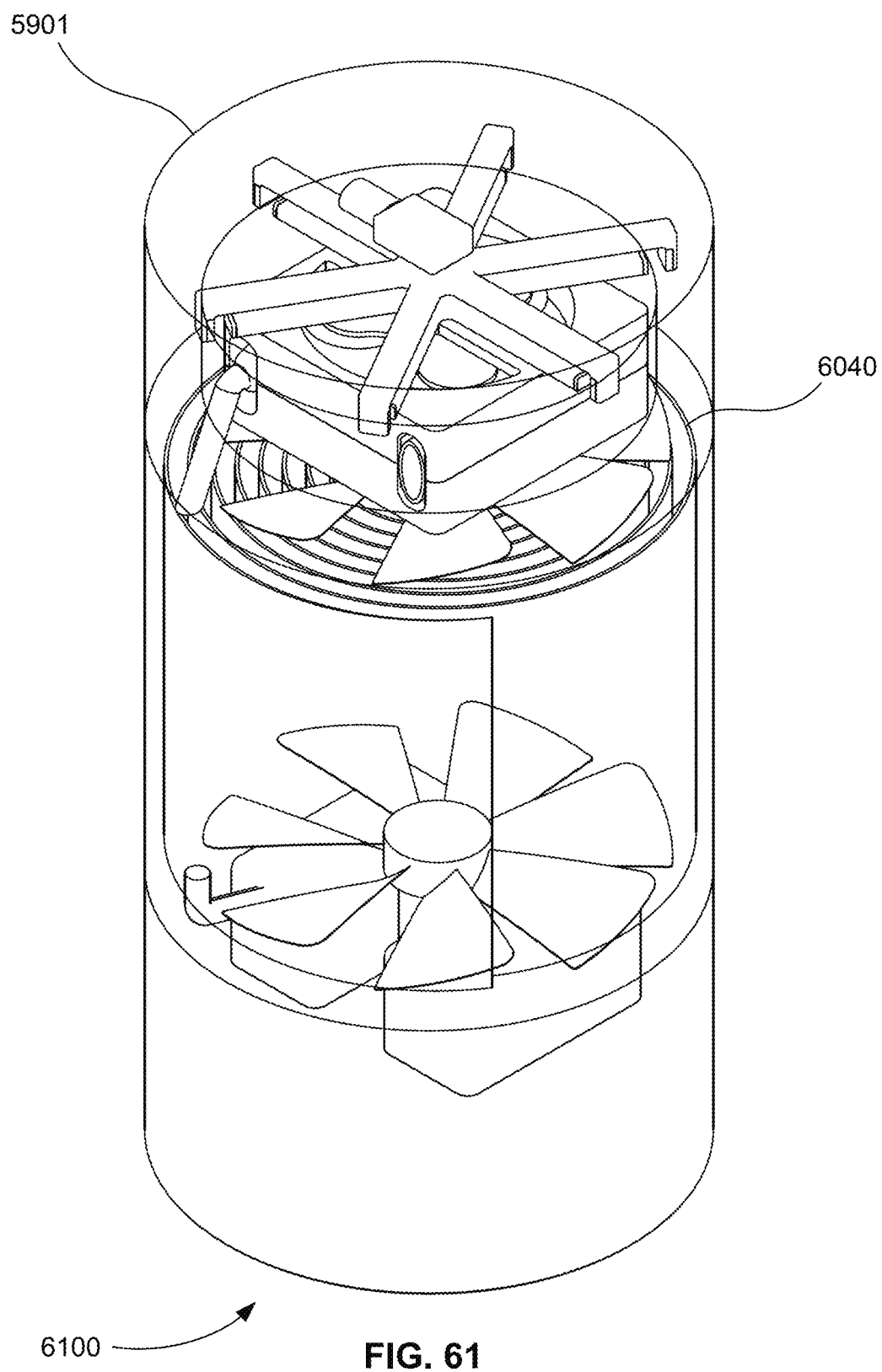
FIG. 61 is an exemplary diagram showing a three-dimensional perspective view of the heat transfer chamber of FIG. 59, in accordance with various embodiments.
Figure 62:
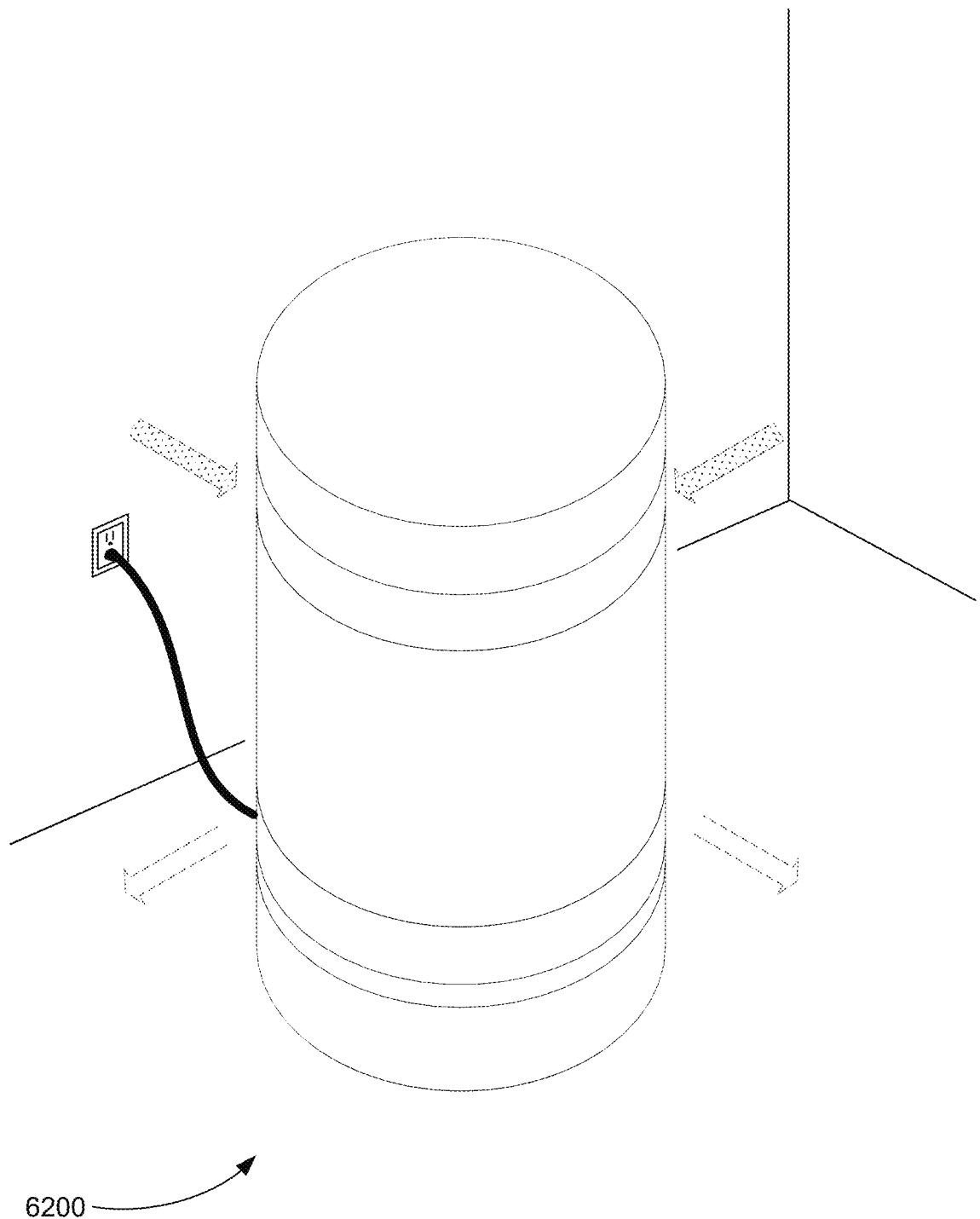
FIG. 62 is an exemplary diagram showing a three-dimensional outside view of an AWG being used as a plug in dehumidifier, in accordance with various embodiments.
Figure 63:
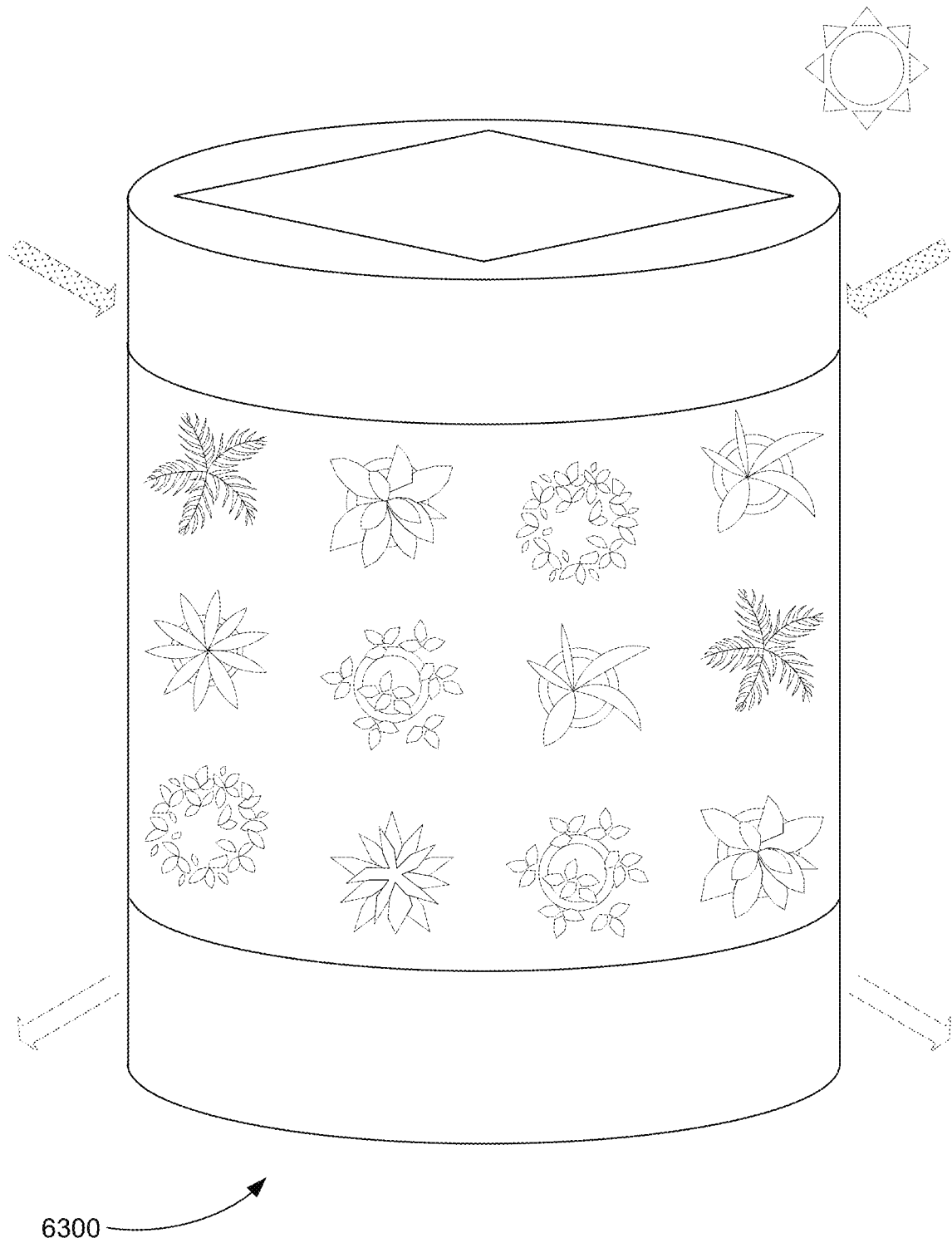
FIG. 63 is an exemplary diagram showing a three-dimensional outside view of an AWG being used as a water harvester to water plants that are planted in or around the device, in accordance with various embodiments.
Figure 64:
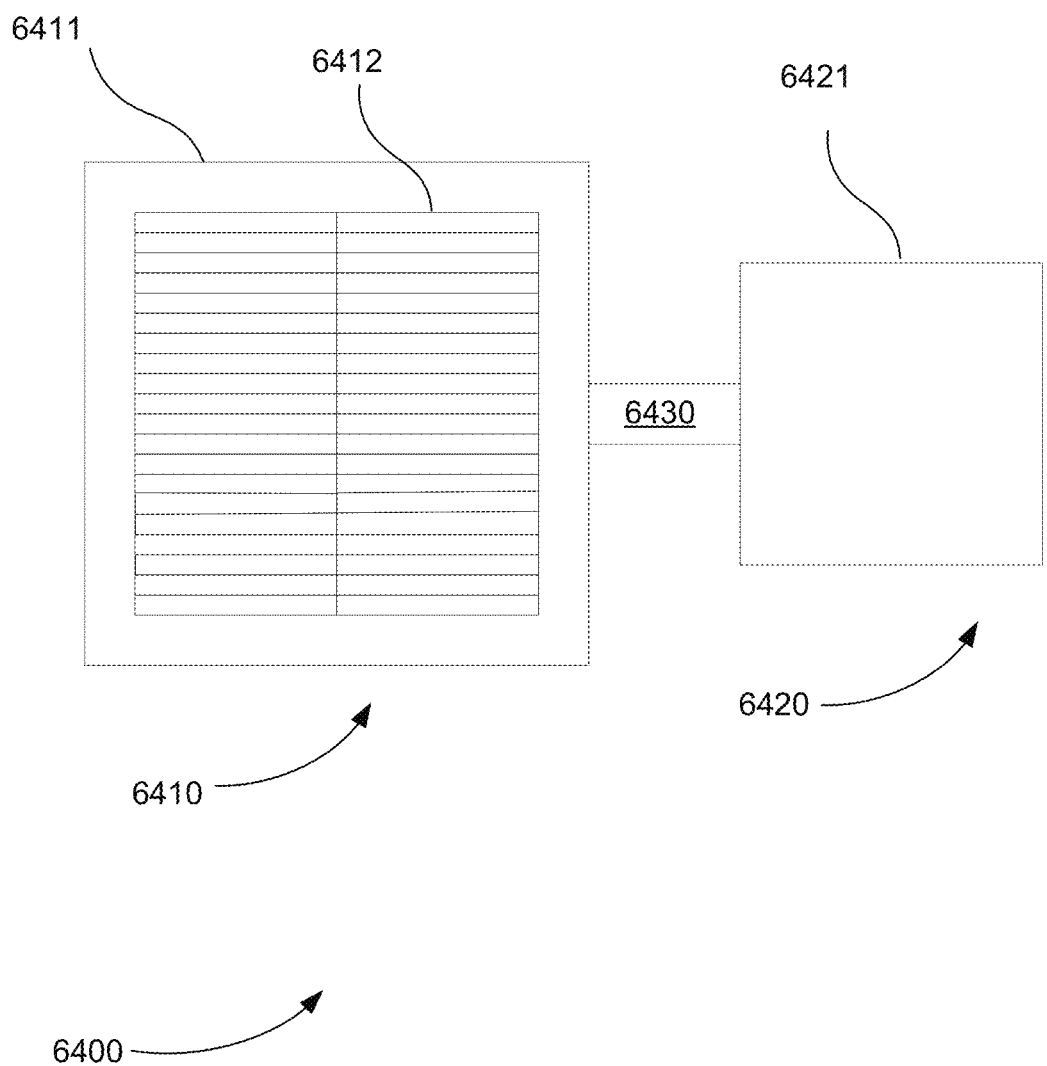
FIG. 64 is an exemplary diagram illustrating an AWG consisting of a solar powered unit containing the hygroscopic material and heat transfer system, and a separated control unit, in accordance with various embodiments.
Figure 65:
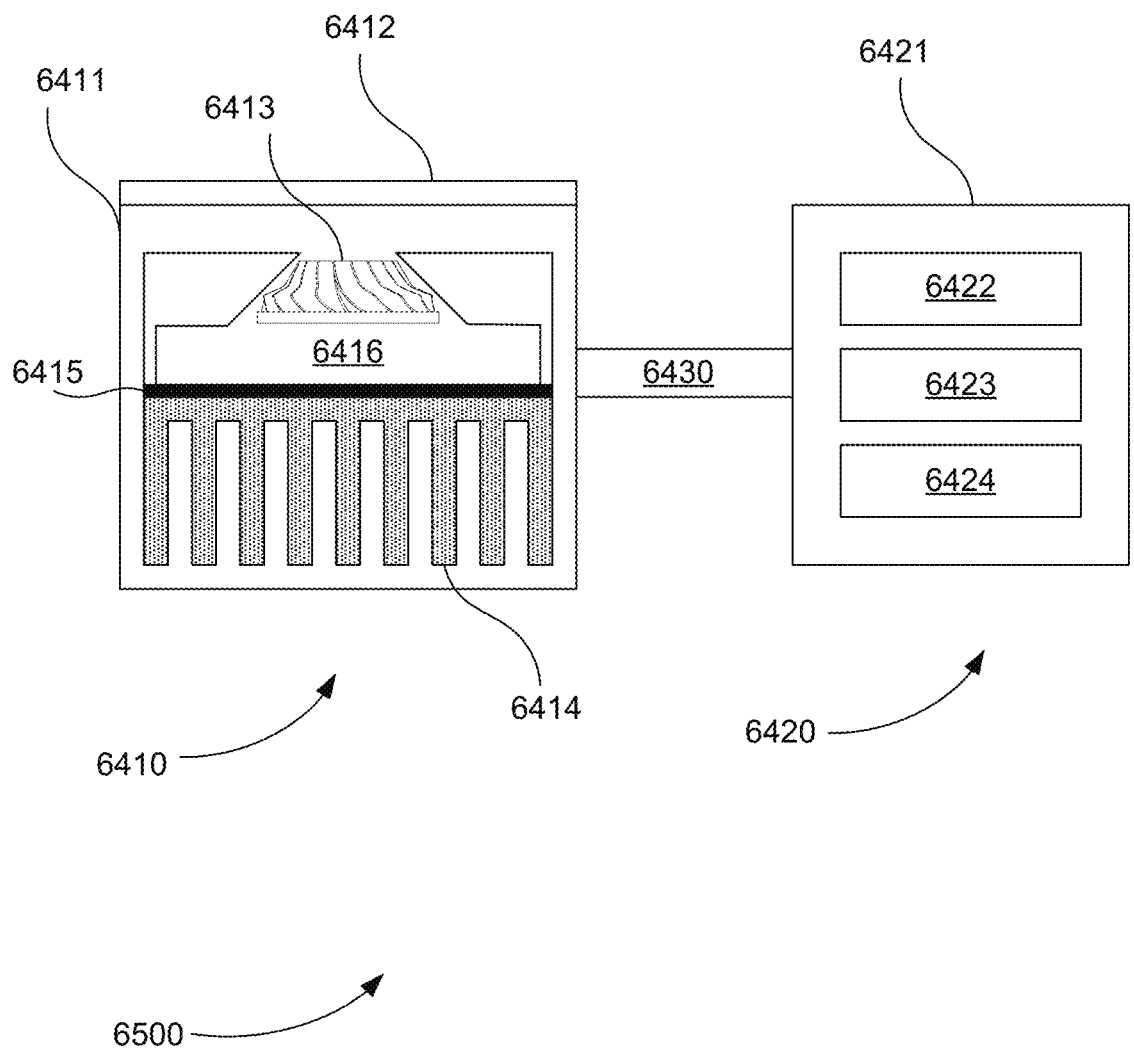
FIG. 65 is an exemplary diagram showing a cross sectional internal view of an AWG consisting of a solar powered unit, comprising of a heat transfer chamber with a hygroscopic material, vapor compression system, and solar panel, along with a separated unit containing a vacuum pump, water filter, water storage tank, and necessary electronics, in accordance with various embodiments.
Figure 66:
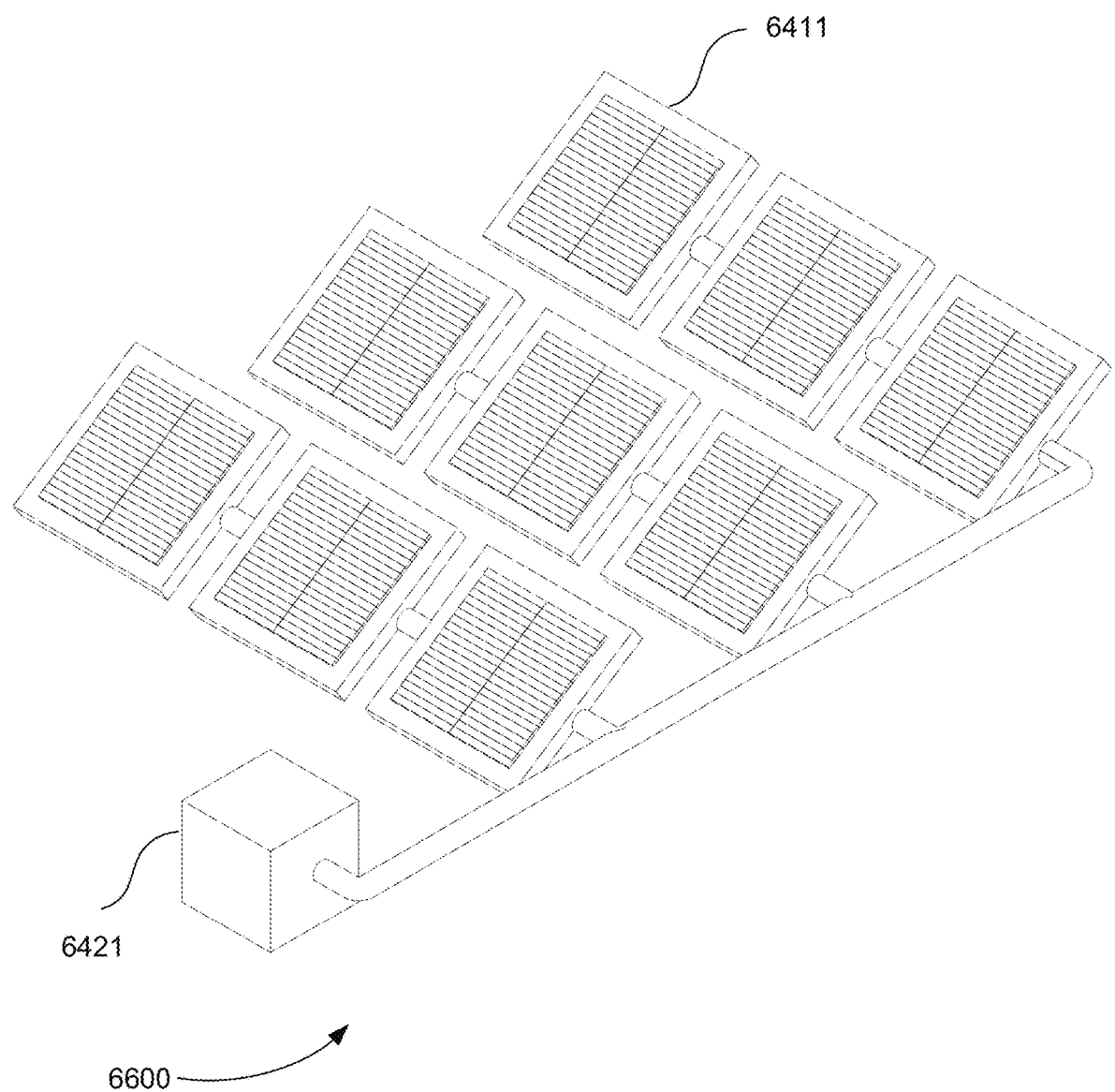
FIG. 66 is an exemplary diagram detailing the connection of multiple solar powered AWGs connected to a control unit containing a vacuum pump, a water filter, a water storage tank, and necessary electronics, in accordance with various embodiments.
Figure 67:
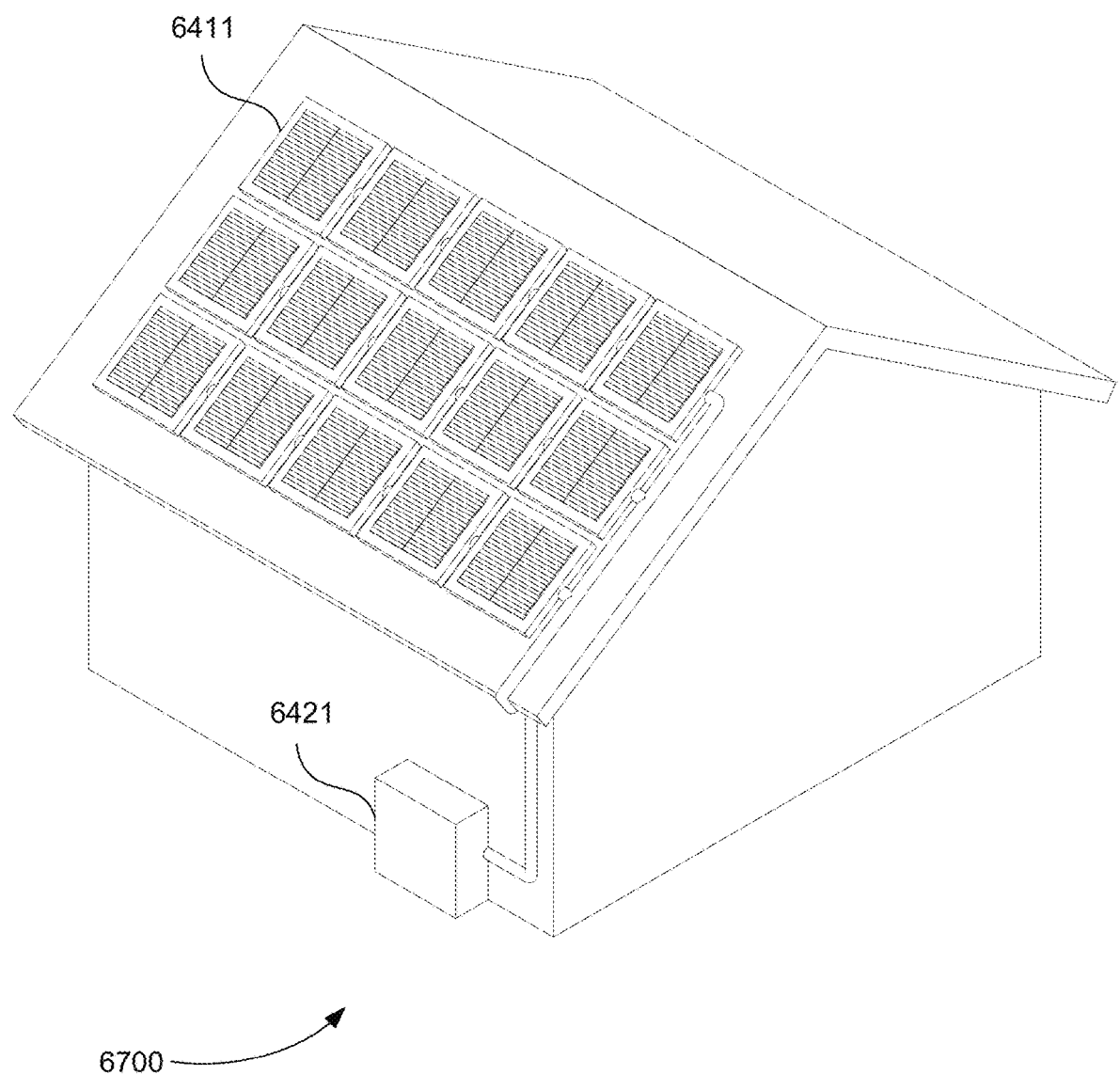
FIG. 67 is an exemplary diagram illustrating the use of multiple solar powered AWGs all connected to a control box, as in FIG. 66, on the roof of a house, in accordance with various embodiments.

FIG. 61 is an exemplary diagram 6100 showing a three-dimensional perspective view of the heat transfer chamber of FIG. 60, in accordance with various embodiments. In FIG. 61, the coiled channel of heat transfer chamber 6040 of AWG 5901 is more easily seen.

Returning to FIG. 60, in various embodiments, heat transfer chamber 6040 is not limited to a coiled channel and can be any type of chamber other than a coiled channel.

Heat transfer chamber 6040 includes an area on the outside of the heat transfer chamber that is coated with a hygroscopic material (not shown). FIG. 4, however, depicts an area on the outside of the heat transfer chamber that is coated with a hygroscopic material.

Returning to FIG. 60, water vapor compression pump 6020 can pump water vapor from vacuum chamber 6010 into heat transfer chamber 6040. Reservoir 6070 can store liquid water condensed by heat transfer chamber 6040.

AWG 5901 can perform one or more cycles of operation. In at least one cycle of operation, AWG 5901 performs a number of steps. First, one or more windows 6011 and 6012 are opened to allow air into vacuum chamber 6010. The hygroscopic material then absorbs water from the air in vacuum chamber 6010.

When the hygroscopic material reaches a water saturation threshold level, vacuum chamber 6010 starts operation under vacuum. Specifically, one or more windows 6011 and 6012 are closed. A vacuum is created in the vacuum chamber. The hygroscopic material begins releasing water vapor into the vacuum chamber. Finally, pump 6020 starts to pump the water vapor from vacuum chamber 6010 into heat transfer chamber 6040.

Liquid water is then produced for some time with little or no change in temperature and with little input energy needed. The pumped water vapor condenses to liquid water in heat transfer chamber 6040 and energy from condensation is transferred back to the hygroscopic material through one or more walls of heat transfer chamber 6040.

Finally, when the liquid water in the heat transfer chamber 6040 reaches a volume threshold level the cycle ends and a new cycle is started. Specifically, pump 6020 is stopped. Liquid water is transferred from the heat transfer chamber 6040 to reservoir 6070. The vacuum in vacuum chamber 6010 is released. One or more windows 6011 and 6012 are then opened to begin the next cycle.

In various embodiments, pump 6020 is a peristaltic pump or a multi-stage peristaltic pump.

In various embodiments, pump 6020 is a high speed centrifugal pump, with the possible implementation of ceramic or magnetic bearings to reduce friction.

In various embodiments, pump 6020 includes motor 6021 outside of vacuum chamber 6010. Motor 6021 is, for example, connected to pump 6020 through the walls of vacuum chamber 6010 with magnets 6022.

In various embodiments, the hygroscopic material can include calcium chloride, silica gel, or MOF-303.

In various embodiments, one or more windows 6011 and 6012 are opened and closed electrically using servo motors or solenoids not shown. These servo motors or solenoids are further controlled by a processor, controller, or computer system, such as the computer system of FIG. 68. AWG 5901 further includes the processor, controller, or computer system.

In a preferred embodiment, one or more windows 6011 and 6012 are opened using a mechanical weight system that opens or closes one or more windows 6011 and 6012 based on the weight of heat transfer chamber 6040. The weight of heat transfer chamber 6040 is then used to determine the water saturation threshold level and volume threshold level.

In various embodiments, the weight system includes a moveable platform over a spring that holds heat transfer chamber 6040 and one or more gear systems that translate the movement of the platform to open or close one or more windows 6011 and 6012.

In various embodiments, the weight system further includes a gear system to open or close a set of top windows 6012 of one or more windows 6011 and 6012 and a reverse gear system to open or close a set of bottom windows 6011 of one or more windows 6011 and 6012.

In various embodiments, the weight system opens one or more windows 6011 and 6012 when the spring is released and the weight system closes one or more windows 6011 and 6012 when the spring is compressed. FIG. 48 shows how one or more windows are opened when the spring is released and FIG. 49 shows how one or more windows are closed when the spring is compressed.

Returning to FIG. 60, in various embodiments, the weight system further includes attracting magnets that increase the speed at which one or more windows 6011 and 6012 of vacuum chamber 6010 are opened and closed.

In various embodiments, the attracting magnets include a top set of attracting magnets.

In various embodiments, the top set of attracting magnets has an attractive force equal to or greater than a force to entirely compress the spring. Thus, once the attractive force is overcome by the weight of heat transfer chamber 6040, heat transfer chamber 6040 is lowered quickly, causing one or more windows 6011 and 6012 to close quickly. This action of the top set of attracting magnets is described above with respect to FIG. 50.

Returning to FIG. 60, in various embodiments, the attracting magnets include a bottom set of attracting magnets.

In various embodiments, when an attractive force of the bottom set of attracting magnets and the weight of heat transfer chamber 6040 becomes less than a force applied by the spring, heat transfer chamber 6040 is raised quickly, causing one or more windows 6011 and 6012 to open quickly. This action of the bottom set of attracting magnets is described above with respect to FIG. 51.

Returning to FIG. 60, in various embodiments, one or more of the bottom set of attracting magnets connected to vacuum chamber 6010 includes a hole that extends through a wall of vacuum chamber 6010 that allows air into vacuum chamber 6010 through the hole.

In various embodiments, when the bottom set of attracting magnets are in contact and heat transfer chamber 6040 has lost enough weight that the spring can overcome the weight of heat transfer chamber 6040 and the attraction of the bottom set of attracting magnets, the hole reduces the amount of pressure required to release a vacuum in vacuum chamber 6010. This action of the bottom set of attracting magnets is described above with respect to FIGS. 53, 54, and 55.

Returning to FIG. 60, in various embodiments, vacuum chamber 6010 further includes a steam vacuum pump that includes a heating element for heating an area of the hygroscopic material and a one-way valve.

In various embodiments, when one or more windows 6011 and 6012 are closed, the heating element is activated causing the area of the hygroscopic material to release water vapor in the form of steam. The one-way valve is opened to allow air displaced by the rising steam to leave vacuum chamber 6010, producing a steam-induced vacuum in vacuum chamber 6010. This operation of the steam induced vacuum is described above with respect to FIGS. 56 through 58.

Returning to FIG. 60, in various embodiments, the heating element and the one-way valve are further controlled by a processor, controller, or computer system, such as the computer system of FIG. 68 described later below. AWG 5901 further includes the processor, controller, or computer system.

In various alternative embodiments, vacuum chamber 6010 can include a conventional vacuum pump 6080 to produce a vacuum in vacuum chamber 1910. Note that if the device implements a conventional vacuum pump 6080, the pump can be located outside of the vacuum chamber and therefore would not need to be driven by a motor outside of vacuum chamber 6010. In various embodiments, conventional vacuum pump 6080 is further controlled by a processor, controller, or computer system, such as the computer system of FIG. 68 described later below. AWG 5901 further includes the processor, controller, or computer system.

In various embodiments, vacuum chamber 6010 further includes fans 6090. Fans 6090 are used to draw air into vacuum chamber 6010 when one or more windows 6011 and 6012 are opened. Fans 6090 also need to be driven by motor 6091, which is also located outside of vacuum chamber 6010. In various embodiments, fans 6090 and motor 6091 are further controlled by a processor, controller, or computer system, such as the computer system of FIG. 68. AWG 5901 further includes the processor, controller, or computer system.

Computer-Implemented System

Figure 68:
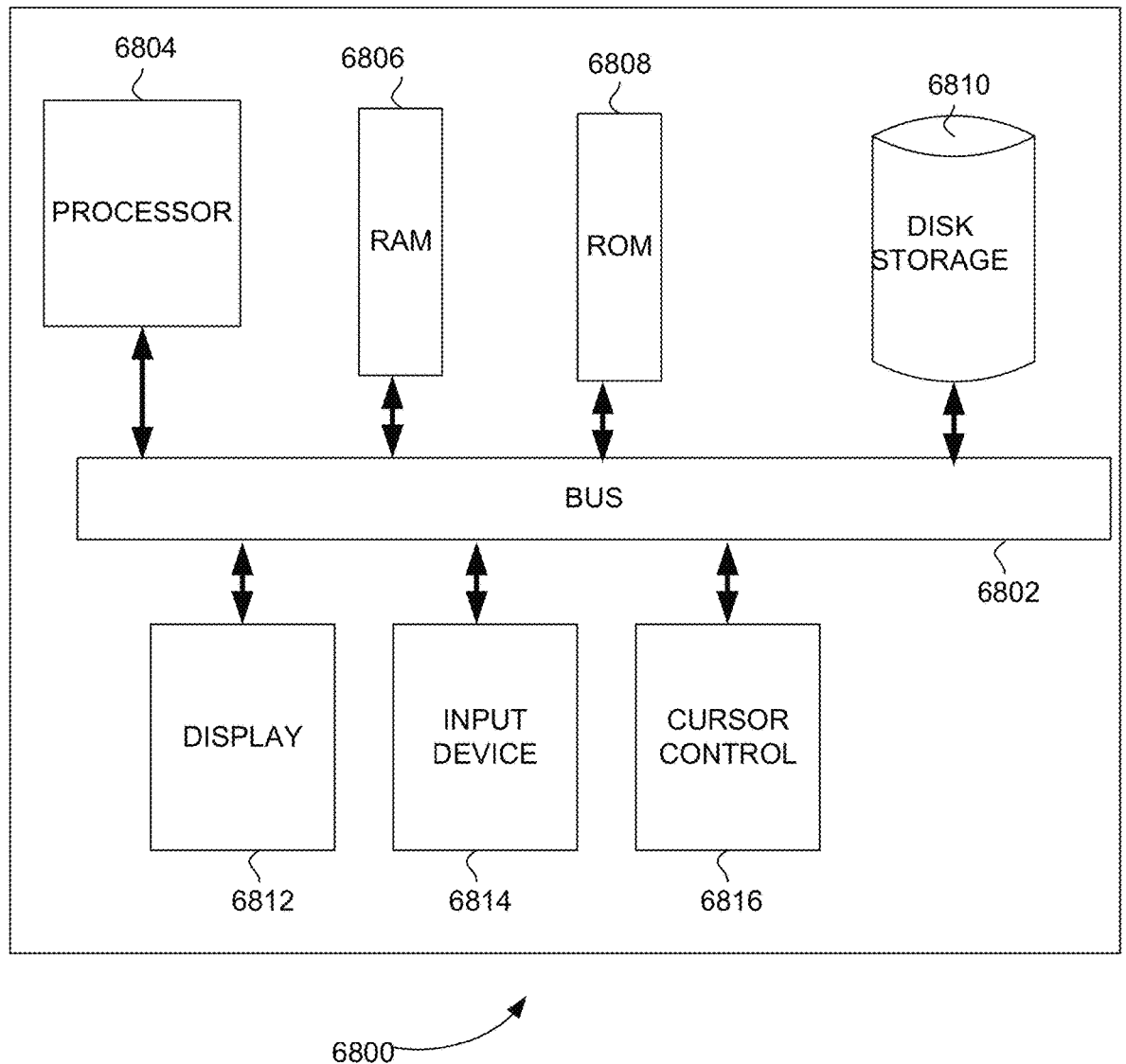
FIG. 68 is a block diagram that illustrates a computer system, upon which embodiments of the present teachings may be implemented.

FIG. 68 is a block diagram that illustrates a computer system 6800, upon which embodiments of the present teachings may be implemented. Computer system 6800 includes a bus 6802 or other communication mechanism for communicating information, and a processor 6804 coupled with bus 6802 for processing information. Computer system 6800 also includes a memory 6806, which can be a random-access memory (RAM) or other dynamic storage device, coupled to bus 6802 for storing instructions to be executed by processor 6804. Memory 6806 also may be used for storing temporary variables or other intermediate information during execution of instructions to be executed by processor 6804. Computer system 6800 further includes a read only memory (ROM) 6808 or other static storage device coupled to bus 6802 for storing static information and instructions for processor 6804. A storage device 6810, such as a magnetic disk or optical disk, is provided and coupled to bus 6802 for storing information and instructions.

Computer system 6800 may be coupled via bus 6802 to a display 6812, such as a cathode ray tube (CRT) or liquid crystal display (LCD), for displaying information to a computer user. An input device 6814, including alphanumeric and other keys, is coupled to bus 6802 for communicating information and command selections to processor 6804. Another type of user input device is cursor control 6816, such as a mouse, a trackball or cursor direction keys for communicating direction information and command selections to processor 6804 and for controlling cursor movement on display 6812.

A computer system 6800 can perform the present teachings. Consistent with certain implementations of the present teachings, results are provided by computer system 6800 in response to processor 6804 executing one or more sequences of one or more instructions contained in memory 6806. Such instructions may be read into memory 6806 from another computer-readable medium, such as storage device 6810. Execution of the sequences of instructions contained in memory 6806 causes processor 6804 to perform the process described herein.

Alternatively, hard-wired circuitry may be used in place of or in combination with software instructions to implement the present teachings. For example, the present teachings may also be implemented with programmable artificial intelligence (AI) chips with only the encoder neural network programmed—to allow for performance and decreased cost. Thus, implementations of the present teachings are not limited to any specific combination of hardware circuitry and software.

The term "computer-readable medium" or "computer program product" as used herein refers to any media that participates in providing instructions to processor 104 for execution. The terms "computer-readable medium" and "computer program product" are used interchangeably throughout this written description. Such a medium may take many forms, including but not limited to, non-volatile media and volatile media. Non-volatile media includes, for example, optical or magnetic disks, such as storage device 110. Volatile media includes dynamic memory, such as memory 106.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 6800 can receive the data on the telephone line and use an infra-red transmitter to convert the data to an infra-red signal. An infra-red detector coupled to bus 102 can receive the data carried in the infra-red signal and place the data on bus 6802. Bus 6802 carries the data to memory 6806, from which processor 6804 retrieves and executes the instructions. The instructions received by memory 6806 may optionally be stored on storage device 6810 either before or after execution by processor 6804.

In accordance with various embodiments, instructions configured to be executed by a processor to perform a method are stored on a computer-readable medium. The computer-readable medium can be a device that stores digital information. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Method for Generating Liquid Water from Air

Figure 69:
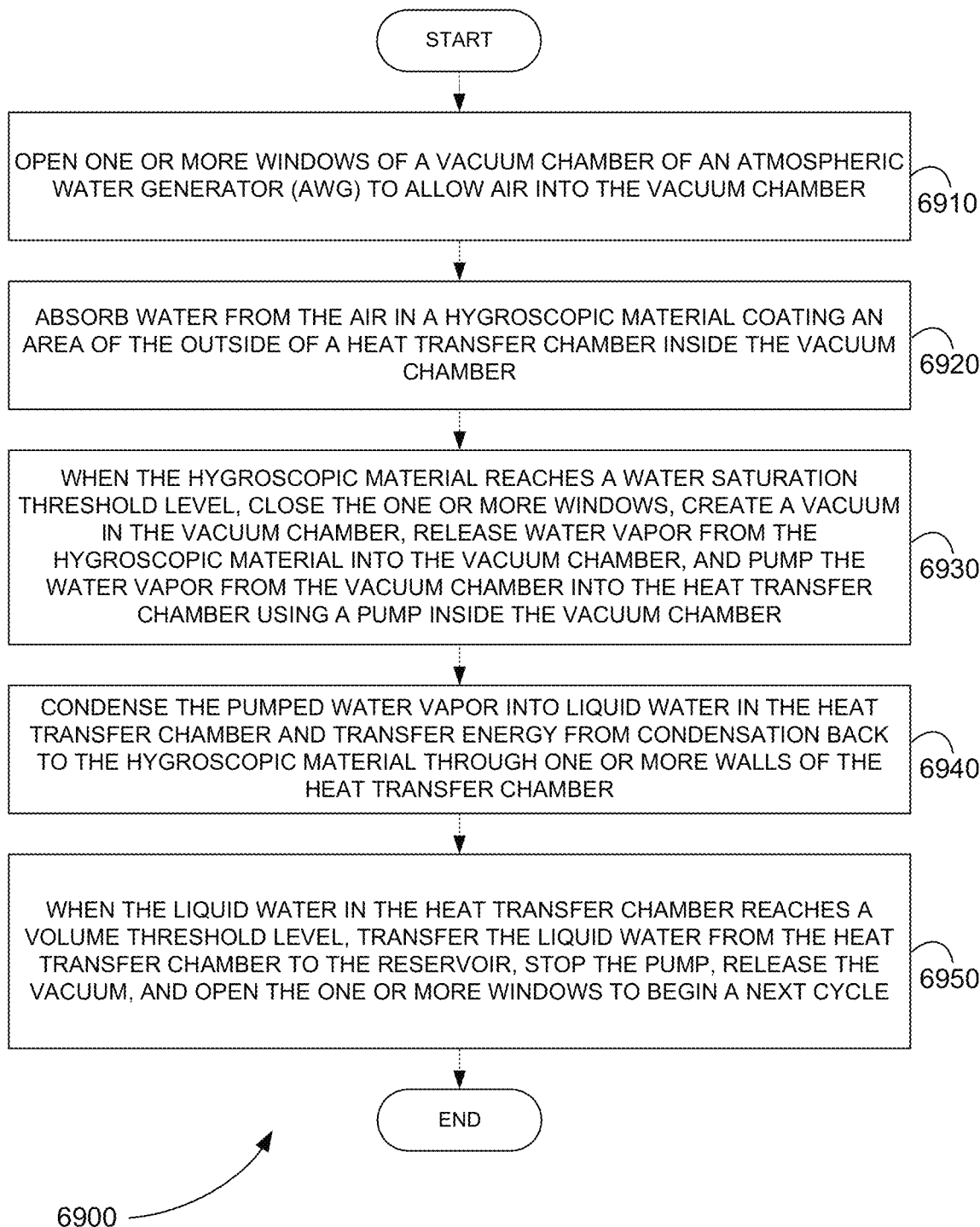
FIG. 69 is a flowchart showing a method for generating liquid water from air utilizing a single desiccant, in accordance with various embodiments.

FIG. 69 is a flowchart showing a method 6900 for generating liquid water from air, in accordance with various embodiments.

In step 6910 of method 6900, one or more windows of a vacuum chamber of an atmospheric water generator (AWG) are opened to allow air into the vacuum chamber.

In step 6920, water is absorbed from the air in a hygroscopic material coating an area of the outside of a heat transfer chamber inside the vacuum chamber.

In step 6930, when the hygroscopic material reaches a water saturation threshold level, the one or more windows are closed, a vacuum is created in the vacuum chamber, water vapor is released from the hygroscopic material into the vacuum chamber, and the water vapor is pumped from the vacuum chamber into the heat transfer chamber using a pump inside the vacuum chamber.

In step 6940, the pumped water vapor is condensed into liquid water in the heat transfer chamber and energy is transferred from condensation back to the hygroscopic material through one or more walls of the heat transfer chamber.

In step 6950, when the liquid water in the heat transfer chamber reaches a volume threshold level, the liquid water is transferred from the heat transfer chamber to the reservoir, the pump is stopped, the vacuum is released, and the one or more windows are opened to begin a next cycle.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skills in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. An atmospheric water generator (AWG), comprising:
   a vacuum chamber that includes one or more windows that can be opened;
   a heat transfer chamber inside the vacuum chamber that includes an evaporation chamber containing a desiccant and a condensation chamber, where the evaporation chamber and the condensation chamber are connected;
   a water vapor compression pump inside the vacuum chamber that can pump water vapor from the evaporation chamber into the condensation chamber; and
   a reservoir inside the vacuum chamber for storing liquid water, wherein, in at least one cycle of one or more cycles of operation,
   the one or more windows are opened to allow air into the vacuum chamber,
   the desiccant absorbs water from the air,
   when the desiccant reaches a water saturation threshold level, the one or more windows are closed, a vacuum is created in the vacuum chamber, the desiccant begins releasing water vapor in the evaporation chamber in the vacuum chamber, and the water vapor compression pump pumps the water vapor from the evaporation chamber into the condensation chamber,
   the pumped water vapor condenses to liquid water in the condensation chamber, and energy from condensation is transferred back to the desiccant through one or more walls of the heat transfer chamber to the evaporation chamber,
   when the liquid water in the condensation chamber reaches a volume threshold level, the pump is stopped, the liquid water is transferred from the heat transfer chamber to the reservoir, the vacuum is released, and the one or more windows are opened to begin a next cycle, and
   wherein the one or more windows are opened using a moveable platform over a spring that holds the heat transfer chamber that opens or closes the one or more windows based on the weight of the desiccant and the heat transfer chamber.

2. The AWG of claim 1, wherein the moveable platform over the spring that holds the heat transfer chamber and one or more gears translate the movement of the platform to open or close the one or more windows.

3. The AWG of claim 1, wherein the one or more gears open or close a set of top windows of the one or more windows and open or close a set of bottom windows of the one or more windows.

4. The AWG of claim 1, wherein the moveable platform over the spring that holds the heat transfer chamber opens the one or more windows when the spring is released and the moveable platform over the spring that holds the heat transfer chamber closes the one or more windows when the spring is compressed.

5. The AWG of claim 1, wherein the moveable platform over the spring that holds the heat transfer chamber further includes attracting magnets that increase the speed at which the one or more windows of the vacuum chamber are opened and closed.

6. The AWG of claim 5, wherein the attracting magnets include a top set of attracting magnets.

7. The AWG of claim 6, wherein the top set of attracting magnets have an attractive force equal to or greater than a force to entirely compress the spring so that, once the attractive force is overcome by the weight of the heat transfer chamber, the heat transfer chamber is lowered quickly, causing the one or more windows to close quickly.

8. The AWG of claim 5, wherein the attracting magnets include a bottom set of attracting magnets.

9. The AWG of claim 8, wherein, when an attractive force of the bottom set of attracting magnets and the weight of the heat transfer chamber becomes less than a force applied by the spring, the heat transfer chamber is raised quickly, causing the one or more windows to open quickly.

10. The AWG of claim 8, wherein one or more of the bottom set of attracting magnets connected to the vacuum chamber include a hole that extends through a wall of the vacuum chamber that allows air into the vacuum chamber through the hole.

11. The AWG of claim 10, wherein, when the bottom set of attracting magnets are in contact and the heat transfer chamber has lost enough weight that the spring can overcome the weight of the heat transfer chamber and the attraction of the bottom set of attracting magnets, the hole reduces the amount of pressure required to release a vacuum in the vacuum chamber.

* * * * *